(12) United States Patent
Chen et al.

(10) Patent No.: US 12,184,555 B2
(45) Date of Patent: Dec. 31, 2024

(54) SERVICE LEVEL ADJUSTMENT METHOD, APPARATUS, DEVICE, AND SYSTEM, AND STORAGE MEDIUM

(71) Applicant: Huawei Technologies Co., Ltd., Shenzhen (CN)

(72) Inventors: Shuang Chen, Beijing (CN); Lei Li, Shenzhen (CN); Jun Gong, Beijing (CN); Xiaodong Chang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 114 days.

(21) Appl. No.: 17/814,071

(22) Filed: Jul. 21, 2022

(65) Prior Publication Data

US 2022/0407808 A1 Dec. 22, 2022

Related U.S. Application Data

(63) Continuation of application No. PCT/CN2020/118590, filed on Sep. 28, 2020.

(30) Foreign Application Priority Data

Jan. 22, 2020 (CN) .......................... 202010075494.5
Jul. 3, 2020 (CN) .......................... 202010635155.8

(51) Int. Cl.
*H04L 47/2425* (2022.01)
*H04L 41/5003* (2022.01)
*H04L 47/52* (2022.01)

(52) U.S. Cl.
CPC ...... *H04L 47/2425* (2013.01); *H04L 41/5003* (2013.01); *H04L 47/52* (2013.01)

(58) Field of Classification Search
None
See application file for complete search history.

(56) References Cited

U.S. PATENT DOCUMENTS 7,394,780 B1  7/2008  Gregory
7,436,765 B2  10/2008  Sisto et al.
(Continued)

FOREIGN PATENT DOCUMENTS

CN  1918937 A  2/2007
CN  102739507 A  10/2012
(Continued)

OTHER PUBLICATIONS

Huawei, et al., "TS 23.501: Enforcement of Session AMBR", SA WG2 Meeting #120, S2-172320 (revision of S2-171867), Busan, South Korea, Mar. 27-31, 2017, 6 pages.
(Continued)

*Primary Examiner* — Kouroush Mohebbi
(74) *Attorney, Agent, or Firm* — Slater Matsil, LLP

(57) ABSTRACT

This application discloses a service level adjustment method, apparatus, device, and system, and a storage medium. The method includes: A control device obtains at least one piece of related information in at least one piece of queue status information, a remaining data flow parameter, a current data flow parameter, and a quantity of reporting times of exception information of a target service level of a network device. The control device adjusts, when any information in the related information does not meet a threshold corresponding to the any information, a parameter of the target service level based on a maximum delay associated with the target service level.

19 Claims, 9 Drawing Sheets

---

A control device obtains related information of a target service level of a first network device, where the related information includes at least one piece of information in at least one piece of queue status information, a remaining data flow parameter, a current data flow parameter, and a quantity of reporting times of exception information of the target service level — 401

The control device adjusts, when any information in the related information does not meet a threshold corresponding to the any information, a parameter of the target service level based on a maximum delay associated with the target service level — 402

(56) References Cited

U.S. PATENT DOCUMENTS

| | | | |
|---|---|---|---|
| 7,719,977 B2 | 5/2010 | Sisto | |
| 8,036,372 B2 | 10/2011 | Patakula et al. | |
| 8,688,129 B2 | 4/2014 | Gogic | |
| 9,161,317 B2 | 10/2015 | Park et al. | |
| 9,485,326 B1 | 11/2016 | Ulman | |
| 10,764,191 B2 | 9/2020 | Guck et al. | |
| 10,817,424 B1 | 10/2020 | Amrani et al. | |
| 11,864,173 B2 | 1/2024 | Yang | |
| 2001/0051992 A1 | 12/2001 | Yang | |
| 2002/0075882 A1 | 6/2002 | Donis et al. | |
| 2003/0214928 A1 | 11/2003 | Chuah | |
| 2005/0169171 A1 | 8/2005 | Cheng | |
| 2007/0016726 A1 | 1/2007 | Zohar et al. | |
| 2007/0058536 A1 | 3/2007 | Vaananen | |
| 2007/0263537 A1 | 11/2007 | Cahn | |
| 2008/0247357 A1 | 10/2008 | Kim et al. | |
| 2008/0285465 A1 | 11/2008 | Yang | |
| 2008/0285581 A1 | 11/2008 | Maiorana et al. | |
| 2010/0118883 A1 | 5/2010 | Jones et al. | |
| 2010/0188974 A1 | 7/2010 | Rochon | |
| 2010/0274919 A1 | 10/2010 | Greene et al. | |
| 2011/0110221 A1 | 5/2011 | Hlibiciuc | |
| 2011/0274053 A1 | 11/2011 | Baik et al. | |
| 2012/0023254 A1 | 1/2012 | Park | |
| 2012/0063526 A1 | 3/2012 | Xiao et al. | |
| 2012/0114112 A1 | 5/2012 | Rauschenberger | |
| 2012/0213070 A1* | 8/2012 | Lee | H04L 41/5003 370/231 |
| 2012/0213075 A1 | 8/2012 | Koie et al. | |
| 2012/0233315 A1 | 9/2012 | Hoffman et al. | |
| 2013/0188482 A1 | 7/2013 | Lee | |
| 2013/0225228 A1 | 8/2013 | Park et al. | |
| 2014/0286160 A1 | 9/2014 | Zhang et al. | |
| 2014/0355439 A1 | 12/2014 | Kakadia | |
| 2015/0016266 A1 | 1/2015 | Dumitrescu et al. | |
| 2015/0063112 A1 | 3/2015 | Wu et al. | |
| 2015/0092585 A1 | 4/2015 | Shao | |
| 2015/0156082 A1 | 6/2015 | Kakadia | |
| 2015/0189539 A1 | 7/2015 | Li | |
| 2015/0222560 A1 | 8/2015 | Kakadia et al. | |
| 2015/0244804 A1 | 8/2015 | Warfield | |
| 2015/0295855 A1 | 10/2015 | Karthikeyan et al. | |
| 2016/0061667 A1 | 3/2016 | Hwang | |
| 2016/0119920 A1 | 4/2016 | Mallik et al. | |
| 2016/0241477 A1 | 8/2016 | Garcia | |
| 2016/0381610 A1 | 12/2016 | Pu et al. | |
| 2017/0070408 A1 | 3/2017 | Liao | |
| 2017/0078313 A1 | 3/2017 | Zhong et al. | |
| 2017/0134250 A1 | 5/2017 | Buscemi | |
| 2017/0163495 A1 | 6/2017 | Kurian et al. | |
| 2017/0245171 A1 | 8/2017 | Jung | |
| 2017/0317944 A1 | 11/2017 | John et al. | |
| 2018/0048575 A1 | 2/2018 | Mangin | |
| 2018/0048691 A1 | 2/2018 | Pruden et al. | |
| 2018/0091388 A1 | 3/2018 | Levy | |
| 2018/0159766 A1 | 6/2018 | Cui et al. | |
| 2018/0227902 A1 | 8/2018 | Gholmieh | |
| 2019/0007337 A1 | 1/2019 | Guck et al. | |
| 2019/0089760 A1 | 3/2019 | Zhang | |
| 2019/0207856 A1 | 7/2019 | Guck et al. | |
| 2019/0261195 A1 | 8/2019 | Cheng | |
| 2019/0332702 A1 | 10/2019 | Manamohan et al. | |
| 2020/0014581 A1 | 1/2020 | Aaron | |
| 2020/0067793 A1 | 2/2020 | Dribinski et al. | |
| 2020/0145080 A1 | 5/2020 | Tang | |
| 2020/0204460 A1 | 6/2020 | Schneider et al. | |
| 2020/0257928 A1 | 8/2020 | Iiduka | |
| 2020/0274794 A1 | 8/2020 | Zhang | |
| 2020/0313837 A1 | 10/2020 | Vejlgaard et al. | |
| 2020/0314677 A1 | 10/2020 | Kim | |
| 2020/0334615 A1 | 10/2020 | Benjamin et al. | |
| 2020/0367110 A1 | 11/2020 | Sun | |
| 2021/0006614 A1 | 1/2021 | Oyman et al. | |
| 2021/0044539 A1 | 2/2021 | Kottapalli | |
| 2021/0058453 A1 | 2/2021 | Balasubramanian et al. | |
| 2021/0075738 A1 | 3/2021 | Clemm | |
| 2021/0092753 A1 | 3/2021 | Choi et al. | |
| 2021/0126874 A1 | 4/2021 | Glasco | |
| 2021/0329666 A1 | 10/2021 | Ljung et al. | |
| 2021/0359931 A1 | 11/2021 | Wang | |
| 2022/0377016 A1* | 11/2022 | Chen | H04L 41/5003 |

FOREIGN PATENT DOCUMENTS

| | | |
|---|---|---|
| CN | 104584627 A | 4/2015 |
| CN | 103326961 B | 6/2016 |
| CN | 109245936 A | 1/2019 |
| CN | 109547362 A | 3/2019 |
| CN | 109787801 A | 5/2019 |
| CN | 110267310 A | 9/2019 |
| JP | 2002135329 A | 5/2002 |
| JP | 2002344509 A | 11/2002 |
| JP | 2003110605 A | 4/2003 |
| WO | 2018205900 A1 | 11/2018 |

OTHER PUBLICATIONS

Braden, R., et al., "Integrated Services in the Internet Architecture: an Overview", Network Working Group, Request for Comments: 1633, Jun. 1994, 33 pages.

Blake, S. et al., "An Architecture for Differentiated Services", Network Working Group, Request for Comments: 2475, Dec. 1998, 36 pages.

* cited by examiner

SERVICE LEVEL ADJUSTMENT METHOD, APPARATUS, DEVICE, AND SYSTEM, AND STORAGE MEDIUM

CROSS-REFERENCE TO RELATED APPLICATIONS

This application is a continuation of International Application No. PCT/CN2020/118590, filed on Sep. 28, 2020, which claims priority to Chinese Patent Application No. 202010075494.5, filed on Jan. 22, 2020, and claims priority to Chinese Patent Application No. 202010635155.8, filed on Jul. 3, 2020, which are incorporated herein by reference in their entireties. All of the aforementioned patent applications are hereby incorporated by reference in their entireties.

TECHNICAL FIELD

This application relates to the communications field, and in particular, to a service level adjustment method, apparatus, device, and system, and a storage medium.

BACKGROUND

An emerging 5th generation (5G) ultra-reliable low-latency communication (uRLLC) service imposes a new requirement on an internet protocol (IP) network. In addition to conventional reachability and bandwidth guarantee, end-to-end delay guarantee and packet loss rate guarantee further need to be provided for a service. Specifically, for this type of service, it needs to ensure that an end-to-end delay of a packet does not exceed a specified maximum delay and a packet loss does not occur. However, a conventional best-effort-based IP network cannot provide a deterministic service forwarding capability, and cannot meet an SLA requirement such as a guaranteed end-to-end delay requirement.

SUMMARY

This application provides a service level adjustment method, apparatus, device, and system, and a storage medium, to improve network resource utilization while ensuring an end-to-end delay requirement of a service.

According to a first aspect, a service level adjustment method is provided. The method includes: A control device obtains at least one piece of related information in at least one piece of queue status information, a remaining data flow parameter, a current data flow parameter, and a quantity of reporting times of exception information of a target service level of a first network device. The control device adjusts, when any information in the related information does not meet a threshold corresponding to the any information, a parameter of the target service level based on a maximum delay associated with the target service level.

The at least one piece of queue status information of the target service level includes one or more pieces of queue status information of the target service level. For example, each service level is bound to one or more queues on a port of the first network device, and the plurality of queues are referred to as a group of queues. If the target service level is bound to a group of queues in the first network device, the queue status information of the target service level is queue status information of one or more queues in the group of queues bound to the target service level, or the queue status information of the target service level is overall queue status information of the group of queues bound to the target service level. The queue status information includes but is not limited to one or more local queue buffer occupation, a queuing delay, a packet count, and the like. The queue buffer occupation represents a size of a buffer occupied by a packet in a queue bound to the target service level. The packet queuing delay represents a queuing delay of the packet in the queue bound to the target service level, and includes a time interval from a time point at which the packet enters a buffer to a time point at which the packet is scheduled. The packet count represents a data amount per unit time or a packet quantity per unit time of the packet in the queue bound to the target service level.

The remaining data flow parameter of the target service level includes remaining allowable traffic that is of a data flow and that is of the target service level of the first network device. The exception information of the target service level includes at least one of queue buffer occupation exception information, queuing delay exception information, packet count exception information, and error information. The current data flow parameter of the target service level includes a current traffic value that is of a data flow and that is of the target service level of the first network device. For example, the error information is error information sent by the network device to the control device when traffic of the target service level exceeds an admission constraint or a resource threshold.

The parameter of the target service level is adjusted, so that network resource utilization is further improved while an end-to-end delay of a service is ensured.

In a possible implementation, the related information includes the at least one piece of queue status information of the target service level. The control device adjusts, when any one of the at least one piece of queue status information is less than a threshold lower limit corresponding to the any queue status information, the parameter of the target service level based on the maximum delay associated with the target service level. For example, the queue status information includes the local queue buffer occupation, the packet queuing delay, and the packet count. If it is detected that the local queue buffer occupation of the target service level is less than a threshold lower limit of the buffer occupation, the packet queuing delay is less than a threshold lower limit of the packet queuing delay, or the packet count is less than a threshold lower limit of the packet count, the control device is triggered to adjust the target service level based on the maximum delay associated with the target service level.

When the queue status information does not meet the corresponding threshold lower limit, the control device adjusts the parameter of the target service level based on the maximum delay associated with the target service level, so that when the queue status information changes, an end-to-end delay of a service can be ensured, and network resource utilization can be improved.

In a possible implementation, the related information includes the current data flow parameter of the target service level. The control device adjusts, when the current data flow parameter of the target service level is less than a threshold lower limit corresponding to the current data flow parameter, the parameter of the target service level based on the maximum delay associated with the target service level.

When the current data flow parameter is less than the corresponding threshold lower limit, the control device adjusts the parameter of the target service level based on the maximum delay associated with the target service level, so that when a change of current traffic is considered, an end-to-end delay of a service can be ensured, and network resource utilization can be improved.

In a possible implementation, the related information includes the remaining data flow parameter of the target service level. The control device adjusts, when the remaining data flow parameter of the target service level exceeds a threshold upper limit corresponding to the remaining data flow parameter, the parameter of the target service level based on the maximum delay associated with the target service level.

When the remaining data flow parameter exceeds the corresponding threshold upper limit, the control device adjusts the parameter of the target service level based on the maximum delay associated with the target service level, so that when a change of remaining traffic is considered, an end-to-end delay of a service can be ensured, and network resource utilization can be further improved.

In a possible implementation, the parameter of the target service level includes a queue resource parameter and a data flow constraint parameter. The control device determines a first update value of the data flow constraint parameter; and determines a first update value of the queue resource parameter based on the first update value of the data flow constraint parameter when the maximum delay remains unchanged; The control device adjusts the data flow constraint parameter based on the first update value of the data flow constraint parameter, and adjusts the queue resource parameter based on the first update value of the queue resource parameter.

In a possible implementation, the first update value of the queue resource parameter includes a first update value of a queue bandwidth and a first update value of a queue buffer. The first update value of the data flow constraint parameter includes a first update value of a threshold of a burst amount of a data flow and a first update value of a threshold of an average rate of the data flow. When the maximum delay remains unchanged, the control device determines a total bandwidth of a port corresponding to the target service level, a first maximum amount of data that can be forwarded at the target service level after the parameter of the target service level is adjusted, a maximum amount of data that can be forwarded at each of a plurality of service levels of the first network device before the parameter of the target service level is adjusted, and a maximum packet length of a queue corresponding to each of the plurality of service levels. The control device determines the first update value of the queue bandwidth based on the total bandwidth of the port corresponding to the target service level, the first maximum amount of data that can be forwarded at the target service level after the parameter of the target service level is adjusted, and the maximum amount of data that can be forwarded at each of the plurality of service levels before the parameter of the target service level is adjusted. The control device determines the first update value of the queue buffer based on the maximum amount of data that can be forwarded at each of the plurality of service levels before the parameter of the target service level is adjusted, the maximum packet length of the queue corresponding to each of the plurality of service levels, the first update value of the threshold of the burst amount of the data flow, and the first update value of the threshold of the average rate of the data flow.

In a possible implementation, the control device determines, based on the bandwidth of the port corresponding to the target service level, the first maximum amount of data that can be forwarded at the target service level after the parameter of the target service level is adjusted, and the maximum amount of data that can be forwarded at each of the plurality of service levels before the parameter of the target service level is adjusted, the first update value CN of the queue bandwidth according to the following formula:

$$C_{i1}^2 = C \frac{Q_{i1}^2}{\sum_{1 \le j \le n, j \ne i} Q_j + Q_i^1 + Q_{n+1}^1}$$

In a possible implementation, the control device determines, based on the maximum amount of data that can be forwarded at each of the plurality of service levels before the parameter of the target service level is adjusted, the maximum packet length of the queue corresponding to each of the plurality of service levels, the first update value of the threshold of the burst amount of the data flow, and the first update value of the threshold of the average rate of the data flow, the first update value $BF_{i1}^2$ of the queue buffer according to the following formula:

$$BF_{i1}^2 = \left( \frac{L_{max,L} + \sum_{1 \le j \le n, j \ne i}(L_j + Q_j) + L_{n+1} + Q_{n+1}^2}{C} + \frac{L_i\left(\sum_{1 \le j \le n, j \ne i} Q_j + Q_{n+1}^2\right)}{CQ_{i1}^2} \right) * r_{i1}^2 + b_{i1}^2$$

Herein, C is the bandwidth of the port corresponding to the target service level, $Q_{i1}^2$ is the first maximum amount of data that can be forwarded at the target service level after the parameter of the target service level is adjusted, $Q_j$ is a maximum amount of data that can be forwarded at a $j^{th}$ service level, $Q_i^1$ is a maximum amount of data that can be forwarded at the target service level before the parameter of the target service level is adjusted, $Q_{n+1}^1$ is a maximum amount of data that can be forwarded in a non-delay-guarantee queue before the parameter of the target service level is adjusted, $L_{max,L}$ is a maximum packet length of a low-priority queue, $L_{n+1}$ is a maximum packet length of the non-delay-guarantee queue, $L_j$ is a maximum packet length of a queue at the $j^{th}$ service level, $b_{i1}^2$ is the first update value of the threshold of the burst amount of the data flow, $b_{i1}^2 = b_i^1 - \Delta b_{i1}$, $b_i^1$ is the threshold of the burst amount of the data flow that exists before the parameter of the target service level is adjusted, $\Delta b_{i1}$ is a value by which the threshold that is of the burst amount of the data flow and that is of the target service level is decreased, $r_{i1}^2$ is the first update value of the threshold of the average rate of the data flow, $r_{i1}^2 = r_i^1 - \Delta r_i^1$, $r_i^1$ is the threshold of the average rate of the data flow that exists before the parameter of the target service level is adjusted, $\Delta r_{i1}$ is a value by which the threshold of the average rate of the data flow is decreased, $L_i$ is a maximum packet length of a queue at the target service level, $Q_{n+1}^2$ is a maximum amount of data that can be forwarded in the non-delay-guarantee queue after the parameter of the target service level is adjusted, and n, i, and j are positive integers.

In a possible implementation, the related information includes the at least one piece of queue status information of the target service level. The control device adjusts, when any one of the at least one piece of queue status information exceeds a threshold upper limit corresponding to the any queue status information, the parameter of the target service level based on the maximum delay associated with the target service level. For example, the queue status information includes the local queue buffer occupation, the packet queuing delay, and the packet count. If it is detected that the local queue buffer occupation of the target service level exceeds a threshold upper limit of the buffer occupation, the packet queuing delay exceeds a threshold upper limit of the packet queuing delay, or the packet count exceeds a threshold upper limit of the packet count, the control device is triggered to adjust the parameter of the target service level based on the maximum delay associated with the target service level.

In a possible implementation, the related information includes the current data flow parameter of the target service level. The control device adjusts, when the current data flow parameter of the target service level exceeds a threshold upper limit corresponding to the current data flow parameter, the parameter of the target service level based on the maximum delay associated with the target service level.

In a possible implementation, the related information includes the remaining data flow parameter of the target service level. The control device adjusts, when the remaining data flow parameter of the target service level is less than a threshold lower limit corresponding to the remaining data flow parameter, the parameter of the target service level based on the maximum delay associated with the target service level.

In a possible implementation, the related information includes the quantity of reporting times of the exception information of the target service level. The control device adjusts, when the quantity of reporting times of the exception information of the target service level exceeds a threshold upper limit corresponding to the quantity of reporting times of the exception information, the parameter of the target service level based on the maximum delay associated with the target service level. For example, the first network device reports the exception information to the control device when a local resource does not meet an update value of the configuration parameter of the target service level when the maximum delay remains unchanged. The exception information is abnormal service information of the first network device. For example, the abnormal quality of service information includes at least one of queue buffer occupation, a packet queuing delay, packet count information, and error information that exceed a threshold.

In a possible implementation, the parameter of the target service level includes a queue resource parameter and a data flow constraint parameter. The control device determines a second update value of the data flow constraint parameter. The control device determines a second update value of the queue resource parameter based on the second update value of the data flow constraint parameter when the maximum delay remains unchanged. When the second update value of the queue resource parameter is less than or equal to a resource threshold, the control device adjusts the data flow constraint parameter based on the second update value of the data flow constraint parameter, and adjusts the queue resource parameter based on the second update value of the queue resource parameter.

In a possible implementation, the configuration parameter of the target service level includes a queue resource parameter and a data flow constraint parameter. The control device determines a second update value of the data flow constraint parameter. The control device determines a second update value of the queue resource parameter based on the second update value of the data flow constraint parameter when the maximum delay remains unchanged. When the second update value of the queue resource parameter is greater than a resource threshold, the control device switches a target data flow corresponding to the target service level to a data flow corresponding to another service level, where the another service level includes another service level of the first network device or a service level of another device.

In a possible implementation, the configuration parameter of the target service level includes a queue resource parameter and a data flow constraint parameter. The control device determines a second update value of the data flow constraint parameter. The control device determines a second update value of the queue resource parameter based on the second update value of the data flow constraint parameter when the maximum delay remains unchanged. When the second update value of the queue resource parameter is greater than a resource threshold, the control device determines a third update value of the queue resource parameter based on the second update value of the data flow constraint parameter, and determines an update value of a parameter of a service level of a resource that can be preempted. The update value of the parameter of the service level of the resource that can be preempted is used to enable the third update value of the queue resource parameter to meet a constraint condition. The control device adjusts the data flow constraint parameter based on the second update value of the data flow constraint parameter, adjusts the queue resource parameter based on the third update value of the queue resource parameter, and adjusts, based on the update value of the parameter of the service level of the resource that can be preempted, the parameter of the service level of the resource that can be preempted.

In a possible implementation, the second update value of the queue resource parameter includes a second update value of a queue bandwidth and a second update value of a queue buffer, and the second update value of the data flow constraint parameter includes a second update value of a threshold of a burst amount of a data flow and a second update value of a threshold of an average rate of the data flow. The determining a second update value of the queue resource parameter based on the second update value of the data flow constraint parameter when the maximum delay remains unchanged includes: when the maximum delay remains unchanged, determining a bandwidth of a port corresponding to the target service level, a second maximum amount of data that can be forwarded at the target service level after the parameter of the target service level is adjusted, a maximum amount of data that can be forwarded at each of a plurality of service levels of the first network device before the parameter of the target service level is adjusted, and a maximum packet length of a queue corresponding to each of the plurality of service levels; determining the second update value of the queue bandwidth based on the bandwidth of the port corresponding to the target service level, the second maximum amount of data that can be forwarded at the target service level after the parameter of the target service level is adjusted, and the maximum amount of data that can be forwarded at each of the plurality of service levels before the parameter of the target service level is adjusted; and determining the second update value of the queue buffer based on the maximum amount of data that can be forwarded at each of the plurality of service levels before the parameter of the target service level is adjusted, the maximum packet length of the queue corresponding to each of the plurality of service levels, the second update value of the threshold of the burst amount of the data flow, and the second update value of the threshold of the average rate of the data flow.

In a possible implementation, the determining the second update value of the queue bandwidth based on the bandwidth of the port corresponding to the target service level, the second maximum amount of data that can be forwarded at the target service level after the parameter of the target service level is adjusted, and the maximum amount of data that can be forwarded at each of the plurality of service levels before the parameter of the target service level is adjusted includes: determining, based on the bandwidth of the port corresponding to the target service level, the second maximum amount of data that can be forwarded at the target service level after the parameter of the target service level is adjusted, and the maximum amount of data that can be forwarded at each service level before the parameter of the target service level is adjusted, the second update value $C_{i2}^2$ of the queue bandwidth according to the following formula:

$$C_{i2}^2 = C \frac{Q_{i2}^2}{\sum_{1 \le j \le n, j \ne i} Q_j + Q_i^1 + Q_{n+1}^1}$$

In a possible implementation, the determining the second update value of the queue buffer based on the maximum amount of data that can be forwarded at each of the plurality of service levels before the parameter of the target service level is adjusted, the maximum packet length of the queue corresponding to each of the plurality of service levels, the second update value of the threshold of the burst amount of the data flow, and the second update value of the threshold of the average rate of the data flow includes: determining, based on the maximum amount of data that can be forwarded at each of the plurality of service levels before the parameter of the target service level is adjusted, the maximum packet length of the queue corresponding to each of the plurality of service levels, the second update value of the threshold of the burst amount of the data flow, and the second update value of the threshold of the average rate of the data flow, the second update value $BF_{i2}^2$ of the queue buffer according to the following formula:

$$BF_{i2}^2 = \left( \frac{L_{max,L} + \sum_{1 \le j \le n, j \ne i} (L_j + Q_j) + L_{n+1} + Q_{n+1}^2}{C} + \frac{L_i \left( \sum_{1 \le j \le n, j \ne i} Q_j + Q_{n+1}^2 \right)}{CQ_{i2}^2} \right) * r_{i2}^2 + b_{i2}^2$$

Herein, C is the bandwidth of the port corresponding to the target service level, $Q_{i2}^2$ is the second maximum amount of data that can be forwarded at the target service level after the parameter of the target service level is adjusted, $Q_j$ is a maximum amount of data that can be forwarded at a $j^{th}$ service level, $Q_i^1$ is a maximum amount of data that can be forwarded at the target service level before the parameter of the target service level is adjusted, $Q_{n+1}^1$ is a maximum amount of data that can be forwarded in a non-delay-guarantee queue before the parameter of the target service level is adjusted, $L_{max,L}$ is a maximum packet length of a low-priority queue, $L_{n+1}$ is a maximum packet length of the non-delay-guarantee queue, $L_j$ is a maximum packet length of a queue at the $j^{th}$ service level, $b_{i2}^2$ is the second update value of the threshold of the burst amount of the data flow, $b_{i2}^2 = b_i^1 + \Delta b_{i2}$, $b_i^1$ is the threshold of the burst amount of the data flow that exists before the parameter of the target service level is adjusted, $\Delta b_{i2}$ is a value by which the threshold of the burst amount of the data flow is increased, $r_{i2}^2$ is the second update value of the threshold of the average rate of the data flow, $r_{i2}^2 = r_i^1 + \Delta r_{i2}$, $r_i^1$ is the threshold of the average rate of the data flow that exists before the parameter of the target service level is adjusted, $\Delta r_{i2}$ is a value by which the threshold of the average rate of the data flow is increased, $L_i$ is a maximum packet length of a queue at the target service level, and n, i, and j are positive integers.

In a possible implementation, the second update value of the data flow constraint parameter includes a second update value of a threshold of a burst amount of a data flow and a second update value of a threshold of an average rate of the data flow. The determining a third update value of the queue resource parameter based on the second update value of the data flow constraint parameter includes: determining a bandwidth of a port corresponding to the target service level, a third maximum amount of data that can be forwarded at the target service level after the parameter of the target service level is adjusted, a maximum amount of data that can be forwarded at each of a plurality of service levels of the first network device before the parameter of the target service level is adjusted, and a maximum packet length of a queue corresponding to each of the plurality of service levels; determining a third update value of a queue bandwidth based on the bandwidth of the port corresponding to the target service level, the third maximum amount of data that can be forwarded at the target service level after the parameter of the target service level is adjusted, and the maximum amount of data that can be forwarded at each of the plurality of service levels before the parameter of the target service level is adjusted; and determining a third update value of a queue buffer based on the maximum amount of data that can be forwarded at each of the plurality of service levels before the parameter of the target service level is adjusted, the maximum packet length of the queue corresponding to each of the plurality of service levels, a maximum amount of data that can be forwarded after the service level of the resource that can be preempted is adjusted, a maximum packet length, the second update value of the threshold of the burst amount of the data flow, and the second update value of the threshold of the average rate of the data flow.

The determining an update value of a parameter of a service level of a resource that can be preempted includes: determining, based on the bandwidth of the port corresponding to the target service level, the maximum amount of data that can be forwarded after the service level of the resource that can be preempted is adjusted, and the maximum amount of data that can be forwarded at each of the plurality of service levels before the parameter of the target service level is adjusted, an update value of a queue bandwidth of the service level of the resource that can be preempted; and determining, based on the maximum amount of data that can be forwarded at each of the plurality of service levels before the parameter of the target service level is adjusted, the maximum packet length of the queue corresponding to each of the plurality of service levels, the maximum amount of data that can be forwarded after the service level of the resource that can be preempted is adjusted, the maximum packet length, an update value of a threshold that is of a burst amount of a data flow and that is of the service level of the resource that can be preempted, and an update value of a threshold of an average rate of the data flow, an update value of a queue buffer of the service level of the resource that can be preempted.

In a possible implementation, the determining a third update value of a queue bandwidth based on the bandwidth of the port corresponding to the target service level, the third maximum amount of data that can be forwarded at the target service level after the parameter of the target service level is adjusted, and the maximum amount of data that can be forwarded at each of the plurality of service levels before the parameter of the target service level is adjusted includes: determining, based on the bandwidth of the port corresponding to the target service level, the third maximum amount of data that can be forwarded at the target service level after the parameter of the target service level is adjusted, and the maximum amount of data that can be forwarded at each of the plurality of service levels before the parameter of the target service level is adjusted, the third update value $C_i^2$ of the queue bandwidth according to the following formula:

$$C_i^2 = C \frac{Q_i^2}{\sum_{1 \le j \le n, j \ne i} Q_j + Q_i^1 + Q_{n+1}^1};$$

determining, based on the bandwidth of the port corresponding to the target service level, the maximum amount of data that can be forwarded after the service level of the resource that can be preempted is adjusted, and the maximum amount of data that can be forwarded at each of the plurality of service levels before the parameter of the target service level is adjusted and according to the following formula, the queue bandwidth $C_k^2$ of the service level of the resource that can be preempted:

$$C_k^2 = C \frac{Q_k^2}{\sum_{1 \le j \le n, j \ne i} Q_j + Q_i^1 + Q_{n+1}^1}$$

In a possible implementation, the determining a third update value of a queue buffer based on the maximum amount of data that can be forwarded at each of the plurality of service levels before the parameter of the target service level is adjusted, the maximum packet length of the queue corresponding to each of the plurality of service levels, the second update value of the threshold of the burst amount of the data flow, and the second update value of the threshold of the average rate of the data flow includes: determining, based on the maximum amount of data that can be forwarded at each of the plurality of service levels before the parameter of the target service level is adjusted, the maximum packet length of the queue corresponding to each of the plurality of service levels, the maximum amount of data that can be forwarded after the service level of the resource that can be preempted is adjusted, the maximum packet length, the second update value of the threshold of the burst amount of the data flow, and the second update value of the threshold of the average rate of the data flow, the third update value $BF_i^2$ of the queue buffer according to the following formula:

$$BF_i^2 = \left( \frac{L_{max,L} + \sum_{1 \le j \le n, j \ne i, j \ne k} (L_j + Q_j) + L_k + Q_k^2 + L_{n+1} + Q_{n+1}^2}{C} + \frac{L_i \left( \sum_{1 \le j \le n, j \ne i, j \ne k} Q_j + Q_k^2 + Q_{n+1}^2 \right)}{CQ_i^2} \right) * r_{i2}^2 + b_{i2}^2;$$

and determining, based on the maximum amount of data that can be forwarded at each of the plurality of service levels before the parameter of the target service level is adjusted, the maximum packet length of the queue corresponding to each of the plurality of service levels, the maximum amount of data that can be forwarded after the service level of the resource that can be preempted is adjusted, the maximum packet length, the update value of the threshold that is of the burst amount of the data flow and that is of the service level of the resource that can be preempted, and the update value of the threshold of the average rate of the data flow and according to the following formula, the queue buffer $BF_k^2$ of the service level of the resource that can be preempted:

$$BF_k^2 = \left( \frac{L_{max,L} + \sum_{1 \le j \le n, j \ne i, j \ne k} (L_j + Q_j) + L_i + Q_i^2 + L_{n+1} + Q_{n+1}^2}{C} + \frac{L_k \left( \sum_{1 \le j \le n, j \ne i, j \ne k} Q_j + Q_i^2 + Q_{n+1}^2 \right)}{CQ_k^2} \right) * r_k^2 + b_k^2$$

Herein, C is the bandwidth of the port corresponding to the target service level, $Q_i^2$ is the third maximum amount of data that can be forwarded at the target service level after the parameter of the target service level is adjusted, $Q_k^2$ is a maximum amount of data that can be forwarded after the service level of the resource that can be preempted is adjusted, $Q_j$ is a maximum amount of data that can be forwarded at a $j^{th}$ service level, $Q_j$ is a maximum amount of data that can be forwarded before the parameter of the target service level is adjusted, $Q_{n+1}^1$ is a maximum amount of data that can be forwarded in a non-delay-guarantee queue before the parameter of the target service level is adjusted, $L_{max,L}$ is a maximum packet length of a low-priority queue, $L_{n+1}$ is a maximum packet length of the non-delay-guarantee queue, $L_j$ is a maximum packet length of a queue at the $j^{th}$ service level, $b_{i2}^2$ is the second update value of the threshold of the burst amount of the data flow, $b_{i2}^2 = b_i^1 + \Delta b_{i2}$, $b_i^1$ is the threshold of the burst amount of the data flow that exists before the parameter of the target service level is adjusted, $\Delta b_{i2}$ is a value by which the threshold of the burst amount of the data flow is increased, $r_{i2}^2$ is the second update value of the threshold of the average rate of the data flow, $r_{i2}^2 = r_i^1 + \Delta r_{i2}$, $r_i^1$ is the threshold of the average rate of the data flow that exists before the parameter of the target service level is adjusted, $\Delta r_{i2}$ is a value by which the threshold of the average rate of the data flow is increased, $L_i$ is a maximum packet length of a queue at the target service level, $L_k$ is a maximum packet length of a queue at the service level of the resource that can be preempted, $Q_k^2$ is a maximum amount of data that can be forwarded after the service level of the resource that can be preempted is adjusted, $Q_{n+1}^2$ is a maximum amount of data that can be forwarded in the non-delay-guarantee queue after the parameter of the target service level is adjusted, $r_k^2$ is the update value of the threshold that is of the average rate of the data flow and that is of the service level of the resource that can be preempted, $b_k^2$ is the update value of the threshold that is of the burst amount of the data flow and that is of the service level of the resource that can be preempted, and n, i, and j are positive integers.

In a possible implementation, after the first network device adjusts the parameter of the target service level, the method further includes: The control device sends an update value of the adjusted parameter of the target service level to the first network device, to indicate the first network device to adjust the parameter of the target service level based on the update value of the parameter of the target service level.

In a possible implementation, that a control device obtains related information of a target service level of a first network device includes: The control device receives, in a preset period, the related information that is of the target service level and that is sent by the first network device.

According to a second aspect, a service level adjustment apparatus is provided. The apparatus includes: an obtaining module, configured to obtain related information of a target service level of a first network device, where the related information includes at least one piece of information in at least one piece of queue status information, a remaining data flow parameter, a current data flow parameter, and a quantity of reporting times of exception information of the target service level; and an adjustment module, configured to adjust, when any information in the related information does not meet a threshold corresponding to the any information, a parameter of the target service level based on a maximum delay associated with the target service level.

In a possible implementation, the related information includes the at least one piece of queue status information of the target service level. The adjustment module is configured to adjust, when any one of the at least one piece of queue status information is less than a threshold lower limit corresponding to the any queue status information, the parameter of the target service level based on the maximum delay associated with the target service level.

In a possible implementation, the related information includes the current data flow parameter of the target service level.

The adjustment module is configured to adjust, when the current data flow parameter of the target service level is less than a threshold lower limit corresponding to the current data flow parameter, the parameter of the target service level based on the maximum delay associated with the target service level.

In a possible implementation, the related information includes the remaining data flow parameter of the target service level.

The adjustment module is configured to adjust, when the remaining data flow parameter of the target service level exceeds a threshold upper limit corresponding to the remaining data flow parameter, the parameter of the target service level based on the maximum delay associated with the target service level.

In a possible implementation, the parameter of the target service level includes a queue resource parameter and a data flow constraint parameter. The adjustment module is configured to: determine a first update value of the data flow constraint parameter; determine a first update value of the queue resource parameter based on the first update value of the data flow constraint parameter when the maximum delay remains unchanged; and adjust the data flow constraint parameter based on the first update value of the data flow constraint parameter, and adjust the queue resource parameter based on the first update value of the queue resource parameter.

In a possible implementation, the first update value of the queue resource parameter includes a first update value of a queue bandwidth and a first update value of a queue buffer, and the first update value of the data flow constraint parameter includes a first update value of a threshold of a burst amount of a data flow and a first update value of a threshold of an average rate of the data flow.

The adjustment module is configured to: when the maximum delay remains unchanged, determine a bandwidth of a port corresponding to the target service level, a first maximum amount of data that can be forwarded at the target service level after the parameter of the target service level is adjusted, a maximum amount of data that can be forwarded at each of a plurality of service levels of the first network device before the parameter of the target service level is adjusted, and a maximum packet length of a queue corresponding to each of the plurality of service levels; determine the first update value of the queue bandwidth based on the bandwidth of the port corresponding to the target service level, the first maximum amount of data that can be forwarded at the target service level after the parameter of the target service level is adjusted, and the maximum amount of data that can be forwarded at each of the plurality of service levels before the parameter of the target service level is adjusted; and determine the first update value of the queue buffer based on the maximum amount of data that can be forwarded at each of the plurality of service levels before the parameter of the target service level is adjusted, the maximum packet length of the queue corresponding to each of the plurality of service levels, the first update value of the threshold of the burst amount of the data flow, and the first update value of the threshold of the average rate of the data flow.

In a possible implementation, the adjustment module is configured to determine, based on the bandwidth of the port corresponding to the target service level, the first maximum amount of data that can be forwarded at the target service level after the parameter of the target service level is adjusted, and the maximum amount of data that can be forwarded at each of the plurality of service levels before the parameter of the target service level is adjusted, the first update value $C_{i1}^2$ of the queue bandwidth according to the following formula:

$$C_{i1}^2 = C \frac{Q_{i1}^2}{\sum_{1 \le j \le n, j \ne i} Q_j + Q_i^1 + Q_{n+1}^1}$$

In a possible implementation, the adjustment module is configured to determine, based on the maximum amount of data that can be forwarded at each of the plurality of service levels before the parameter of the target service level is adjusted, the maximum packet length of the queue corresponding to each of the plurality of service levels, the first update value of the threshold of the burst amount of the data flow, and the first update value of the threshold of the average rate of the data flow, the first update value $BF_{i1}^2$ of the queue buffer according to the following formula:

$$BF_{i1}^2 = \left( \frac{L_{max,L} + \sum_{1 \le j \le n, j \ne i}(L_j + Q_j) + L_{n+1} + Q_{n+1}^2}{C} + \frac{L_i\left(\sum_{1 \le j \le n, j \ne i} Q_j + Q_{n+1}^2\right)}{CQ_{i1}^2} \right) * r_{i1}^2 + b_{i1}^2$$

In a possible implementation, the related information includes the at least one piece of queue status information of the target service level. The adjustment module is configured to adjust, when any one of the at least one piece of queue status information exceeds a threshold upper limit corresponding to the any queue status information, the parameter of the target service level based on the maximum delay associated with the target service level.

In a possible implementation, the related information includes the current data flow parameter of the target service level.

The adjustment module is configured to adjust, when the current data flow parameter of the target service level exceeds a threshold upper limit corresponding to the current data flow parameter, the parameter of the target service level based on the maximum delay associated with the target service level.

In a possible implementation, the related information includes the remaining data flow parameter of the target service level.

The adjustment module is configured to adjust, when the remaining data flow parameter of the target service level is less than a threshold lower limit corresponding to the remaining data flow parameter, the parameter of the target service level based on the maximum delay associated with the target service level.

In a possible implementation, the related information includes the quantity of reporting times of the exception information of the target service level.

The adjustment module is configured to adjust, when the quantity of reporting times of the exception information of the target service level exceeds a threshold upper limit corresponding to the quantity of reporting times of the exception information, the parameter of the target service level based on the maximum delay associated with the target service level.

In a possible implementation, the parameter of the target service level includes a queue resource parameter and a data flow constraint parameter. The adjustment module is configured to: determine a second update value of the data flow constraint parameter; determine a second update value of the queue resource parameter based on the second update value of the data flow constraint parameter when the maximum delay remains unchanged; and when the second update value of the queue resource parameter is less than or equal to a resource threshold, adjust the data flow constraint parameter based on the second update value of the data flow constraint parameter, and adjust the queue resource parameter based on the second update value of the queue resource parameter.

In a possible implementation, the configuration parameter of the target service level includes a queue resource parameter and a data flow constraint parameter. The adjustment module is configured to: determine a second update value of the data flow constraint parameter; determine a second update value of the queue resource parameter based on the second update value of the data flow constraint parameter when the maximum delay remains unchanged; and when the second update value of the queue resource parameter is greater than a resource threshold, switch a target data flow corresponding to the target service level to a data flow corresponding to another service level, where the another service level includes another service level of the first network device or a service level of another device.

In a possible implementation, the configuration parameter of the target service level includes a queue resource parameter and a data flow constraint parameter. The adjustment module is configured to: determine a second update value of the data flow constraint parameter; and determine a second update value of the queue resource parameter based on the second update value of the data flow constraint parameter when the maximum delay remains unchanged; when the second update value of the queue resource parameter is greater than a resource threshold, determine a third update value of the queue resource parameter based on the second update value of the data flow constraint parameter, and determine an update value of a parameter of a service level of a resource that can be preempted, where the update value of the parameter of the service level of the resource that can be preempted is used to enable the third update value of the queue resource parameter to meet a constraint condition; and adjust the data flow constraint parameter based on the second update value of the data flow constraint parameter, adjust the queue resource parameter based on the third update value of the queue resource parameter, and adjust, based on the update value of the parameter of the service level of the resource that can be preempted, the parameter of the service level of the resource that can be preempted.

In a possible implementation, the second update value of the queue resource parameter includes a second update value of a queue bandwidth and a second update value of a queue buffer, and the second update value of the data flow constraint parameter includes a second update value of a threshold of a burst amount of a data flow and a second update value of a threshold of an average rate of the data flow.

The adjustment module is configured to: when the maximum delay remains unchanged, determine a bandwidth of a port corresponding to the target service level, a second maximum amount of data that can be forwarded at the target service level after the parameter of the target service level is adjusted, a maximum amount of data that can be forwarded at each of a plurality of service levels of the first network device before the parameter of the target service level is adjusted, and a maximum packet length of a queue corresponding to each of the plurality of service levels; determine the second update value of the queue bandwidth based on the bandwidth of the port corresponding to the target service level, the second maximum amount of data that can be forwarded at the target service level after the parameter of the target service level is adjusted, and the maximum amount of data that can be forwarded at each of the plurality of service levels before the parameter of the target service level is adjusted; and determine the second update value of the queue buffer based on the maximum amount of data that can be forwarded at each of the plurality of service levels before the parameter of the target service level is adjusted, the maximum packet length of the queue corresponding to each of the plurality of service levels, the second update value of the threshold of the burst amount of the data flow, and the second update value of the threshold of the average rate of the data flow.

In a possible implementation, the adjustment module is configured to determine, based on the bandwidth of the port corresponding to the target service level, the second maximum amount of data that can be forwarded at the target service level after the parameter of the target service level is adjusted, and the maximum amount of data that can be forwarded at each service level before the parameter of the target service level is adjusted, the second update value $C_{i2}^2$ of the queue bandwidth according to the following formula:

$$C_{i2}^2 = C \frac{Q_{i2}^2}{\sum_{1 \leq j \leq n, j \neq i} Q_j + Q_i^1 + Q_{n+1}^1}$$

In a possible implementation, the adjustment module is configured to determine, based on the maximum amount of data that can be forwarded at each of the plurality of service levels before the parameter of the target service level is adjusted, the maximum packet length of the queue corresponding to each of the plurality of service levels, the second update value of the threshold of the burst amount of the data flow, and the second update value of the threshold of the average rate of the data flow, the second update value $BF_{i2}^2$ of the queue buffer according to the following formula:

$$BF_{i2}^2 = \left( \frac{L_{max,L} + \sum_{1 \leq j \leq n, j \neq i}(L_j + Q_j) + L_{n+1} + Q_{n+1}^2}{C} + \frac{L_i\left(\sum_{1 \leq j \leq n, j \neq i} Q_j + Q_{n+1}^2\right)}{CQ_{i2}^2} \right) * r_{i2}^2 + b_{i2}^2$$

In a possible implementation, the second update value of the data flow constraint parameter includes a second update value of a threshold of a burst amount of a data flow and a second update value of a threshold of an average rate of the data flow.

The adjustment module is configured to: determine a bandwidth of a port corresponding to the target service level, a third maximum amount of data that can be forwarded at the target service level after the parameter of the target service level is adjusted, a maximum amount of data that can be forwarded at each of a plurality of service levels of the first network device before the parameter of the target service level is adjusted, and a maximum packet length of a queue corresponding to each of the plurality of service levels; determine a third update value of a queue bandwidth based on the bandwidth of the port corresponding to the target service level, the third maximum amount of data that can be forwarded at the target service level after the parameter of the target service level is adjusted, and the maximum amount of data that can be forwarded at each of the plurality of service levels before the parameter of the target service level is adjusted; and determine a third update value of a queue buffer based on the maximum amount of data that can be forwarded at each of the plurality of service levels before the parameter of the target service level is adjusted, the maximum packet length of the queue corresponding to each of the plurality of service levels, a maximum amount of data that can be forwarded after the service level of the resource that can be preempted is adjusted, a maximum packet length, the second update value of the threshold of the burst amount of the data flow, and the second update value of the threshold of the average rate of the data flow.

The adjustment module is configured to: determine, based on the bandwidth of the port corresponding to the target service level, the maximum amount of data that can be forwarded after the service level of the resource that can be preempted is adjusted, and the maximum amount of data that can be forwarded at each of the plurality of service levels before the parameter of the target service level is adjusted, an update value of a queue bandwidth of the service level of the resource that can be preempted; and determine, based on the maximum amount of data that can be forwarded at each of the plurality of service levels before the parameter of the target service level is adjusted, the maximum packet length of the queue corresponding to each of the plurality of service levels, the maximum amount of data that can be forwarded after the service level of the resource that can be preempted is adjusted, the maximum packet length, an update value of a threshold that is of a burst amount of a data flow and that is of the service level of the resource that can be preempted, and an update value of a threshold of an average rate of the data flow, an update value of a queue buffer of the service level of the resource that can be preempted.

In a possible implementation, the adjustment module is configured to: determine, based on the bandwidth of the port corresponding to the target service level, the third maximum amount of data that can be forwarded at the target service level after the parameter of the target service level is adjusted, and the maximum amount of data that can be forwarded at each of the plurality of service levels before the parameter of the target service level is adjusted, the third update value $C_i$ of the queue bandwidth according to the following formula:

$$C_i^2 = C \frac{Q_i^2}{\Sigma_{1 \leq j \leq n, j \neq i} Q_j + Q_i^1 + Q_{n+1}^1};$$

and determine, based on the bandwidth of the port corresponding to the target service level, the maximum amount of data that can be forwarded after the service level of the resource that can be preempted is adjusted, and the maximum amount of data that can be forwarded at each of the plurality of service levels before the parameter of the target service level is adjusted and according to the following formula, the queue bandwidth $C_k^2$ of the service level of the resource that can be preempted:

$$C_k^2 = C \frac{Q_k^2}{\Sigma_{1 \leq j \leq n, j \neq i} Q_j + Q_i^1 + Q_{n+1}^1}$$

In a possible implementation, the adjustment module is configured to: determine, based on the maximum amount of data that can be forwarded at each of the plurality of service levels before the parameter of the target service level is adjusted, the maximum packet length of the queue corresponding to each of the plurality of service levels, the maximum amount of data that can be forwarded after the service level of the resource that can be preempted is adjusted, the maximum packet length, the second update value of the threshold of the burst amount of the data flow, and the second update value of the threshold of the average rate of the data flow, the third update value $BF_i^2$ of the queue buffer according to the following formula:

$$BF_i^2 = \left( \frac{L_{max,L} + \sum_{1 \leq j \leq n, j \neq i, j \neq k}(L_j + Q_j) + L_k + Q_k^2 + L_{n+1} + Q_{n+1}^2}{C} + \frac{L_i\left(\sum_{1 \leq j \leq n, j \neq i, j \neq k} Q_j + Q_k^2 + Q_{n+1}^2\right)}{CQ_i^2} \right) * r_{i2}^2 + b_{i2}^2;$$

and determine, based on the maximum amount of data that can be forwarded at each of the plurality of service levels before the parameter of the target service level is adjusted, the maximum packet length of the queue corresponding to each of the plurality of service levels, the maximum amount of data that can be forwarded after the service level of the resource that can be preempted is adjusted, the maximum packet length, the update value of the threshold that is of the burst amount of the data flow and that is of the service level of the resource that can be preempted, and the update value of the threshold of the average rate of the data flow and according to the following formula, the queue buffer $BF_k^2$ of the service level of the resource that can be preempted:

$$BF_k^2 = \left( \frac{L_{max,L} + \sum_{1 \leq j \leq n, j \neq i, j \neq k}(L_j + Q_j) + L_i + Q_i^2 + L_{n+1} + Q_{n+1}^2}{C} + \right.$$

-continued $$\frac{L_k\left(\Sigma_{1 \le j \le n, j \ne i, j \ne k} Q_j + Q_i^2 + Q_{n+1}^2\right)}{CQ_k^2}\right) * r_k^2 + b_k^2$$

In a possible implementation, the apparatus further includes:

a sending module, configured to send an update value of the adjusted parameter of the target service level to the first network device, to indicate the first network device to adjust the parameter of the target service level based on the update value of the parameter of the target service level.

In a possible implementation, the obtaining module is configured to receive, in a preset period, the related information that is of the target service level and that is sent by the first network device.

It should be noted that, for meanings of the parameters in the formulas in any one of the second aspect or the implementations, refer to the first aspect and related descriptions of the first aspect. Details are not described herein again.

According to a third aspect, a network device is provided, and performs the method according to any one of the first aspect or the implementations of the first aspect. For example, the network device includes units configured to perform the method according to the implementations of the first aspect.

According to a fourth aspect, a computer-readable storage medium is provided. The computer-readable storage medium stores a computer program or instructions, and when the computer program or the instructions are executed on a computer, the computer is enabled to perform the method according to any one of the first aspect or the implementations of the first aspect.

According to a fifth aspect, a network device is provided. The network device includes a memory and a processor, the memory stores a computer program or at least one instruction, and the computer program or the at least one instruction is loaded and executed by the processor, to implement the method according to any one of the first aspect or the implementations of the first aspect.

According to a sixth aspect, a communications apparatus is provided. The apparatus includes a transceiver, a memory, and a processor. The transceiver, the memory, and the processor communicate with each other through an internal connection channel, the memory is configured to store a computer program or instructions, and the processor is configured to execute the computer program or the instructions stored in the memory, to control the transceiver to receive a signal and control the transceiver to send a signal. In addition, when the processor executes the instructions stored in the memory, the processor is enabled to perform the method according to any one of the first aspect or the possible implementations of the first aspect.

In an example embodiment, there are one or more processors, and there are one or more memories.

In an example embodiment, the memory may be integrated with the processor, or the memory is disposed independently of the processor.

In a specific implementation process, the memory may be a non-transitory (non-transitory) memory, for example, a read-only memory (read-only memory, ROM). The memory and the processor may be integrated into a same chip, or may be disposed in different chips. A type of the memory and a manner in which the memory and the processor are disposed are not limited in this embodiment of this application.

According to a seventh aspect, a computer program (product) is provided. The computer program (product) includes computer program code, and when the computer program code is run by a computer, the computer is enabled to perform the method according to any one of the first aspect or the possible implementations of the first aspect.

According to an eighth aspect, a chip is provided, and includes a processor. The processor is configured to: invoke a computer program or instructions stored in a memory from the memory and run the computer program or the instructions, so that a communications device on which the chip is installed performs the method according to any one of the first aspect or the possible implementations of the first aspect.

According to a ninth aspect, another chip is provided, and includes an input interface, an output interface, a processor, and a memory. The input interface, the output interface, the processor, and the memory are connected to each other through an internal connection channel. The processor is configured to execute code in the memory. When the code is executed, the processor is configured to perform the method according to any one of the first aspect or the possible implementations of the first aspect.

According to a tenth aspect, a service level adjustment system is provided, and includes the control device and the first network device according to any one of the second aspect or the possible implementations of the second aspect. The first network device is configured to send related information of a target service level to the control device, where the related information of the target service level includes at least one piece of information in at least one piece of queue status information, a remaining data flow parameter, a current data flow parameter, and a quantity of reporting times of exception information of the target service level.

DETAILED DESCRIPTION OF ILLUSTRATIVE EMBODIMENTS

To ensure an end-to-end delay requirement of a service data flow, conventional network quality of service (QoS) guarantee is implemented by using an integrated service (IntServ) model and a differentiated service (DiffServ) model. The IntServ model relies on a network device in a network to perform per-flow status maintenance, resource reservation, and admission control. In the DiffServ model, a network device does not need to perform per-flow maintenance on a service data flow. Instead, the network device performs a priority-based per-hop behavior forwarding operation on a packet based on a differentiated service type carried in the packet.

However, the IntServ model can ensure end-to-end QoS of a service, but has poor scalability and cannot be deployed in a large scale. Although the DiffServ model has good scalability, the DiffServ model cannot provide a deterministic forwarding capability due to relative characteristics of a priority policy of the network device. As a result, the end-to-end delay requirement of the service data flow cannot be strictly met. Therefore, neither of the two models can ensure the end-to-end delay on a current large-scale IP network. In addition, in a current SLA-based QoS technology for ensuring an end-to-end delay, a service-level-based technology for dynamically adjusting QoS is not considered when a service requirement, a real-time data flow, a network status, and the like change. Keeping static QoS settings unchanged cannot ensure that the QoS settings are still optimal when related conditions change.

Therefore, embodiments of this application provide a service level adjustment method, so that based on changes of a service deployment status (for example, a current data flow parameter and a remaining data flow parameter), queue status information, a quantity of reporting times of exception information, and the like, parameter configurations of a service level such as queue resource allocation and a data flow admission constraint can be dynamically updated, and a service level through which a data flow passes can be dynamically switched, to further improve network resource utilization while ensuring an end-to-end delay requirement of a service.

Figure 1:
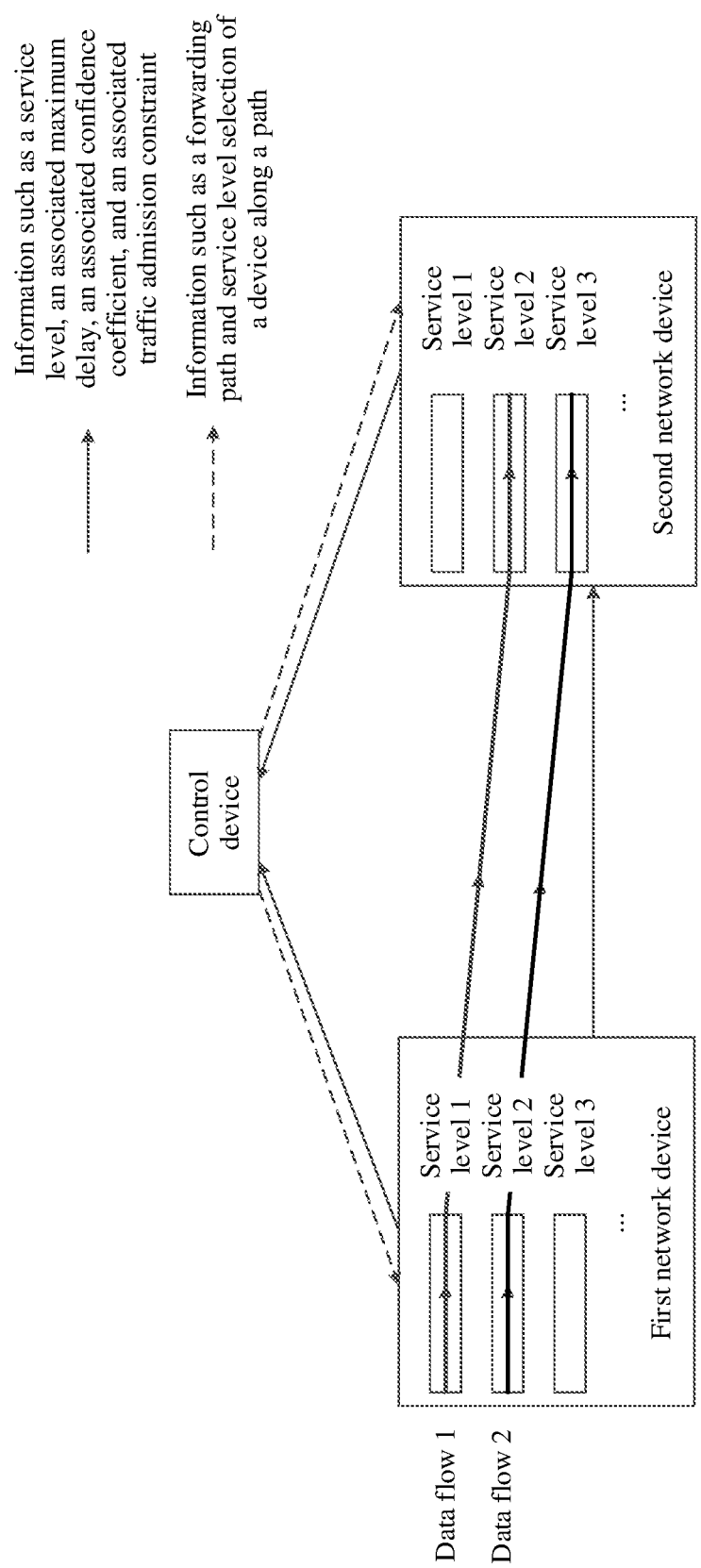
FIG. 1 is a schematic diagram of a service level adjustment scenario according to an embodiment of this application.

The following describes a service level adjustment method by using a schematic diagram of a scenario shown in FIG. 1 as an example. In FIG. 1, two network devices and one control device are included. The network devices are respectively a first network device and a second network device. Egress ports that are of the first network device and the second network device and on which service data flows are sent each maintain one or more service levels, and allocate corresponding resources such as a bandwidth and a buffer to a queue bound to the service level. The first network device and the second network device are network devices on a path for transmitting a data flow having a delay requirement. The first network device and the second network device each report, to the control device, one or more pieces of information such as a service level of the network device, an associated maximum delay, an associated confidence coefficient, and an associated data flow admission constraint. The controller obtains a subscribed committed service parameter of a service data flow, including one or more pieces of information such as a maximum allowable burst amount and a maximum allowable average rate. The control device performs service deployment based on the obtained information, including selecting a forwarding path and selecting a service level to be entered by each hop of network device on the path, to ensure that an end-to-end delay requirement of a service data flow is met, and ensure that the selected service level meets a data flow admission constraint of the selected service level. In an example, the control device delivers information such as the forwarding path and selection of each hop of service level to the network device, so that the service data flow is forwarded based on the specified path and the service level.

The control device may be an independent physical device shown in FIG. 1, that is, physically independent of the first network device and the second network device, or may be a functional unit deployed on the first network device or the second network device, provided that the control device has logically corresponding management and control functions. An existence form of the control device is not limited in this application. The first network device and the second network device may be in a form of hardware or a combination of software and hardware, each are an independent network device, for example, a network device having a forwarding function such as a switch or a router, and are configured to: receive and send a data flow in a network. Alternatively, the first network device and the second network device may be in a form of software, each are one functional module or a combination of a plurality of functional modules on another network device in a network, and may be selected and designed based on a specific scenario requirement.

Figure 2:
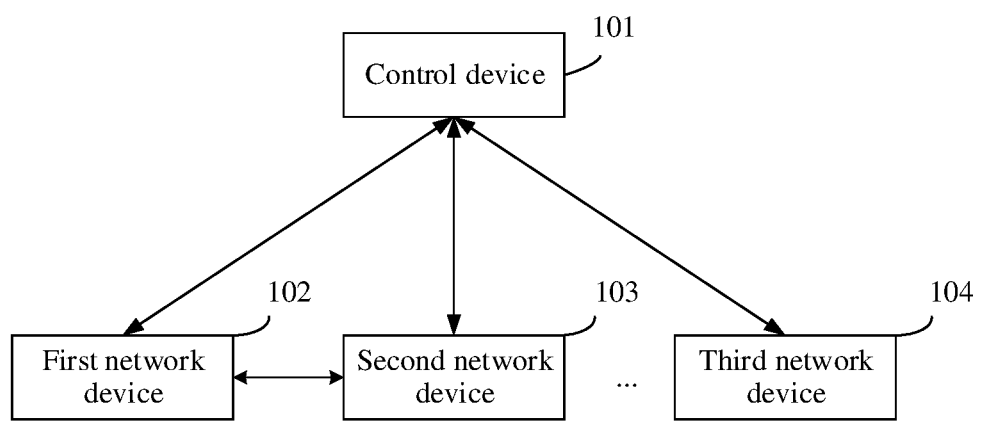
FIG. 2 is a schematic diagram of a service level adjustment scenario according to an embodiment of this application.

For another example, a network scenario shown in FIG. 2 is used as an example. The network scenario includes a control device 101 and several network devices. The several network devices include a first network device 102, a second network device 103, a third network device 104, and the like. It should be noted that, for functions of the several network devices, refer to descriptions of the first network device 102. For example, the first network device 102 is one or more routers or switches that have a packet forwarding function. The control device 101 may be in a form of a server, a network device, other software, a combination of software and hardware, or the like that has a function such as path computation or resource allocation. In this embodiment of this application, only an example in which the control device 101 is a controller is used for description.

In the network scenario shown in FIG. 2, one or more service levels are set on a port on which the first network device 102 forwards a data flow, and each service level provides a corresponding service forwarding capability. In other words, a deterministic service forwarding capability provided by the first network device 102 is defined as a service level of the first network device 102. Each service level is bound to one queue or one group of queues in the first network device 102. Each service level is associated with one delay threshold, for example, a maximum delay. The delay threshold represents a delay allowed in a process of forwarding, by the first network device 102, a data flow that is input into a queue bound to the service level. The delay threshold includes one or more of delays such as a queuing delay, a processing delay, and a sending delay of the first network device. The queuing delay is a time period required by a packet to enter a queue for queuing. For example, the queuing delay is a time period required by a packet to enter a queue of a downlink traffic manager for queuing. The sending delay is a time period required by a network device to send a packet, that is, a time period required from sending the first bit of the packet to completing sending of the last bit of the packet. The processing delay is a time period required by the network device to perform operations such as packet header parsing, error check, and route search after the network device receives a packet. In an example, the delay threshold is the queuing delay of the first network device. In another example, the delay threshold is a sum of the queuing delay, the processing delay, and the sending delay of the first network device.

Optionally, each service level may be further associated with a confidence coefficient, which is also referred to as a reliability probability. The confidence coefficient indicates a probability that a delay generated when a data flow passes through the service level does not exceed the delay threshold. By default, the confidence coefficient may be set to 100% or 1, indicating that the generated delay strictly does not exceed the delay threshold.

To ensure a maximum delay requirement committed by a service level, resources, including but not limited to a queue bandwidth, a queue buffer, and the like, need to be allocated to a queue bound to the service level. For example, in a round robin scheduling mechanism, the queue bandwidth is a value obtained by multiplying a ratio of a queue weight to a total weight by a bandwidth of an egress port. In addition, a constraint condition also needs to be set for a data flow that is input into a queue, and includes but is not limited to a threshold of a burst amount of the data flow entering the queue, a threshold of an average rate of the data flow, and the like. The threshold of the burst amount of the data flow is represented as a maximum amount of data that is of the data flow and that is allowed in a specified period of time, and the threshold of the average rate of the data flow is represented as a maximum value that is of the average rate of the data flow and that is allowed in a specified period of time. When the queue resource and the data flow constraint condition are specified, it can be ensured that a specific maximum delay requirement can be met when the data flow passes through the service level.

When an external condition changes, it may be considered to adjust and update parameter configurations of a service level such as queue resource allocation and a data flow admission constraint to improve resource utilization.

For example, for a target service level of the first network device 102, if it is determined that a large quantity of data flows enter the target service level, for example, reach a data flow admission constraint upper limit, resources such as a bandwidth and a buffer that are pre-allocated to the target service level are insufficient. In this case, allocation of queue resources, for example, a bandwidth and a buffer, to the target service level is increased while a maximum delay associated with the target service level remains unchanged. The data flow admission constraint may be further adjusted, for example, the threshold of the burst amount of the data flow or the threshold of the average rate of the data flow is increased. In this way, a bottleneck of the target service level can be eliminated, and more data flows can be accommodated, to improve resource utilization.

For another example, for a target service level of the first network device 102, if a small quantity of data flows pass through the target service level in a period of time, for example, far from reaching a data flow admission constraint upper limit, resources such as a bandwidth and a buffer that are pre-allocated to the target service level are idle. In this case, it may be considered to reduce allocation of resources, for example, a bandwidth and a buffer, to the target service level while a maximum delay associated with the target service level remains unchanged. The data flow admission constraint may be further adjusted. When a total quantity of local resources of the first network device is specified, a resource released from the target service level is transferred to another service level of the first network device, to increase resource allocation to the another service level. This helps these service levels accommodate more data flow requirements, to finally improve overall resource utilization.

In addition, it may be considered to adjust a service level of a deployed data flow along a path, that is, perform intra-device or even inter-device switching on a service level that is entered by the data flow along the path, to improve resource utilization.

For example, for a deployed data flow, if a target service level through which the data flow passes along a path approaches or reaches a data flow admission constraint upper limit, further deployment of more data flows is affected. It may be considered to switch the data flow from the target service level to an idle service level of this device or another device while ensuring that an end-to-end delay requirement of a service can still be met, to release a resource at an original location for deployment of another data flow, so as to improve overall resource utilization.

Figure 3:
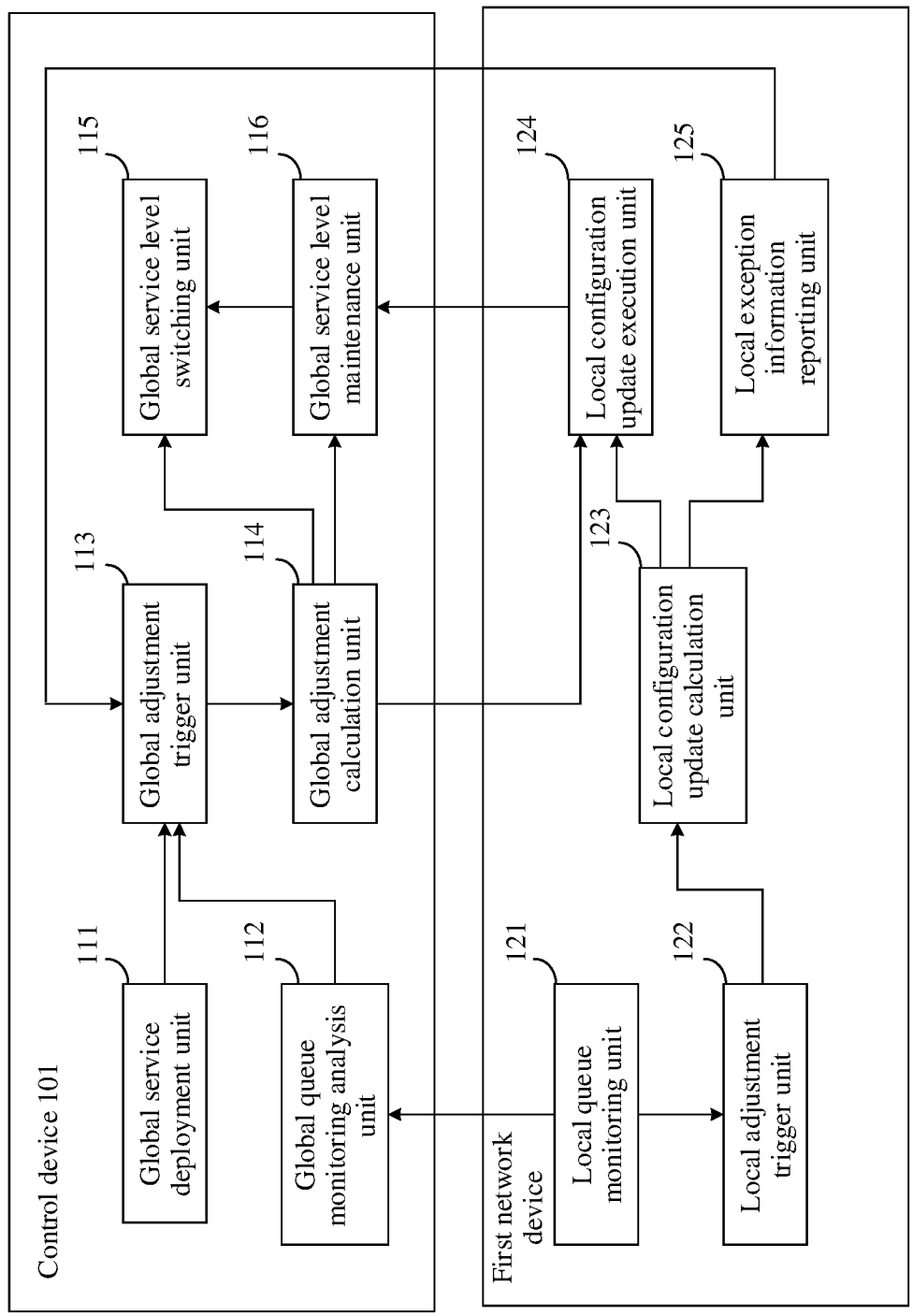
FIG. 3 is a schematic diagram of an architecture of a service level adjustment system according to an embodiment of this application.

A system architecture in an embodiment of this application is shown in FIG. 3. The system architecture includes unit modules of a control device 101 and a first network device 102. In this embodiment of this application, a first network device 102 in FIG. 3 is used as an example for description. For example, the control device 101 includes but is not limited to a global service deployment unit 111, a global queue monitoring analysis unit 112, a global adjustment trigger unit 113, a global adjustment calculation unit 114, a global service level switching unit 115, and a global service level maintenance unit 116. The first network device 102 includes but is not limited to a local queue monitoring unit 121, a local adjustment trigger unit 122, a local configuration update calculation unit 123, a local configuration update execution unit 124, and a local exception information reporting unit 125. For functions of the unit modules of the control device 101 and the first network device 102, refer to related descriptions of a method procedure shown in FIG. 5. In an example, the control device 101 and the first network device 102 are deployed in a same network device, and the network device includes functional modules or units shown in the control device 101 and the first network device 102.

The method provided in this embodiment of this application includes but is limited to: In a globally triggered QoS adjustment procedure, the controller determines, based on global service data flow admission, global queue monitoring analysis, or local exception information reporting, whether to trigger global QoS adjustment. If the controller determines to trigger QoS adjustment, the controller updates a service level, or switches a service level of a deployed data flow.

The control device 101 globally triggers a complete adjustment procedure, so that it can be ensured that delay degradation or a packet loss of the data flow in a network is not caused during the configuration update of the service level or the switching of the service level of the data flow. For example, the method provided in this embodiment of this application is applicable to an IP network based on packet statistical multiplexing, and helps improve applicability and effectiveness of a service-level-based solution for ensuring an end-to-end delay.

Figure 4:
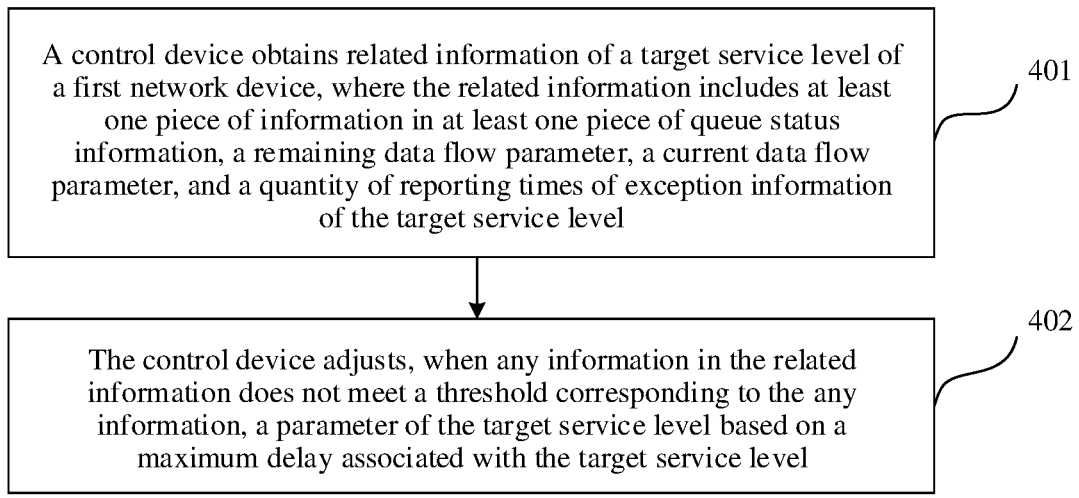
FIG. 4 is a schematic flowchart of a service level adjustment method according to an embodiment of this application.

The following describes, by using an example in which the control device globally triggers a procedure of dynamically adjusting a service level, a procedure of a service level adjustment method provided in an embodiment of this application. As shown in FIG. 4, the procedure of the method includes the following processes. Communication between a control device and a network device is implemented by using NETCONF.

401: A control device obtains related information of a target service level of a first network device, where the related information includes at least one piece of information in at least one piece of queue status information, a remaining data flow parameter, a current data flow parameter, and a quantity of reporting times of exception information of the target service level.

The control device monitors a service level of each network device, and obtains the related information of the target service level of the first network device, where the target service level may be understood as a monitored service level. In an example, the related information includes the at least one piece of queue status information of the target service level. In another example, the related information includes the remaining data flow parameter of the target service level. In another example, the related information includes the current data flow parameter of the target service level. In another example, the related information includes the quantity of reporting times of the exception information of the target service level.

For example, the first network device reports queue status information of a service level of the first network device to the control device in a specified period, and the control device obtains the queue status information of the target service level of the first network device.

For another example, the control device locally maintains a remaining data flow parameter and a current data flow parameter of a service level of each network device, to obtain the remaining data flow parameter and the current data flow parameter of the first network device. For example, the current data flow parameter includes but is not limited to a current burst amount and a current average rate of a data flow. The remaining data flow parameter includes but is not limited to a remaining burst amount and a remaining average rate of a data flow. The current data flow parameter may be reported by the network device to the control device, and the remaining data flow parameter is obtained by the control device based on the current data flow parameter.

For another example, the first network device reports the exception information to the control device when a local resource does not meet an update value of a configuration parameter of the target service level when a maximum delay remains unchanged. The exception information includes at least one of queue buffer occupation, a packet queuing delay, packet count information, and error information that exceed a threshold. Therefore, the control device obtains, through statistical collection, the quantity of reporting times of the exception information based on the abnormal quality of service information reported by the first network device.

402: The control device adjusts, when any information in the related information does not meet a threshold corresponding to the any information, a parameter of the target service level based on a maximum delay associated with the target service level.

Case 1: The related information of the target service level includes the at least one piece of queue status information of the target service level.

That the control device adjusts, when any information in the related information does not meet a threshold corresponding to the any information, a parameter of the target service level based on a maximum delay associated with the target service level includes:

Case 1A: The control device adjusts, when any one of the at least one piece of queue status information is less than a threshold lower limit corresponding to the any queue status information, the parameter of the target service level based on the maximum delay associated with the target service level. In an example embodiment, the control device sets one or more service levels on a port of each controlled network device, and the control device monitors a queue status indicator of each service level of each network device in real time, to obtain the at least one piece of queue status information of the target service level of the first network device.

For example, each service level is bound to one or more queues in the first network device, and the plurality of queues are referred to as a group of queues. If the target service level is bound to a group of queues in the first network device, the queue status information of the target service level is queue status information of one or more queues in the group of queues bound to the target service level, or the queue status information of the target service level is overall queue status information of the group of queues bound to the target service level.

The queue status information of the target service level includes but is not limited to at least one piece of queue status information such as local queue buffer occupation, a queuing delay, and a packet count. The queue buffer occupation represents a size of a buffer occupied by a packet in a queue bound to the target service level. The packet queuing delay represents a queuing delay of the packet in the queue bound to the target service level, and includes a time interval from a time point at which the packet enters a buffer to a time point at which the packet is scheduled. The packet count represents a data amount per unit time or a packet quantity per unit time of the packet in the queue bound to the target service level.

In an example, when the queue status information of the target service level is the overall queue status information of the group of queues bound to the target service level, for the queue buffer occupation, the overall queue status information refers to a sum of buffer occupation of the group of bound queues, that is, buffer occupation of queues in the group of bound queues is accumulated, and an obtained result is used as the overall queue status information; for the packet queuing delay, the overall queue status information refers to a largest value of packet queuing delays of queues in the group of bound queues, or an average value of packet queuing delays of queues in the group of bound queues; and for the packet count, the overall queue status information refers to a sum of packet counts of the group of bound queues, that is, packet counts of queues in the group of bound queues are accumulated, and an obtained result is used as the overall queue status information.

For example, the queue status information includes the local queue buffer occupation, the packet queuing delay, and the packet count. If it is detected that the local queue buffer occupation of the target service level is less than a threshold lower limit of the buffer occupation, the packet queuing delay is less than a threshold lower limit of the packet queuing delay, or the packet count is less than a threshold lower limit of the packet count, the control device is triggered to adjust the target service level based on the maximum delay associated with the target service level.

It should be noted that, if the target service level is bound to a group of queues in the first network device, when the queue status information of the target service level is queue status information of each queue in the group of queues bound to the target service level, a threshold lower limit corresponding to each piece of queue status information of the target service level may be set based on a single queue, and threshold lower limits corresponding to queue status information of queues in the group of queues may be the same or different. When the queue status information of the target service level is queue status information of the group of queues bound to the target service level, a threshold lower limit corresponding to each piece of queue status information of the target service level may be set based on a quantity of queues in the group of queues. In addition, another manner may be used. A threshold lower limit corresponding to each type of queue status information is not limited in this embodiment of this application. For example, the threshold lower limit of the buffer occupation, the threshold lower limit of the packet queuing delay, and the threshold lower limit of the packet count may be set based on experience, or may be set based on an application scenario.

Regardless of which type of queue status information exceeds the corresponding threshold lower limit, when the any one of the at least one piece of queue status information is less than the threshold lower limit corresponding to the any queue status information, the control device may be triggered to adjust the target service level.

In addition, in the method provided in this embodiment of this application, that the control device adjusts, when any one of the at least one piece of queue status information is less than a threshold lower limit corresponding to the any queue status information, the target service level based on the maximum delay associated with the target service level includes: The control device adjusts, when the any one of the at least one piece of queue status information is less than the threshold lower limit corresponding to the any queue status information within a first reference time period, the target service level based on the maximum delay associated with the target service level. Adjusting the target service level based on the maximum delay associated with the target service level is triggered after it is detected, within the first reference time period, that the any queue status information is less than the threshold lower limit corresponding to the any queue status information. This can avoid a case in which the target service level is repeatedly adjusted because the queue status information is repeatedly not less than the threshold lower limit corresponding to the queue status information, to further improve stability and accuracy of use of global resources.

Case 1B: The control device adjusts, when any one of the at least one piece of queue status information exceeds a threshold upper limit corresponding to the any queue status information, the parameter of the target service level based on the maximum delay associated with the target service level.

For example, each service level of the first network device is bound to one queue or one group of queues in the first network device. If the target service level is bound to a group of queues in the first network device, the queue status information of the target service level is queue status information of each queue in the group of queues bound to the target service level, or the queue status information of the target service level is queue status information of the group of queues bound to the target service level. The queue status information of the target service level includes but is not limited to at least one piece of queue status information such as local queue buffer occupation, a packet queuing delay, and a packet count.

For example, the queue status information includes the local queue buffer occupation, the packet queuing delay, and the packet count. If it is detected that the local queue buffer occupation of the target service level exceeds a threshold upper limit of the buffer occupation, the packet queuing delay exceeds a threshold upper limit of the packet queuing delay, or the packet count exceeds a threshold upper limit of the packet count, the control device is triggered to adjust the parameter of the target service level based on the maximum delay associated with the target service level.

In addition, in the method provided in this embodiment of this application, that the control device adjusts, when any one of the at least one piece of queue status information exceeds a threshold upper limit corresponding to the any queue status information, the target service level based on the maximum delay associated with the target service level includes: The control device adjusts, when the any one of the at least one piece of queue status information exceeds the threshold upper limit corresponding to the any queue status information within a second reference time period, the parameter of the target service level based on the maximum delay associated with the target service level. Adjusting the target service level based on the maximum delay associated with the target service level is triggered after it is detected, within the second reference time period, that the any queue status information exceeds the threshold upper limit corresponding to the any queue status information. This can avoid a case in which the parameter of the target service level is repeatedly adjusted because the queue status information is repeatedly less than or equal to the threshold lower limit corresponding to the queue status information, to further improve stability and accuracy of use of global resources.

Case 2: The related information of the target service level includes the current data flow parameter of the target service level.

That the control device adjusts, when any information in the related information does not meet a threshold corresponding to the any information, a parameter of the target service level based on a maximum delay associated with the target service level includes:

Case 2A: The control device adjusts, when the current data flow parameter of the target service level is less than a threshold lower limit corresponding to the current data flow parameter, the parameter of the target service level based on the maximum delay associated with the target service level.

In the method provided in this embodiment of this application, that the control device adjusts, when the current data flow parameter of the target service level is less than a threshold lower limit corresponding to the current data flow parameter, the parameter of the target service level based on the maximum delay associated with the target service level includes: The control device adjusts, when the current data flow parameter of the target service level is less than the threshold lower limit corresponding to the current data flow parameter within a third reference time period, the parameter of the target service level based on the maximum delay associated with the target service level. Adjusting the parameter of the target service level based on the maximum delay associated with the target service level is triggered after it is detected, within the third reference time period, that the current data flow parameter of the target service level is less than the threshold lower limit corresponding to the current data flow parameter. This can avoid a case in which the parameter of the target service level is repeatedly adjusted because the current data flow parameter of the target service level is repeatedly not less than the threshold lower limit corresponding to the current data flow parameter, to further improve stability and accuracy of use of resources.

Case 2B: The control device adjusts, when the current data flow parameter of the target service level exceeds a threshold upper limit corresponding to the current data flow parameter, the parameter of the target service level based on the maximum delay associated with the target service level.

In the method provided in this embodiment of this application, that the control device adjusts, when the current data flow parameter of the target service level exceeds a threshold upper limit corresponding to the current data flow parameter, the parameter of the target service level based on the maximum delay associated with the target service level includes: The control device adjusts, when the current data flow parameter of the target service level exceeds the threshold upper limit corresponding to the current data flow parameter within a fourth reference time period, the parameter of the target service level based on the maximum delay associated with the target service level. Adjusting the parameter of the target service level based on the maximum delay associated with the target service level is triggered after it is detected, within the fourth reference time period, that the current data flow parameter of the target service level exceeds the threshold upper limit corresponding to the current data flow parameter. This can avoid a case in which the parameter of the target service level is repeatedly adjusted because the current data flow parameter of the target service level is repeatedly less than or equal to the threshold upper limit corresponding to the current data flow parameter, to further improve stability and accuracy of use of resources.

Case 3: The related information of the target service level includes the remaining data flow parameter of the target service level.

That the control device adjusts, when any information in the related information does not meet a threshold corresponding to the any information, a parameter of the target service level based on a maximum delay associated with the target service level includes:

Case 3A: The control device adjusts, when the remaining data flow parameter of the target service level exceeds a threshold upper limit corresponding to the remaining data flow parameter, the parameter of the target service level based on the maximum delay associated with the target service level.

In the method provided in this embodiment of this application, that the control device adjusts, when the remaining data flow parameter of the target service level exceeds a threshold upper limit corresponding to the remaining data flow parameter, the parameter of the target service level based on the maximum delay associated with the target service level includes: The control device adjusts, when the remaining data flow parameter of the target service level exceeds the threshold upper limit corresponding to the remaining data flow parameter within a fifth reference time period, the target service level based on the maximum delay associated with the target service level. Adjusting the target service level based on the maximum delay associated with the target service level is triggered after it is detected, within the fifth reference time period, that the remaining data flow parameter of the target service level exceeds the threshold upper limit corresponding to the remaining data flow parameter of the target service level. This can avoid a case in which the target service level is repeatedly adjusted because the remaining data flow parameter of the target service level is repeatedly less than or equal to the threshold upper limit corresponding to the remaining data flow parameter of the target service level, to further improve stability and accuracy of use of resources.

Case 3B: The control device adjusts, when the remaining data flow parameter of the target service level is less than a threshold lower limit corresponding to the remaining data flow parameter, the parameter of the target service level based on the maximum delay associated with the target service level.

In the method provided in this embodiment of this application, that the control device adjusts, when the remaining data flow parameter of the target service level is less than a threshold lower limit corresponding to the remaining data flow parameter, the parameter of the target service level based on the maximum delay associated with the target service level includes: The control device adjusts, when the remaining data flow parameter of the target service level is less than the threshold lower limit corresponding to the remaining data flow parameter within a sixth reference time period, the target service level based on the maximum delay associated with the target service level. Adjusting the parameter of the target service level based on the maximum delay associated with the target service level is triggered after it is detected, within the sixth reference time period, that the remaining data flow parameter of the target service level is less than the threshold lower limit corresponding to the remaining data flow parameter of the target service level. This can avoid a case in which the parameter of the target service level is repeatedly adjusted because the remaining data flow parameter of the target service level is repeatedly not less than the threshold lower limit corresponding to the remaining data flow parameter of the target service level, to further improve stability and accuracy of use of resources.

Case 4: The related information of the target service level includes the quantity of reporting times of the exception information of the target service level.

That the control device adjusts, when any information in the related information does not meet a threshold corresponding to the any information, a parameter of the target service level based on a maximum delay associated with the target service level includes: The control device adjusts, when the quantity of reporting times of the exception information of the target service level exceeds a threshold upper limit corresponding to the quantity of reporting times of the exception information, the parameter of the target service level based on the maximum delay associated with the target service level.

In the method provided in this embodiment of this application, that the control device adjusts, when the quantity of reporting times of the exception information of the target service level exceeds a threshold upper limit corresponding to the quantity of reporting times of the exception information, the parameter of the target service level based on the maximum delay associated with the target service level includes: The control device adjusts, when the quantity of reporting times of the exception information of the target service level exceeds the threshold upper limit corresponding to the quantity of reporting times of the exception information within a seventh reference time period, the target service level based on the maximum delay adjustment associated with the target service level. Adjusting the parameter of the target service level based on the maximum delay associated with the target service level is triggered after it is detected, within the seventh reference time period, that the quantity of reporting times of the exception information of the target service level exceeds the threshold upper limit corresponding to the quantity of reporting times of the exception information. This can avoid a case that occurs due to an excessively long time and in which the parameter of the target service level is adjusted because the quantity of reporting times of the exception information of the target service level exceeds the threshold upper limit corresponding to the quantity of reporting times of the exception information, and consequently an adjustment occasion does not match an actual situation, to further improve stability and accuracy of use of resources.

In Case 1A, Case 2A, and Case 3A, the parameter of the target service level includes a queue resource parameter and a data flow constraint parameter. The adjusting a parameter of the target service level based on a maximum delay associated with the target service level includes: determining a first update value of the data flow constraint parameter of the target service level; determining a first update value of the queue resource parameter of the target service level based on the first update value of the data flow constraint parameter of the target service level when the maximum delay remains unchanged; and then adjusting the previous data flow constraint parameter based on the first update value of the data flow constraint parameter, and adjusting the previous queue resource parameter based on the first update value of the queue resource parameter.

In an example embodiment, the first update value of the queue resource parameter includes a first update value of a queue bandwidth and a first update value of a queue buffer, and the first update value of the data flow constraint parameter includes a first update value of a threshold of a burst amount of a data flow and a first update value of a threshold of an average rate of the data flow.

The determining a first update value of the queue resource parameter based on the first update value of the data flow constraint parameter when the maximum delay remains unchanged includes: when the maximum delay remains unchanged, determining a bandwidth of a port corresponding to the target service level, a first maximum amount of data that can be forwarded at the target service level after the parameter of the target service level is adjusted, a maximum amount of data that can be forwarded at each of a plurality of service levels of the first network device before the parameter of the target service level is adjusted, and a maximum packet length of a queue corresponding to each of the plurality of service levels; determining the first update value of the queue bandwidth based on the bandwidth of the port corresponding to the target service level, the first maximum amount of data that can be forwarded at the target service level after the parameter of the target service level is adjusted, and the maximum amount of data that can be forwarded at each of the plurality of service levels before the parameter of the target service level is adjusted; and determining the first update value of the queue buffer based on the maximum amount of data that can be forwarded at each of the plurality of service levels before the parameter of the target service level is adjusted, the maximum packet length of the queue corresponding to each of the plurality of service levels, the first update value of the threshold of the burst amount of the data flow, and the first update value of the threshold of the average rate of the data flow.

For example, the determining the first update value of the queue bandwidth based on the bandwidth of the port corresponding to the target service level, the first maximum amount of data that can be forwarded at the target service level after the parameter of the target service level is adjusted, and the maximum amount of data that can be forwarded at each of the plurality of service levels before the parameter of the target service level is adjusted includes: determining, based on the bandwidth of the port corresponding to the target service level, the first maximum amount of data that can be forwarded at the target service level after the parameter of the target service level is adjusted, and the maximum amount of data that can be forwarded at each of the plurality of service levels before the parameter of the target service level is adjusted, the first update value $C_{i1}^2$ of the queue bandwidth according to the following formula:

$$C_{i1}^2 = C \frac{Q_{i1}^2}{\sum_{1 \le j \le n, j \ne i} Q_j + Q_i^1 + Q_{n+1}^1}$$

Herein, C is the bandwidth of the port corresponding to the target service level, $Q_{i1}^2$ is the first maximum amount of data that can be forwarded at the target service level after the parameter of the target service level is adjusted, $Q_j$ is a maximum amount of data that can be forwarded at a $j^{th}$ service level, $Q_i^1$ is a maximum amount of data that can be forwarded at the target service level before the parameter of the target service level is adjusted, $Q_{n+1}^1$ is a maximum amount of data that can be forwarded in a non-delay-guarantee queue before the parameter of the target service level is adjusted, and n is a positive integer greater than 1.

In an example embodiment, $Q_i^1$ and $Q_{n+1}^1$ include but are not limited to values obtained based on a configuration of the control device before current adjustment. For example, the control device configures, before currently adjusting the parameter of the target service level, the maximum amount of data that can be forwarded at the target service level. In this case, for the current adjustment, $Q_i^1$ is the maximum amount of data that can be forwarded at the target service level before the parameter of the target service level is adjusted. Similarly, the control device configures, before currently adjusting the parameter of the target service level, the maximum amount of data that can be forwarded in the non-delay-guarantee queue. In this case, for the current adjustment, $Q_{n+1}^1$ is the maximum amount of data that can be forwarded in the non-delay-guarantee queue before the parameter of the target service level is adjusted.

In addition, $Q_i^1$ and $Q_{n+1}^1$ include but are not limited to values obtained after the parameter of the target service level is previously adjusted. After previously adjusting the parameter of the target service level, the control device stores adjusted $Q_i^1$ and $Q_{n+1}^1$. In this case, for current adjustment, the control device obtains stored $Q_i^1$ and uses $Q_i^1$ as the maximum amount of data that can be forwarded at the target service level before the parameter of the target service level is adjusted, and obtains stored $Q_{n+1}^1$ and uses $Q_{n+1}^1$ as the maximum amount of data that can be forwarded in the non-delay-guarantee queue before the parameter of the target service level is adjusted.

For $Q_j$, a change of a parameter of the $j^{th}$ service level is not involved during adjustment of the parameter of the target service level. Therefore, the maximum amount of data that can be forwarded at the $j^{th}$ service level may be obtained based on the configuration of the control device. Alternatively, before currently adjusting the parameter of the target service level, the control device adjusts a parameter of the $j^{th}$ service level, and the control device may also store the adjusted value. In this case, for the current adjustment of the parameter of the target service level, the control device may directly obtain stored $Q_j$ and use $Q_j$ as the maximum amount of data that can be forwarded at the $j^{th}$ service level and that is used during the adjustment of the parameter of the target service level.

For example, the determining the first update value of the queue buffer based on the maximum amount of data that can be forwarded at each of the plurality of service levels before the parameter of the target service level is adjusted, the maximum packet length of the queue corresponding to each of the plurality of service levels, the first update value of the threshold of the burst amount of the data flow, and the first update value of the threshold of the average rate of the data flow includes: determining, based on the maximum amount of data that can be forwarded at each of the plurality of service levels before the parameter of the target service level is adjusted, the maximum packet length of the queue corresponding to each of the plurality of service levels, the first update value of the threshold of the burst amount of the data flow, and the first update value of the threshold of the average rate of the data flow, the first update value $BF_{i1}^2$ of the queue buffer according to the following formula:

$$BF_{i1}^2 = \left( \frac{L_{max,L} + \Sigma_{1 \le j \le n, j \ne i}(L_j + Q_j) + L_{n+1} + Q_{n+1}^2}{C} + \frac{L_i(\Sigma_{1 \le j \le n, j \ne i}Q_j + Q_{n+1}^2)}{CQ_{i1}^2} \right) * r_{i1}^2 + b_{i1}^2$$

Herein, $L_{max,L}$ is a maximum packet length of a low-priority queue, C is the bandwidth of the port corresponding to the target service level, $Q_{i1}^2$ is the first maximum amount of data that can be forwarded at the target service level after the parameter of the target service level is adjusted, $Q_j$ is the maximum amount of data that can be forwarded at the $j^{th}$ service level, $L_{n+1}$ is a maximum packet length of the non-delay-guarantee queue, $L_j$ is a maximum packet length of a queue at the $j^{th}$ service level, $b_{i1}^2$ is the first update value of the threshold of the burst amount of the data flow, $b_{i1}^2=b_i^1-\Delta b_{i1}$, $b_i^1$ is the threshold of the burst amount of the data flow that exists before the parameter of the target service level is adjusted, $\Delta b_{i1}$ is a value by which the threshold that is of the burst amount of the data flow and that is of the target service level is decreased, $r_{i1}^2$ is the first update value of the threshold of the average rate of the data flow, $r_{i1}^2=r_i^1-\Delta r_{i1}$, $r_i^1$ is the threshold of the average rate of the data flow that exists before the parameter of the target service level is adjusted, $\Delta r_{i1}$ is a value by which the threshold of the average rate of the data flow is decreased, $L_i$ is a maximum packet length of a queue at the target service level, $Q_{n+1}^2$ is a maximum amount of data that can be forwarded in the non-delay-guarantee queue after the parameter of the target service level is adjusted, n is a positive integer greater than 1, and both i and j are positive integers.

In an example embodiment, $L_{n+1}$, $L_j$, $L_i$, $L_{max,L}$, and C may be pre-stored in the control device. For example, after allocating a bandwidth to the port corresponding to the target service level, the control device stores $L_{n+1}$, $L_j$, $L_i$, $L_{max,L}$, and C. In this case, the control device directly obtains stored $L_{n+1}$, $L_j$, $L_i$, $L_{max,L}$, and C.

In Case 1B, Case 2B, Case 3B, and Case 4, the configuration parameter of the target service level includes a queue resource parameter and a data flow constraint parameter. The adjusting a parameter of the target service level based on a maximum delay associated with the target service level includes but is not limited to an adjustment manner in a first case in which a second update value of the queue resource parameter is less than or equal to a resource threshold, and an adjustment manner in a second case in which the second update value of the queue resource parameter is greater than the resource threshold. The adjustment manners in the two cases are as follows:

The adjustment manner in the first case is: determining a second update value of the data flow constraint parameter; determining a second update value of the queue resource parameter based on the second update value of the data flow constraint parameter when the maximum delay remains unchanged; and when the second update value of the queue resource parameter is less than or equal to the resource threshold, adjusting the previous data flow admission constraint parameter based on the second update value of the data flow constraint parameter, and adjusting the previous queue resource parameter based on the second update value of the queue resource parameter.

In an example embodiment, the second update value of the queue resource parameter includes a second update value of a queue bandwidth and a second update value of a queue buffer, and the second update value of the data flow constraint parameter includes a second update value of a threshold of a burst amount of a data flow and a second update value of a threshold of an average rate of the data flow.

The determining a second update value of the queue resource parameter based on the second update value of the data flow constraint parameter when the maximum delay remains unchanged includes: when the maximum delay remains unchanged, determining a bandwidth of a port corresponding to the target service level, a second maximum amount of data that can be forwarded at the target service level after the parameter of the target service level is adjusted, a maximum amount of data that can be forwarded at each of a plurality of service levels of the first network device before the parameter of the target service level is adjusted, and a maximum packet length of a queue corresponding to each of the plurality of service levels; determining the second update value of the queue bandwidth based on the bandwidth of the port corresponding to the target service level, the second maximum amount of data that can be forwarded at the target service level after the parameter of the target service level is adjusted, and the maximum amount of data that can be forwarded at each of the plurality of service levels before the parameter of the target service level is adjusted; and determining the second update value of the queue buffer based on the maximum amount of data that can be forwarded at each of the plurality of service levels before the parameter of the target service level is adjusted, the maximum packet length of the queue corresponding to each of the plurality of service levels, the second update value of the threshold of the burst amount of the data flow, and the second update value of the threshold of the average rate of the data flow.

For example, the determining the second update value of the queue bandwidth based on the bandwidth of the port corresponding to the target service level, the second maximum amount of data that can be forwarded at the target service level after the parameter of the target service level is adjusted, and the maximum amount of data that can be forwarded at each of the plurality of service levels before the parameter of the target service level is adjusted includes: determining, based on the bandwidth of the port corresponding to the target service level, the second maximum amount of data that can be forwarded at the target service level after the parameter of the target service level is adjusted, and the maximum amount of data that can be forwarded at each service level before the parameter of the target service level is adjusted, the second update value $C_{i2}^2$ of the queue bandwidth according to the following formula:

$$C_{i2}^2 = C \frac{Q_{i2}^2}{\sum_{1 \le j \le n, j \ne i} Q_j + Q_i^1 + Q_{n+1}^1}$$

Herein, C is the bandwidth of the port corresponding to the target service level, $Q_{i2}^2$ is the second maximum amount of data that can be forwarded at the target service level after the parameter of the target service level is adjusted, $Q_j$ is a maximum amount of data that can be forwarded at a $j^{th}$ service level, $Q_i^1$ is a maximum amount of data that can be forwarded at the target service level before the parameter of the target service level is adjusted, $Q_{n+1}^1$ is a maximum amount of data that can be forwarded in a non-delay-guarantee queue before the parameter of the target service level is adjusted, and n is a positive integer greater than 1.

For example, the determining the second update value of the queue buffer based on the maximum amount of data that can be forwarded at each of the plurality of service levels before the parameter of the target service level is adjusted, the maximum packet length of the queue corresponding to each of the plurality of service levels, the second update value of the threshold of the burst amount of the data flow, and the second update value of the threshold of the average rate of the data flow includes: determining, based on the maximum amount of data that can be forwarded at each of the plurality of service levels before the parameter of the target service level is adjusted, the maximum packet length of the queue corresponding to each of the plurality of service levels, the second update value of the threshold of the burst amount of the data flow, and the second update value of the threshold of the average rate of the data flow, the second update value $BF_{i2}^2$ of the queue buffer according to the following formula:

$$BF_{i2}^2 = \left( \frac{L_{max,L} + \sum_{1 \le j \le n, j \ne i}(L_j + Q_j) + L_{n+1} + Q_{n+1}^2}{C} + \frac{L_i\left(\sum_{1 \le j \le n, j \ne i} Q_j + Q_{n+1}^2\right)}{CQ_{i2}^2} \right) * r_{i2}^2 + b_{i2}^2$$

Herein, C is the bandwidth of the port corresponding to the target service level, $Q_{i2}^2$ is the second maximum amount of data that can be forwarded at the target service level after the parameter of the target service level is adjusted, $Q_j$ is the maximum amount of data that can be forwarded at the $j^{th}$ service level, $L_{max,L}$ is a maximum packet length of a low-priority queue, $L_{n+1}$ is a maximum packet length of the non-delay-guarantee queue, $L_j$ is a maximum packet length of a queue at the $j^{th}$ service level, $b_{i2}^2$ is the second update value of the threshold of the burst amount of the data flow, $b_{i2}^2 = b_i^1 + \Delta b_{i2}$, $b_i^1$ is the threshold of the burst amount of the data flow that exists before the parameter of the target service level is adjusted, $\Delta b_{i2}$ is a value by which the threshold of the burst amount of the data flow is increased, $r_{i2}^2$ is the second update value of the threshold of the average rate of the data flow, $r_{i2}^2 = r_i^1 + \Delta r_{i2}$, $r_i^1$ is the threshold of the average rate of the data flow that exists before the parameter of the target service level is adjusted, $\Delta r_{i2}$ is a value by which the threshold of the average rate of the data flow is increased, $L_i$ is a maximum packet length of a queue at the target service level, and n is a positive integer greater than 1.

Adjustment manner 1 in the second case: The configuration parameter of the target service level includes a queue resource parameter and a data flow constraint parameter. The adjusting a parameter of the target service level based on a maximum delay associated with the target service level includes: determining a second update value of the data flow constraint parameter of the target service level; determining a second update value of the queue resource parameter of the target service level based on the second update value of the data flow constraint parameter of the target service level when the maximum delay remains unchanged; and when the second update value of the queue resource parameter is greater than the resource threshold, switching a target data flow corresponding to the target service level to a data flow corresponding to another service level, where the another service level includes another service level of the first network device or a service level of another device.

For example, the resource threshold includes but is not limited to a size of a resource that can be preempted by a non-delay-guarantee queue, and the resource includes but is not limited to a bandwidth and a buffer.

Adjustment manner 2 in the second case: The configuration parameter of the target service level includes a queue resource parameter and a data flow constraint parameter. The adjusting a target service level based on a maximum delay associated with the target service level includes: determining a second update value of the data flow constraint parameter; determining a second update value of the queue resource parameter based on the second update value of the data flow constraint parameter when the maximum delay remains unchanged; when the second update value of the queue resource parameter is greater than the resource threshold, determining a third update value of the queue resource parameter based on the second update value of the data flow constraint parameter, and determining an update value of a parameter of a service level of a resource that can be preempted, where the update value of the parameter of the service level of the resource that can be preempted is used to enable the third update value of the queue resource parameter to meet a constraint condition; and adjusting the data flow constraint parameter based on the second update value of the data flow constraint parameter, adjusting the queue resource parameter based on the third update value of the queue resource parameter, and adjusting, based on the update value of the parameter of the service level of the resource that can be preempted, the parameter of the service level of the resource that can be preempted.

For example, the second update value of the data flow constraint parameter includes a second update value of a threshold of a burst amount of a data flow and a second update value of a threshold of an average rate of the data flow. The determining a third update value of the queue resource parameter based on the second update value of the data flow constraint parameter includes: determining a bandwidth of a port corresponding to the target service level, a third maximum amount of data that can be forwarded at the target service level after the parameter of the target service level is adjusted, a maximum amount of data that can be forwarded at each of a plurality of service levels of the first network device before the parameter of the target service level is adjusted, and a maximum packet length of a queue corresponding to each of the plurality of service levels; determining a third update value of a queue bandwidth based on the bandwidth of the port corresponding to the target service level, the third maximum amount of data that can be forwarded at the target service level after the parameter of the target service level is adjusted, and the maximum amount of data that can be forwarded at each of the plurality of service levels before the parameter of the target service level is adjusted; and determining a third update value of a queue buffer based on the maximum amount of data that can be forwarded at each of the plurality of service levels before the parameter of the target service level is adjusted, the maximum packet length of the queue corresponding to each of the plurality of service levels, a maximum amount of data that can be forwarded after the service level of the resource that can be preempted is adjusted, a maximum packet length, the second update value of the threshold of the burst amount of the data flow, and the second update value of the threshold of the average rate of the data flow.

The determining an update value of a parameter of a service level of a resource that can be preempted includes: determining, based on the bandwidth of the port corresponding to the target service level, the maximum amount of data that can be forwarded after the service level of the resource that can be preempted is adjusted, and the maximum amount of data that can be forwarded at each of the plurality of service levels before the parameter of the target service level is adjusted, an update value of a queue bandwidth of the service level of the resource that can be preempted; and determining, based on the maximum amount of data that can be forwarded at each of the plurality of service levels before the parameter of the target service level is adjusted, the maximum packet length of the queue corresponding to each of the plurality of service levels, the maximum amount of data that can be forwarded after the service level of the resource that can be preempted is adjusted, the maximum packet length, an update value of a threshold that is of a burst amount of a data flow and that is of the service level of the resource that can be preempted, and an update value of a threshold of an average rate of the data flow, an update value of a queue buffer of the service level of the resource that can be preempted.

For example, the determining a third update value of a queue bandwidth based on the bandwidth of the port corresponding to the target service level, the third maximum amount of data that can be forwarded at the target service level after the parameter of the target service level is adjusted, and the maximum amount of data that can be forwarded at each of the plurality of service levels before the parameter of the target service level is adjusted includes: determining, based on the bandwidth of the port corresponding to the target service level, the third maximum amount of data that can be forwarded at the target service level after the parameter of the target service level is adjusted, and the maximum amount of data that can be forwarded at each of the plurality of service levels before the parameter of the target service level is adjusted, the third update value $C_i^2$ of the queue bandwidth according to the following formula:

$$C_i^2 = C \frac{Q_i^2}{\sum_{1 \leq j \leq n, j \neq i} Q_j + Q_i^1 + Q_{n+1}^1};$$

determining, based on the bandwidth of the port corresponding to the target service level, the maximum amount of data that can be forwarded after the service level of the resource that can be preempted is adjusted, and the maximum amount of data that can be forwarded at each of the plurality of service levels before the parameter of the target service level is adjusted and according to the following formula, the queue bandwidth $C_k^2$ of the service level of the resource that can be preempted:

$$C_k^2 = C \frac{Q_k^2}{\sum_{1 \leq j \leq n, j \neq i} Q_j + Q_i^1 + Q_{n+1}^1}$$

Herein, C is the bandwidth of the port corresponding to the target service level, $Q_i^2$ is the third maximum amount of data that can be forwarded at the target service level after the parameter of the target service level is adjusted, $Q_k^2$ is the maximum amount of data that can be forwarded after the service level of the resource that can be preempted is adjusted, $Q_j$ is a maximum amount of data that can be forwarded at a $j^{th}$ service level, $Q_i^1$ is a maximum amount of data that can be forwarded before the parameter of the target service level is adjusted, $Q_{n+1}^1$ is a maximum amount of data that can be forwarded in a non-delay-guarantee queue before the parameter of the target service level is adjusted, and n is a positive integer greater than 1.

For example, the determining a third update value of a queue buffer based on the maximum amount of data that can be forwarded at each of the plurality of service levels before the parameter of the target service level is adjusted, the maximum packet length of the queue corresponding to each of the plurality of service levels, the second update value of the threshold of the burst amount of the data flow, and the second update value of the threshold of the average rate of the data flow includes: determining, based on the maximum amount of data that can be forwarded at each of the plurality of service levels before the parameter of the target service level is adjusted, the maximum packet length of the queue corresponding to each of the plurality of service levels, the maximum amount of data that can be forwarded after the service level of the resource that can be preempted is adjusted, the maximum packet length, the second update value of the threshold of the burst amount of the data flow, and the second update value of the threshold of the average rate of the data flow, the third update value $BF_i^2$ of the queue buffer according to the following formula:

$$BF_i^2 = \left( \frac{L_{max,L} + \sum_{1 \leq j \leq n, j \neq i, j \neq k}(L_j + Q_j) + L_k + Q_k^2 + L_{n+1} + Q_{n+1}^2}{C} + \frac{L_i \left( \sum_{1 \leq j \leq n, j \neq i, j \neq k} Q_j + Q_k^2 + Q_{n+1}^2 \right)}{CQ_i^2} \right) * r_{i2}^2 + b_{i2}^2;$$

and determining, based on the maximum amount of data that can be forwarded at each of the plurality of service levels before the parameter of the target service level is adjusted, the maximum packet length of the queue corresponding to each of the plurality of service levels, the maximum amount of data that can be forwarded after the service level of the resource that can be preempted is adjusted, the maximum packet length, the update value of the threshold that is of the burst amount of the data flow and that is of the service level of the resource that can be preempted, and the update value of the threshold of the average rate of the data flow and according to the following formula, the queue buffer $BF_k^2$ of the service level of the resource that can be preempted:

$$BF_k^2 = \left( \frac{L_{max,L} + \sum_{1 \leq j \leq n, j \neq i, j \neq k}(L_j + Q_j) + L_i + Q_i^2 + L_{n+1} + Q_{n+1}^2}{C} + \frac{L_k \left( \sum_{1 \leq j \leq n, j \neq i, j \neq k} Q_j + Q_i^2 + Q_{n+1}^2 \right)}{CQ_k^2} \right) * r_k^2 + b_k^2$$

Herein, C is the bandwidth of the port corresponding to the target service level, $Q_i^2$ is the third maximum amount of data that can be forwarded at the target service level after the parameter of the target service level is adjusted, $Q_j$ is the maximum amount of data that can be forwarded at the $j^{th}$ service level, $L_{max,L}$ is a maximum packet length of a low-priority queue, $L_{n+1}$ is a maximum packet length of the non-delay-guarantee queue, $L_j$ is a maximum packet length of a queue at the $j^{th}$ service level, $b_{i2}^2$ is the second update value of the threshold of the burst amount of the data flow, $b_{i2}^2 = b_i^1 + \Delta b_{i2}$, $b_i^1$ is the threshold of the burst amount of the data flow that exists before the parameter of the target service level is adjusted, $\Delta b_{i2}$ is a value by which the threshold of the burst amount of the data flow is increased, $r_{i2}^2$ is the second update value of the threshold of the average rate of the data flow, $r_{i2}^2 = r_i^1 + \Delta r_{i2}$, $r_i^1$ is the threshold of the average rate of the data flow that exists before the parameter of the target service level is adjusted, $\Delta r_{i2}$ is a value by which the threshold of the average rate of the data flow is increased, $L_i$ is a maximum packet length of a queue at the target service level, $L_k$ is a maximum packet length of a queue at the service level of the resource that can be preempted, $Q_k^2$ is a maximum amount of data that can be forwarded after the service level of the resource that can be preempted is adjusted, $Q_{n+1}^2$ is a maximum amount of data that can be forwarded in the non-delay-guarantee queue after the parameter of the target service level is adjusted, $r_k^2$ is the update value of the threshold that is of the average rate of the data flow and that is of the service level of the resource that can be preempted, $b_k^2$ is the update value of the threshold that is of the burst amount of the data flow and that is of the service level of the resource that can be preempted, and n is a positive integer greater than 1.

It should be noted that both the adjustment manner 1 and the adjustment manner 2 in the second case are processing manners used when the second update value of the queue resource parameter is greater than the resource threshold. In this embodiment of this application, when the second update value of the queue resource parameter is greater than the resource threshold, whether the adjustment manner 1 or the adjustment manner 2 is used is not limited in this embodiment of this application. To be specific, when the second update value of the queue resource parameter is greater than the resource threshold, the adjustment manner 1 may be directly used to switch the target data flow corresponding to the target service level to the data flow corresponding to the another service level, or the adjustment manner 2 may be used to adjust the data flow constraint parameter based on the second update value of the data flow constraint parameter, adjust the queue resource parameter based on the third update value of the queue resource parameter, and adjust, based on the update value of the parameter of the service level of the resource that can be preempted, the parameter of the service level of the resource that can be preempted.

In addition, if the resource required for adjusting the parameter of the target service level still cannot be met by using the adjustment manner 1, the adjustment manner 2 may be further used. For example, if the resource required for adjusting the parameter of the target service level still cannot be met by using the adjustment manner 2, an adjustment manner 3 may be further used.

In either of the foregoing cases, after the control device determines an update value of the parameter of the target service level, the method further includes: The control device sends an update value of the adjusted parameter of the target service level to the first network device, to indicate the first network device to adjust the parameter of the target service level based on the update value of the parameter of the target service level. Correspondingly, the first network device receives the update value that is of the parameter of the target service level and that is sent by the control device, and adjusts the parameter of the target service level based on the update value of the parameter of the target service level.

Optionally, in Case 1B, Case 2B, Case 3B, and Case 4, after the first network device determines the update value of the parameter of the target service level, if an update value of a parameter of another service level different from the target service level is also determined, the method further includes: The control device sends an update value of an adjusted parameter of the another service level different from the target service level to the first network device, to indicate the first network device to adjust the corresponding another service level based on the update value of the parameter of the another service level different from the target service level. Correspondingly, the first network device receives the update value that is of the parameter of the another service level different from the target service level and that is sent by the control device, and adjusts the corresponding another service level based on the update value of the parameter of the another service level.

In addition, it should be noted that the update value of the queue buffer in this embodiment of this application is a required minimum value of the queue buffer. In an example embodiment, to meet an adjustment requirement of the target service level, another value greater than the update value of the queue buffer may be used. This is not limited in this embodiment of this application.

According to the method provided in this embodiment of this application, based on changes of a service deployment status (for example, a current data flow parameter and a remaining data flow parameter), queue status information, a quantity of reporting times of exception information, and the like, parameter configurations of a service level such as queue resource allocation and a data flow admission constraint are dynamically updated, and a service level through which a data flow passes is dynamically switched, to further improve network resource utilization while ensuring an end-to-end delay of a service.

Figure 5:
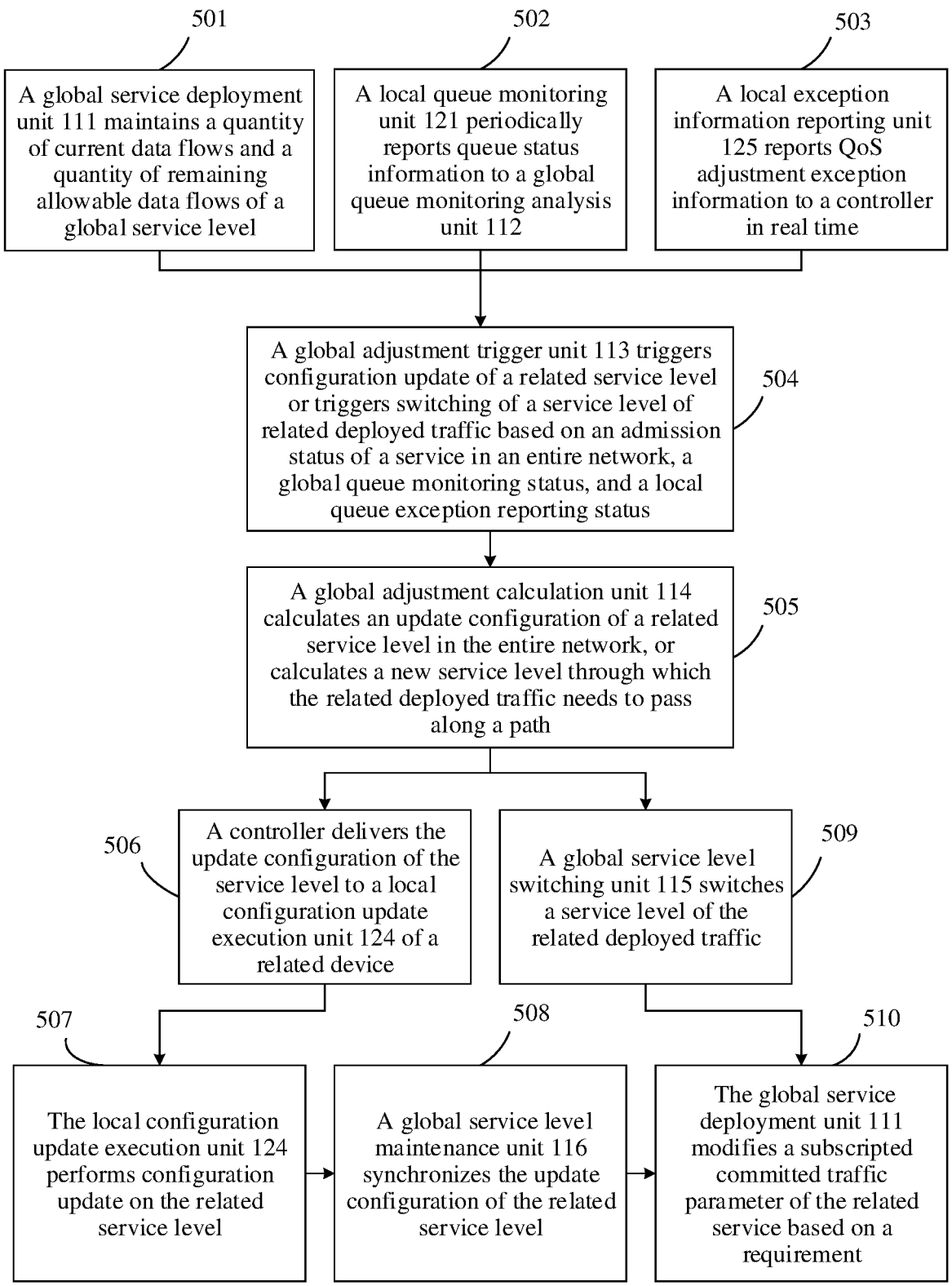
FIG. 5 is a schematic flowchart of a service level adjustment method according to an embodiment of this application.

Based on the method procedure shown in FIG. 4, the system architecture shown in FIG. 3 is used as an example to describe, by using a process of interaction between the first network device and the controller, the service level adjustment method provided in this embodiment of this application. As shown in FIG. 5, the method includes the following processes 501 to 510.

501: A global service deployment unit 111 of a controller receives a service requirement, computes a path and a service level that needs to be entered along the path for the service, and performs deployment. In addition, the global service deployment unit 111 maintains current data flow parameters and quantities of remaining allowable data flows of all service levels in a network, including increasing a value of each parameter in the current data flow parameter based on a corresponding parameter (a threshold of a burst amount of a data flow, a threshold of an average rate of the data flow, and the like) of a subscribed committed data flow of a new service, and decreasing a value of each parameter in the current remaining allowable traffic based on the corresponding parameter of the subscribed committed data flow of the new service.

502: A local queue monitoring unit 121 of each network device periodically reports local queue status information to a global queue monitoring analysis unit 112, and the global queue monitoring analysis unit 112 maintains global queue status information of all service levels.

In an example embodiment, the local queue monitoring unit 121 of the first network device periodically reports local queue status information such as queue buffer occupation, a packet queuing delay, or a packet count to the global queue monitoring analysis unit 112 of the controller.

503: A local exception information reporting unit 125 of the network device reports local QoS adjustment exception information to the controller in real time.

504: Based on 501, 502, and 503, and a current data flow admission status of a service level in an entire network, global queue monitoring information, and a local QoS exception information reporting status, a global adjustment trigger unit 113 triggers configuration update of a global target service level or triggers a service level at which a related deployed data flow is switched.

Triggering the configuration update of the global target service level or triggering the service level at which the related deployed data flow is switched includes but is not limited to the following seven cases:

Case 1: If any queue status information such as queue buffer occupation, a packet queuing delay, and a packet count of the target service level is less than a corresponding threshold lower limit within a first reference time period based on the queue monitoring information, the global adjustment trigger unit 113 determines that a quantity of actually arrived data flows in the target service level is less than a maximum quantity of subscripted committed data flows in the target service level for a long time, to trigger configuration update of parameters such as a queue resource and data flow admission of the target service level in a decreasing direction.

Case 2: If a current data flow parameter (a threshold of a burst amount of a data flow and a threshold of an average rate of the data flow) of the target service level is less than a threshold lower limit corresponding to the current data flow parameter within a third reference time period, the global adjustment trigger unit 113 determines that a data flow in the target service level is deployed insufficiently for a long time, to trigger configuration update of parameters such as a queue resource and data flow admission of the target service level in a decreasing direction.

Case 3: If a remaining data flow parameter (a maximum remaining allowable burst amount and a maximum remaining average rate) of the target service level exceeds a threshold upper limit corresponding to the remaining data flow parameter within a fifth reference time period, the global adjustment trigger unit 113 determines that a quantity of data flows in the target service level approaches a deployment lower limit, to trigger configuration update of parameters such as a queue resource and data flow admission of the target service level in a decreasing direction.

Case 4: If any queue status information such as queue buffer occupation, a packet queuing delay, and a packet count of the target service level is greater than a corresponding threshold upper limit within a second reference time period based on the queue monitoring information, the global adjustment trigger unit 113 determines that a quantity of actually arrived data flows in the target service level exceeds a data flow admission constraint of the target service level, to trigger configuration update of parameters such as a queue resource and data flow admission of the target service level in an increasing direction, or trigger a deployed data flow that passes through the target service level to be switched to another service level of the first network device or a service level of another network device.

Case 5: If a current data flow parameter (a threshold of a burst amount of a data flow or a threshold of an average rate of a data flow) of the target service level exceeds a threshold upper limit corresponding to the current data flow parameter within a fourth reference time period, the global adjustment trigger unit 113 determines that a quantity of deployed data flows in the target service level approaches a deployment upper limit, to trigger configuration update of parameters such as a queue resource and data flow admission of the target service level in an increasing direction, or trigger a deployed data flow that passes through the target service level to be switched to another service level of the first network device or a service level of another network device.

Case 6: If a remaining data flow parameter (a maximum remaining allowable burst amount or a maximum remaining average rate) of the target service level is less than a threshold lower limit corresponding to the remaining data flow parameter within a sixth reference time period, the global adjustment trigger unit 113 determines that a quantity of data flows in the target service level approaches a deployment upper limit, to trigger configuration update of parameters such as a queue resource and data flow admission of the target service level in an increasing direction, or trigger a deployed data flow that passes through the target service level to be switched to another service level of the first network device or a service level of another network device.

Case 7: If the global adjustment trigger unit 113 learns that a quantity of reporting times of an error signal indicating that a data flow in the target service level exceeds an admission constraint exceeds a threshold upper limit corresponding to the quantity of reporting times of the error signal indicating that the data flow in the target service level exceeds the admission constraint, the global adjustment trigger unit 113 determines that a quantity of actually arrived data flows in the target service level exceeds a data flow admission constraint of the target service level, and cannot locally perform processing independently by adjusting the target service level, to trigger configuration update of parameters such as a queue resource and data flow admission of the target service level in an increasing direction, or trigger a deployed data flow that passes through the target service level to be switched to another service level of the first network device or a service level of another network device.

505: Based on 504, a global adjustment calculation unit 114 calculates an update configuration of a related service level in an entire network, including a new queue resource parameter (a queue bandwidth, a queue buffer, or the like) and a data flow constraint parameter (a threshold of a burst amount of a data flow, a threshold of an average rate of a data flow, or the like); or calculates, for a related deployed data flow in an entire network, a new service level through which each hop along a path needs to pass. When an end-to-end delay requirement of a service and a data flow admission constraint of each service level are met, an original service level may be selected to be switched to another service level on a same port, or an original service level may be selected to be switched to another service level on a different port of a same device or even of a different device.

In an example embodiment, that the global adjustment calculation unit 114 calculates the update configuration of the related service levels in the entire network includes but is not limited to the following two manners.

Manner 1:

Based on Case 1, Case 2, or Case 3 in 504, the global adjustment calculation unit 114 calculates data flow admission that is of the related service level and that needs to be subtracted (including a threshold that is of a burst amount of a data flow and that needs to be subtracted, a threshold that is of an average rate of a data flow and that needs to be subtracted, or the like), and calculates, when an associated maximum delay remains unchanged, a queue resource that is of the target service level and that needs to be correspondingly subtracted (including a queue bandwidth, a queue buffer, or the like that needs to be subtracted).

Figure 6:
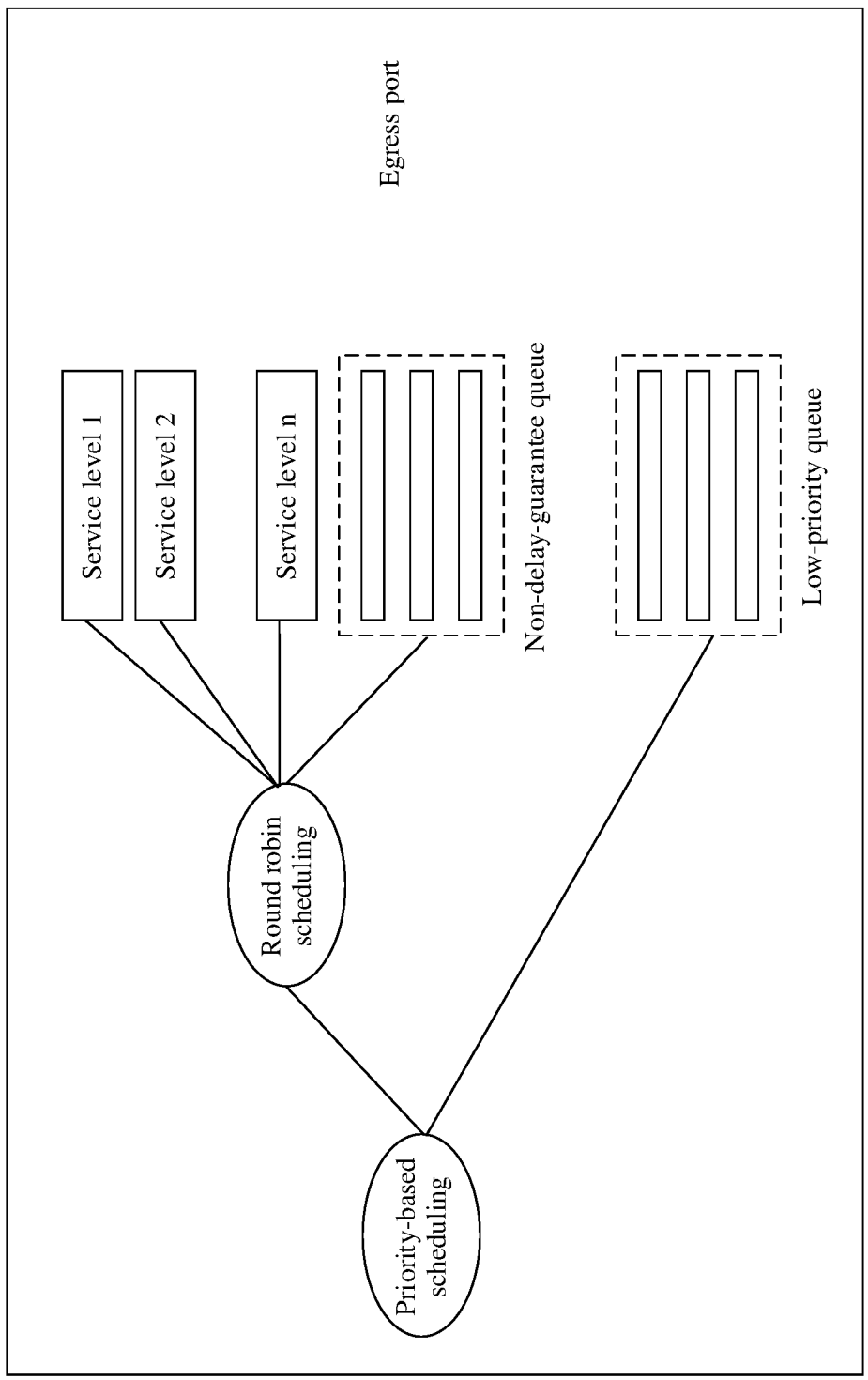
FIG. 6 is a schematic diagram of an egress port queue for adjusting a service level according to an embodiment of this application.

For example, if the global adjustment calculation unit 114 calculates an update configuration of a service level according to a network calculus theory, a principle is shown in a schematic diagram of an egress port queue shown in FIG. 6. It is considered that a total of n service levels are set on an egress port, and each service level is bound to one queue. In addition, it is considered that there may be several queues serving a data flow having no delay guarantee requirement. For brief description, one virtual queue is used to represent the queues having no delay guarantee requirement, and is referred to as a non-delay-guarantee queue. Queues corresponding to all the service levels and the non-delay guarantee queue are scheduled through round robin. Optionally, there may be several low-priority queues. Correspondingly, the queues corresponding to the service levels and the non-delay-guarantee queue are high-priority queues. At each scheduling opportunity, the high-priority queues can be scheduled first.

For example, the target service level is an $i^{th}$ service level. In round robin scheduling in a high-priority queue, a maximum amount of data that can be forwarded in one scheduling at the $i^{th}$ service level is $Q_i$, and a maximum amount of data that can be forwarded in one scheduling in a non-delay-guarantee queue is $Q_{n+1}$. Particularly, for ease of unified expression, $Q_{n+1}$ may be directly set to 0 if there is no non-delay-guarantee queue on a current port.

Figure 7:
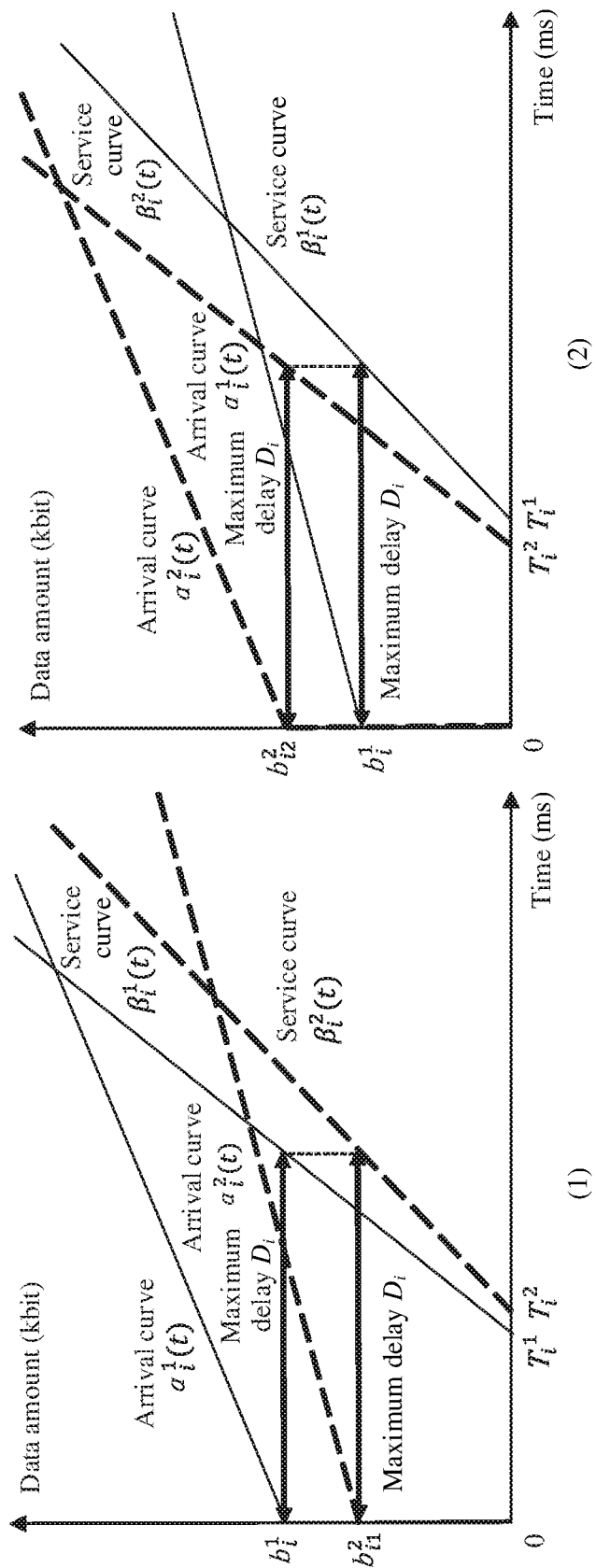
FIG. 7 is a schematic diagram of network calculus for adjusting a service level according to an embodiment of this application.

As shown in (1) in FIG. 7, it is defined that an arrival curve function of an $i^{th}$ service level is $\alpha_i(t)$, an independent variable is t, and in an interval $t_2-t_1$ between any moments $t_1$ and $t_2$ ($t_2 \geq t_1 \geq 0$), an amount of data arriving at the $i^{th}$ service level does not exceed $\alpha_i(t_2-t_1)$. For example, an amount of accumulated data in a queue at the $i^{th}$ service level from a moment 0 to a moment t is $A_i(t)$. If a function $\alpha_i(t)$ exists, $A_i(t_2)-A_i(t_1) \leq \alpha_i(t_2-t_1)$ is satisfied for the any moments $t_1$ and $t_2$ ($t_2 \geq t_1 \geq 0$). In this case, it is defined that the function $\alpha_i(t)$ is the arrival curve function of the $i^{th}$ service level.

In addition, it is defined that a service curve function of the $i^{th}$ service level is $\beta_i(t)$, an independent variable is t, and in the interval $t_2-t_1$ between the any moments $t_1$ and $t_2$ ($t_2 \geq t_1 \geq 0$), an amount of data successfully forwarded at the service level is not less than $\beta_i(t_2-t_1)$. For example, an amount of accumulated data sent in the queue at the $i^{th}$ service level from the moment 0 to the moment t is $B_i(t)$. If a function $\beta_i(t)$ exists, $B_i(t_2)-B_i(t_1) \geq \beta_i(t_2-t_1)$ is satisfied for the any moments $t_1$ and $t_2$ ($t_2 \geq t_1 \geq 0$). In this case, it is defined that the function $\beta_i(t)$ is the service curve function of the $i^{th}$ service level.

For example, the target service level is an $i^{th}$ service level. A maximum delay generated by a packet passing through the $i^{th}$ service level may be represented as $D_i=\sup_{t\geq 0}\{\inf\{d\geq 0 | \alpha_i(t) \leq \beta_i(t+d)\}\}$. For example, a total bandwidth of the port is C, a maximum delay requirement of the $i^{th}$ service level is $D_i$, and a maximum packet length of a queue corresponding to the $i^{th}$ service level is $L_i$. In addition, a maximum packet length of a non-delay-guarantee queue is $L_{n+1}$, and a maximum packet length of a low-priority queue is $L_{max,L}$. If configuration update needs to be performed on the $i^{th}$ service level, it is defined that a maximum amount of data that can be forwarded at the $i^{th}$ service level each time before the configuration update is $Q_i^1$, and a maximum amount of data that can be forwarded in the non-delay-guarantee queue is $Q_{n+1}^1$. Particularly, $Q_{n+1}^1=0$ if there is no non-delay-guarantee queue before the configuration update. Before the configuration update of the $i^{th}$ service level, an egress bandwidth of the $i^{th}$ service level is $C_i^1=C*Q_i^1(Q_i^1+\Sigma_{1\leq j\leq n, j\neq i}Q_j)$. Correspondingly, before the configuration update of the $i^{th}$ service level, a threshold that is of a burst amount of a data flow and that is of the $i^{th}$ service level is $b_i^1$, and an average rate is $r_i^1$. As shown in (1) in FIG. 7, $\alpha_i^1(t)$ represents an arrival curve existing before the update of the $i^{th}$ service level. In this case, a service curve $\beta_i^1(t)$ of the $i^{th}$ service level is represented as follows:

$$\beta_i^1(t) = \left( C \frac{Q_i^1}{Q_i^1 + \sum_{1\leq j\leq n, j\neq i} Q_j + Q_{n+1}^1} \right. \quad (1\text{-}1)$$

$$\left( 1 - \frac{L_{max,L} + \sum_{1\leq j\leq n, j\neq i}(L_j+Q_j) + L_{n+1} + Q_{n+1}^1}{C} - \right.$$

$$\left. \left. \frac{L_i\left(\sum_{1\leq j\leq n, j\neq i} Q_j + Q_{n+1}^1\right)}{CQ_i^1} - T_0 \right) \right)^+$$

Herein, $$\left( C \frac{Q_i^1}{Q_i^1 + \sum_{1\leq j\leq n, j\neq i} Q_j + Q_{n+1}^1} \right) \left( t - \right.$$

$$\frac{L_{max,L} + \sum_{1\leq j\leq n, j\neq i}(L_j+Q_j) + L_{n+1} + Q_{n+1}^1}{C} -$$

$$\left. \left. \frac{L_i\left(\sum_{1\leq j\leq n, j\neq i} Q_j + Q_{n+1}^1\right)}{CQ_i^1} - T_0 \right) \right)^+$$

is to obtain a larger value in a value of $$C \frac{Q_i^1}{Q_i^1 + \sum_{1\leq j\leq n, j\neq i} Q_j + Q_{n+1}^1} \left( t - \frac{L_{max,L} + \sum_{1\leq j\leq n, j\neq i}(L_j+Q_j) +}{L_{n+1} + Q_{n+1}^1} - \frac{L_i\left(\sum_{1\leq j\leq n, j\neq i} Q_j + Q_{n+1}^1\right)}{CQ_i^1} - T_0 \right)$$

and 0, where $T_0$ is a time offset. For example, if the maximum delay $D_i$ is a delay of transmitting a data flow by a single network device that includes an ingress port queuing delay, an egress port queuing delay, a processing delay, and a sending delay, $T_0$ is defined as a sum of the ingress port queuing delay, the processing delay, and the sending delay of the network device. For example, if the maximum delay $D_i$ is an egress port queuing delay, $T_0$ is defined as 0.

It is defined that a horizontal coordinate intercept of $\beta_i^1(t)$ is $T_i^1$, and a slope is $R_i^1$. According to Formula (1-1), details are as follows:

$$T_i^1 = \frac{L_{max,L} + \sum_{1 \le j \le n, j \ne i}(L_j + Q_j) + L_{n+1} + Q_{n+1}^1}{C} + \quad (1\text{-}2)$$

$$\frac{L_i\left(\sum_{1 \le j \le n, j \ne i} Q_j + Q_{n+1}^1\right)}{CQ_i^1} + T_0$$

$$R_i^2 = C\frac{Q_i^1}{Q_i^1 + \sum_{1 \le j \le n, j \ne i} Q_j + Q_{n+1}^1} \quad (1\text{-}3)$$

In addition, a value of the maximum delay $D_i$ of the $i^{th}$ service level is represented as follows:

$$D_i = T_i^1 + \frac{b_i^1}{R_i^1} \quad (1\text{-}4)$$

According to Formula (1-2), Formula (1-3), and Formula (1-4), the value of the maximum delay $D_i$ of the $i^{th}$ service level is re-represented as follows:

$$D_i = \frac{L_{max,L} + \sum_{1 \le j \le n, j \ne i}(L_j + Q_j) + L_{n+1} + Q_{n+1}^1}{C} + \quad (1\text{-}5)$$

$$\frac{L_i\left(\sum_{1 \le j \le n, j \ne i} Q_j + Q_{n+1}^1\right)}{CQ_i^1} + \frac{b_i^1\left(Q_i^1 + \sum_{1 \le j \le n, j \ne i} Q_j + Q_{n+1}^1\right)}{CQ_i^1} + T_0$$

Correspondingly, before the configuration update, a minimum queue buffer size $BF_i^1$ required by the $i^{th}$ service level to meet a requirement of the value of the maximum delay $D_i$ is represented as follows:

$$BF_i^1 = \left(\frac{L_{max,L} + \sum_{1 \le j \le n, j \ne i}(L_j + Q_j) + L_{n+1} + Q_{n+1}^1}{C} + \right. \quad (1\text{-}6)$$

$$\left. \frac{L_i\left(\sum_{1 \le j \le n, j \ne i} Q_j + Q_{n+1}^1\right)}{CQ_i^1}\right) * r_i^1 + b_i^1$$

If the global adjustment calculation unit 114 calculates that a threshold that is of the $i^{th}$ service level, that is of a burst amount of a data flow, and that needs to be subtracted is $\Delta b_i$, a first update value of an updated threshold of the burst amount of the data flow is $b_{i1}^2 = b_i^1 - \Delta b_i$, and if a threshold that is of an average rate of the data flow and that needs to be subtracted is $\Delta r_i$, a first update value of an updated threshold of the average rate of the data flow is $r_{i1}^2 = r_i^1 - \Delta r_i$. After the configuration update of the $i^{th}$ service level, as shown in (1) in FIG. 7, $\beta_i^2(t)$ represents an updated service curve of the $i^{th}$ service level, a horizontal coordinate intercept of $\beta_i^2(t)$ is $T_i^2$, and $\alpha_i^2(t)$ represents an updated arrival curve of the $i^{th}$ service level. In this case, the value of the maximum delay $D_i$ of the $i^{th}$ service level remains unchanged, and may be re-represented as follows:

$$D_i = \frac{L_{max,L} + \sum_{1 \le j \le n, j \ne i}(L_j + Q_j) + L_{n+1} + Q_{n+1}^2}{C} + \quad (1\text{-}7)$$

$$\frac{L_i\left(\sum_{1 \le j \le n, j \ne i} Q_j + Q_{n+1}^2\right)}{CQ_i^2} + \frac{b_{i1}^2\left(Q_{i1}^2 + \sum_{1 \le j \le n, j \ne i} Q_j + Q_{n+1}^2\right)}{CQ_i^2} + T_0$$

Herein, $Q_{i1}^2$ is a newly calculated first maximum amount of data that can be forwarded when the $i^{th}$ service level is scheduled, that is, a first maximum amount of data that can be forwarded at the target service level after the parameter of the target service level is adjusted, and $Q_{n+1}^2$ is a newly calculated maximum amount of data that can be forwarded in the non-delay-guarantee queue, that is, a maximum amount of data that can be forwarded in the non-delay-guarantee queue after the parameter of the target service level is adjusted. To ensure that a delay requirement of another service level is not affected after the configuration update of the $i^{th}$ service level, the following constraint needs to be ensured:

$$Q_i^1 + Q_{n+1}^1 = Q_{i1}^2 + Q_{n+1}^2 \quad (1\text{-}8)$$

According to Formula (1-5), Formula (1-7), and Formula (1-8), the first maximum amount $Q_{i1}^2$ of data that can be forwarded when the $i^{th}$ service level is scheduled after the configuration update may be calculated as follows:

$$Q_{i1}^2 = \frac{(Q_i^1)^2 - (L_i + b_i^1)\left(\sum_{1 \le j \le n, j \ne i} Q_j + Q_i^1 + Q_{n+1}^1\right)}{2Q_i^1} + \quad (1\text{-}9)$$

$$\sqrt{\frac{\left[(L_i + b_i^1)\left(\sum_{1 \le j \le n, j \ne i} Q_j + Q_i^1 + Q_{n+1}^1\right) - (Q_i^1)^2\right]^2}{4(Q_i^1)^2} + (L_i + b_i^2)\left(\sum_{1 \le j \le n, j \ne i} Q_j + Q_i^1 + Q_{n+}^1\right)}$$

According to Formula (1-8) and Formula (1-9), the maximum amount $Q_{n+1}^2$ of data scheduled in the non-delay-guarantee queue each time after the update is represented as follows:

$$Q_{n+1}^2 = Q_i^1 + Q_{n+1}^1 - \frac{(Q_i^1)^2 - (L_i + b_i^1)\left(\sum_{1 \le j \le n, j \ne i} Q_j + Q_i^1 + Q_{n+1}^1\right)}{2Q_i^1} - \sqrt{\frac{\left[(L_i + b_i^1)\left(\sum_{1 \le j \le n, j \ne i} Q_j + Q_i^1 + Q_{n+1}^1\right) - (Q_i^1)^2\right]^2}{4(Q_i^1)^2} + (L_i + b_i^2)\left(\sum_{1 \le j \le n, j \ne i} Q_j + Q_i^1 + Q_{n+}^1\right)} \quad (1\text{-}10)$$

According to Formula (1-8) and Formula (1-9), an updated reserved queue bandwidth of the $i^{th}$ service level, that is, a first update value $C_{i1}^2$ of a queue bandwidth, is calculated as follows:

$$C_{i1}^2 = C \frac{Q_{i1}^2}{\sum_{1 \le j \le n, j \ne i} Q_j + Q_i^1 + Q_{n+1}^1} \quad (1\text{-}11)$$

Herein, $Q_{i1}^2$ is the first maximum amount of data that can be forwarded at the target service level after the parameter of the target service level is adjusted, $Q_j$ is a maximum amount of data that can be forwarded at a $j^{th}$ service level, $Q_i^1$ is a maximum amount of data that can be forwarded at the target service level before the parameter of the target service level is adjusted, $Q_{n+1}^1$ is a maximum amount of data that can be forwarded in a non-delay-guarantee queue before the parameter of the target service level is adjusted, and n is a positive integer greater than 1.

According to Formula (1-6), Formula (1-8), and Formula (1-9), after the configuration update, a minimum queue buffer size required by the $i^{th}$ service level, that is, a first update value $BF_{i1}^2$ of a queue buffer, is calculated as follows:

$$BF_{i1}^2 = \left(\frac{L_{max,L} + \sum_{1 \le j \le n, j \ne i}(L_j + Q_j) + L_{n+1} + Q_{n+1}^2}{C} + \frac{L_i\left(\sum_{1 \le j \le n, j \ne i} Q_j + Q_{n+1}^2\right)}{CQ_{i1}^2}\right) * r_{i1}^2 + b_{i1}^2 \quad (1\text{-}12)$$

Herein, $L_{max,L}$ is a maximum packet length of a low-priority queue, C is a bandwidth of a port corresponding to the target service level, $Q_{i1}^2$ is the first maximum amount of data that can be forwarded at the target service level after the parameter of the target service level is adjusted, $Q_j$ is the maximum amount of data that can be forwarded at the $j^{th}$ service level, $L_{n+1}$ is a maximum packet length of the non-delay-guarantee queue, $L_j$ is a maximum packet length of a queue at the $j^{th}$ service level, $b_{i1}^2$ is the first update value of the threshold of the burst amount of the data flow, $b_{i1}^2 = b_i^1 - \Delta b_{i1}$, $b_i^1$ is the threshold of the burst amount of the data flow that exists before the parameter of the target service level is adjusted, $\Delta b_{i1}$ is a value by which the threshold that is of the burst amount of the data flow and that is of the target service level is decreased, $r_{i1}^2$ is the first update value of the threshold of the average rate of the data flow, $r_{i1}^2 = r_i^1 - \Delta r_{i1}$, $r_i^1$ is the threshold of the average rate of the data flow that exists before the parameter of the target service level is adjusted, $\Delta r_{i1}$ is a value by which the threshold of the average rate of the data flow is decreased, $L_i$ is a maximum packet length of a queue at the target service level, $Q_{n+1}^2$ is a maximum amount of data that can be forwarded in the non-delay-guarantee queue after the parameter of the target service level is adjusted, and n is a positive integer greater than 1.

In an example embodiment, if resources such as a bandwidth and a buffer that can be currently preempted by a non-delay-guarantee queue on a same port of the first network device are sufficient to meet a requirement of a queue resource that is of the target service level and that needs to be additionally added, a local configuration update execution unit 124 preempts a corresponding resource of the non-delay-guarantee queue, transfers the resource to the target service level, and updates the parameter of the target service level based on a new queue bandwidth and buffer requirement.

Manner 2:

Based on Case 4, Case 5, Case 6, or Case 7 in 504, the global adjustment calculation unit 114 calculates data flow admission that is of the related service level and that needs to be additionally added (including a threshold that is of a burst amount of a data flow and that needs to be added, a threshold that is of an average rate of a data flow and that needs to be added, or the like), and calculates, when a maximum delay associated with the target service level remains unchanged, a queue resource that is of the target service level and that needs to be correspondingly added (including a reserved queue bandwidth, a queue buffer, or the like that needs to be added). A calculation result needs to ensure that the added queue resource of the target service level does not exceed a sum of a resource (including a bandwidth or a buffer) that is of a non-delay-guarantee queue and that can be preempted on a same port and a queue resource that can be released by another service level on the same port without affecting a maximum delay requirement of the another service level.

For example, if the global adjustment calculation unit 114 calculates an update configuration of a service level according to a network calculus theory, a principle is shown in a schematic diagram of a port in FIG. 6. For related parameters, refer to descriptions in Manner 1. Details are not described herein again.

For example, before the configuration update of the $i^{th}$ service level, an egress bandwidth of the $i^{th}$ service level is $C_i^1 = C * Q_i^1 / (Q_i^1 + \Sigma_{1 \le j \le n, j \ne i} Q_j)$. Correspondingly, before the configuration update of the $i^{th}$ service level, a threshold that is of the $i^{th}$ service level and that is of a burst amount of a data flow is $b_i^1$, and an average rate is $r_i^1$. As shown in (2) in FIG. 7, $\alpha_i^1(t)$ represents an arrival curve existing before the update of the $i^{th}$ service level. In this case, a service curve $\beta_i^1(t)$ of the $i^{th}$ service level is represented as follows:

(2-1)

$$\beta_i^1(t) = \left( C \frac{Q_i^1}{Q_i^1 + \sum_{1 \le j \le n, j \ne i} Q_j + Q_{n+1}^1} \left( t - \frac{L_{max,L} + \sum_{1 \le j \le n, j \ne i}(L_j + Q_j) + L_{n+1} + Q_{n+1}^1}{C} - \frac{L_i\left(\sum_{1 \le j \le n, j \ne i} Q_j + Q_{n+1}^1\right)}{CQ_i^1} \right) - T_0 \right)^+$$

Herein, $$\left( C \frac{Q_i^1}{Q_i^1 + \sum_{1 \le j \le n, j \ne i} Q_j + Q_{n+1}^1} \left( t - \frac{L_{max,L} + \sum_{1 \le j \le n, j \ne i}(L_j + Q_j) + L_{n+1} + Q_{n+1}^1}{C} - \frac{L_i\left(\sum_{1 \le j \le n, j \ne i} Q_j + Q_{n+1}^1\right)}{CQ_i^1} - T_0 \right) \right)^+$$

is to obtain a larger value in a value of $$C \frac{Q_i^1}{Q_i^1 + \sum_{1 \le j \le n, j \ne i} Q_j + Q_{n+1}^1} \left( t - \frac{L_{max,L} + \sum_{1 \le j \le n, j \ne i}(L_j + Q_j) + L_{n+1} + Q_{n+1}^1}{C} - \frac{L_i\left(\sum_{1 \le j \le n, j \ne i} Q_j + Q_{n+1}^1\right)}{CQ_i^1} - T_0 \right)$$

and 0, where $T_0$ is a time offset. For example, if the maximum delay $D_i$ is a delay of transmitting a data flow by a single network device that includes an ingress port queuing delay, an egress port queuing delay, a processing delay, and a sending delay, $T_0$ is defined as a sum of the ingress port queuing delay, the processing delay, and the sending delay of the network device. For example, if the maximum delay $D_i$ is an egress port queuing delay, $T_0$ is defined as 0.

A value of the maximum delay $D_i$ of the $i^{th}$ service level is represented as follows:

$$D_i = \frac{L_{max,L} + \sum_{1 \le j \le n, j \ne i}(L_j + Q_j) + L_{n+1} + Q_{n+1}^1}{C} + \frac{L_i\left(\sum_{1 \le j \le n, j \ne i} Q_j + Q_{n+1}^1\right)}{CQ_i^1} + \frac{b_i^1\left(Q_i^1 + \sum_{1 \le j \le n, j \ne i} Q_j + Q_{n+1}^1\right)}{CQ_i^1} + T_0 \quad (2\text{-}2)$$

Correspondingly, before the configuration update, a minimum queue buffer size $BF_i^1$ required by the $i^{th}$ service level to meet a requirement of the value of the maximum delay $D_i$ is represented as follows:

$$BF_i^1 = \left( \frac{L_{max,L} + \sum_{1 \le j \le n, j \ne i}(L_j + Q_j) + L_{n+1} + Q_{n+1}^1}{C} + \right. \quad (2\text{-}3)$$

-continued $$\left. \frac{L_i\left(\sum_{1 \le j \le n, j \ne i} Q_j + Q_{n+1}^1\right)}{CQ_i^1} \right) * r_i^1 + b_i^1$$

If the global adjustment calculation unit 114 calculates that a threshold that is of the $i^{th}$ service level, that is of a burst amount of a data flow, and that needs to be added is $\Delta b_{i2}$, a second update value of an updated threshold of the burst amount of the data flow is $b_{i2}^2 = b_i^1 + \Delta b_{i2}$, and if a threshold that is of an average rate of the data flow and that needs to be added is $\Delta r_{i2}$, a second update value of an updated threshold of the average rate of the data flow is $r_{i2}^2 = r_i^1 + \Delta r_{i2}$.

For example, for the queue resource that is of the target service level and that needs to be added, the resource (the bandwidth or the buffer) that is of the non-delay-guarantee queue and that can be preempted on the same port is preferentially preempted. If the resource that is of the non-delay-guarantee queue and that can be preempted on the same port does not meet a requirement, the queue resource that can be released by the another service level on the same port without affecting the maximum delay requirement of the another service level is further preempted. Specifically, (1) if there is a non-delay-guarantee queue on a same port, there are the following cases: (1a) if a resource that can be preempted by the non-delay-guarantee queue is sufficient to meet an adjustment requirement of the target service level, the target service level directly preempts a minimum quantity of non-delay-guarantee queue resources that can meet the adjustment requirement; (1b) if a resource that can be preempted by the non-delay-guarantee queue is insufficient to meet an adjustment requirement of the target service level, the target service level first preempts all resources that can be preempted by the non-delay-guarantee queue, and then sequentially preempts queue resources that can be released by other service levels on the same port without affecting a maximum delay requirement of the another service level until the adjustment requirement of the target service level is met. (2) If there is no non-delay-guarantee queue on a same port, the target service level directly and sequentially preempts queue resources that can be released by other service levels on the same port without affecting a maximum delay requirement of the another service level until an adjustment requirement of the target service level is met.

Case 1: There is the non-delay-guarantee queue. It is first determined whether the resource that can be preempted by the non-delay-guarantee queue meets the adjustment requirement of the target service level. When the value of the maximum delay $D_i$ of the $i^{th}$ service level remains unchanged, it is assumed that to meet updated traffic admission (including a second update value $b_{i2}^2$ of a threshold of a burst amount of a data flow, and a second update value $r_{i2}^2$ of a threshold of an average rate of the data flow), a maximum amount of data that can be forwarded when the $i^{th}$ service level is scheduled needs to be updated to $Q_i^{ass}$, and correspondingly, a maximum amount of data that can be forwarded when the non-delay-guarantee queue is scheduled needs to be updated to $Q_{n+1}^{ass}$. For example, after the configuration update of the $i^{th}$ service level, as shown in (2) in FIG. 7, $\beta_i^2(t)$ represents an updated service curve of the $i^{th}$ service level, a horizontal coordinate intercept of $\beta_i^2(t)$ is $T_i^2$, and $\alpha_i^2(t)$ represents an updated arrival curve of the $i^{th}$ service level. In this case, $D_i$ may be re-represented as follows:

$$D_i = \frac{L_{max,L} + \sum_{1 \le j \le n, j \ne i}(L_j + Q_j) + L_{n+1} + Q_{n+1}^{ass}}{C} + \frac{L_i(\sum_{1 \le j \le n, j \ne i} Q_j + Q_{n+1}^{ass})}{CQ_i^{ass}} + \frac{b_i^2(Q_i^{ass} + \sum_{1 \le j \le n, j \ne i} Q_j + Q_{n+1}^{ass})}{CQ_i^{ass}} + T_0 \quad (2\text{-}4)$$

To ensure that a delay requirement of another service level is not affected after the update of the $i^{th}$ service level, the following constraint needs to be ensured:

$$Q_i^1 + Q_{n+1}^1 = Q_i^{ass} + Q_{n+1}^{ass} \quad (2\text{-}5)$$

According to Formula (2-2), Formula (2-4), and Formula (2-5), the maximum amount $Q_i^{ass}$ of data that can be forwarded when the $i^{th}$ service level is scheduled and that needs to be updated when the adjustment requirement is met may be calculated as follows:

$$Q_i^{ass} = \frac{(Q_i^1)^2 - (L_i + b_i^1)(\sum_{1 \le j \le n, j \ne i} Q_j + Q_i^1 + Q_{n+1}^1)}{2Q_i^1} + \sqrt{\frac{[(L_i + b_i^1)(\sum_{1 \le j \le n, j \ne i} Q_j + Q_i^1 + Q_{n+1}^1) - (Q_i^1)^2]^2}{4(Q_i^1)^2} + (L_i + b_i^2)(\sum_{1 \le j \le n, j \ne i} Q_j + Q_i^1 + Q_{n+}^1)} \quad (2\text{-}6)$$

According to Formula (2-5) and Formula (2-6), the maximum amount $Q_{n+1}^{ass}$ of data that is scheduled in the non-delay-guarantee queue each time and that needs to be updated when the adjustment requirement is met is represented as follows:

$$Q_{n+1}^{ass} = Q_i^1 + Q_{n+1}^1 - \frac{(Q_i^1)^2 - (L_i + b_i^1)(\Sigma_{1 \le j \le n, j \ne i} Q_j + Q_i^1 + Q_{n+1}^1)}{2Q_i^1} - \sqrt{\frac{[(L_i + b_i^1)(\Sigma_{1 \le j \le n, j \ne i} Q_j + Q_i^1 + Q_{n+1}^1) - (Q_i^1)^2]^2}{4(Q_i^1)^2} + (L_i + b_i^2)(\Sigma_{1 \le j \le n, j \ne i} Q_j + Q_i^1 + Q_{N+1}^1)} \quad (2\text{-}7)$$

According to Formula (2-5) and Formula (2-6), it is calculated that a reserved queue bandwidth $C_i^{ass}$ of the $i^{th}$ service level needs to be updated to the following when the adjustment requirement is met:

$$C_i^{ass} = C \frac{Q_i^{ass}}{\Sigma_{1 \le j \le n, j \ne i} Q_j + Q_i^1 + Q_{n+1}^1} \quad (2\text{-}8)$$

According to Formula (2-3), Formula (2-5), and Formula (2-6), it is calculated that a minimum queue buffer size $BF_i^{ass}$ required by the $i^{th}$ service level needs to be updated to the following when the adjustment requirement is met:

$$BF_i^{ass} = \left( \frac{L_{max,L} + \Sigma_{1 \le j \le n, j \ne i}(L_j + Q_j) + L_{n+1} + Q_{n+1}^{ass}}{C} + \frac{L_i(\Sigma_{1 \le j \le n, j \ne i} Q_j + Q_{n+1}^{ass})}{CQ_i^{2a}} \right) * r_{i2}^2 + b_{i2}^2 \quad (2\text{-}9)$$

Case 1A: It is defined that a maximum bandwidth resource that can be currently preempted by the non-delay-guarantee queue is $\Delta C_{n+1}$, and a maximum buffer resource that can be preempted is $\Delta BF_{n+1}$. A resource that can be currently preempted by the non-delay-guarantee queue meets an adjustment requirement of the target service level, that is, the following two conditions are met:

$$C_{n+1}^1 - C_{n+1}^{ass} = C_i^{ass} - C_i^1 = C \frac{Q_i^{ass} - Q_i^1}{\Sigma_{1 \le j \le n, j \ne i} Q_j + Q_i^1 + Q_{n+1}^1} \le \Delta C_{n+1} \quad (2\text{-}10)$$

$$BF_{n+1}^1 - BF_{n+1}^{ass} = BF_i^{ass} - BF_i^1 \le \Delta B_{n+1} \quad (2\text{-}11)$$

In this case, it may be determined that a second update value CZ of a queue bandwidth of the target service level is equal to $C_i^{ass}$, and a second update value $BF_{i2}^2$ of a queue buffer is equal to $BF_i^{ass}$.

For a process of determining the second update value $C_{i2}^2$ of the queue bandwidth and the second update value $BF_{i2}^2$ of the queue buffer, refer to the adjustment manner in the first case in 402. The second update value $C_{i2}^2$ of the queue bandwidth is as follows:

$$C_{i2}^2 = C \frac{Q_{i2}^2}{\Sigma_{1 \le j \le n, j \ne i} Q_j + Q_i^1 + Q_{n+1}^1}$$

For a process of determining $Q_{i2}^2$, refer to the foregoing process of determining $Q_i^{ass}$.

The second update value $BF_{i2}^2$ of the queue buffer is as follows:

$$BF_{i2}^2 =$$

$$\left( \frac{L_{max,L} + \Sigma_{1 \le j \le n, j \ne i}(L_j + Q_j) + L_{n+1} + Q_{n+1}^2}{C} + \frac{L_i(\Sigma_{1 \le j \le n, j \ne i} Q_j + Q_{n+1}^2)}{C Q_{i2}^2} \right) *$$

$$r_{i2}^2 + b_{i2}^2$$

For a process of determining $Q_{n+1}^2$, refer to the foregoing process of determining $Q_{n+1}^{ass}$.

Case 1B: If a resource that can be currently preempted by the non-delay-guarantee queue does not meet an adjustment requirement of the target service level, the adjusting the target service level based on a maximum delay associated with the target service level includes: determining a second update value of a data flow constraint parameter; determining a second update value of a queue resource parameter based on the second update value of the data flow constraint parameter when the maximum delay remains unchanged; and when the second update value of the queue resource parameter is greater than a resource threshold, switching a target data flow corresponding to the target service level to a data flow corresponding to another service level, where the another service level includes another service level of the first network device or a service level of another device.

Alternatively, the target service level first preempts all resources that can be preempted by the non-delay-guarantee queue, and then sequentially preempts queue resources that can be released by other service levels on a same port without affecting a maximum delay requirement of the another service level until an adjustment requirement of the target service level is met.

For example, to simplify analysis, it is assumed that a buffer resource that can be currently preempted by the non-delay-guarantee queue is large enough to always meet the adjustment requirement of the target service level. The following mainly describes a bandwidth resource adjustment process. Considering that a bandwidth resource that can be currently preempted by the non-delay-guarantee queue is insufficient and cannot meet the adjustment requirement of the target service level, details are as follows:

$$C_{n+1}^1 - C_{n+1}^{ass} = C_i^{ass} - C_i^1 = C \frac{Q_i^{ass} - Q_i^1}{\Sigma_{1 \le j \le n, j \ne i} Q_j + Q_i^1 + Q_{n+1}^1} > \Delta C_{n+1} \quad (2\text{-}12)$$

Herein, $C_i^{ass}$ and $C_{n+1}^{ass}$ are respectively the foregoing calculated bandwidth resources that are of the target service level and the non-delay-guarantee queue and that need to be obtained through adjustment when the adjustment requirement is met. A bandwidth resource of the non-delay-guarantee queue is first adjusted to a maximum value $C_{n+1}^2 = C_{n+1}^1 - \Delta C_{n+1}$ allowed to be obtained through adjustment, and is used as an update value that is of the bandwidth and that is finally determined by the non-delay-guarantee queue.

In this case, an update value of the maximum amount of data that can be forwarded when the non-delay-guarantee queue is determined as follows:

$$Q_{n+1}^2 = Q_{n+1}^1 - \frac{\Delta C_{n+1}}{C} (\Sigma_{1 \le j \le n, j \ne i} Q_j + Q_i^1 + Q_{n+1}^1) \quad (2\text{-}13)$$

According to Formula (2-5), a bandwidth resource of the target service level needs to be adjusted to $C_i^{temp} = C_i^1 + \Delta C_{n+1}$. Correspondingly, in this case, the maximum amount of data that can be forwarded when the target service level is adjusted needs to be adjusted to the following:

$$Q_i^{temp} = Q_i^1 + \frac{\Delta C_{n+1}}{C} (\Sigma_{1 \le j \le n, j \ne i} Q_j + Q_i^1 + Q_{n+1}^1) \quad (2\text{-}14)$$

Because the adjustment requirement of the target service level cannot be met after preemption of the bandwidth resource of the non-delay-guarantee queue, adjustment parameters $Q_i^{temp}$ and $C_i^{temp}$ of the target service level in this case are only temporary. Therefore, preempting queue resources that can be released by other service levels on a same port without affecting a maximum delay requirement of the another service level further needs to be considered. For ease of description, preemption of a corresponding queue resource of a non-delay-guarantee queue or preemption of a corresponding queue resource of another queue on a same port is considered as an iteration process. In this case, the preemption of the corresponding queue resource of the non-delay-guarantee queue is considered as a first iteration process. For ease of unified representation, $C_i^{ass}$, $Q_i^{ass}$, $C_i^{temp}$, and $Q_i^{temp}$ are respectively re-represented as $C_i^{ass(1)}$, $Q_i^{ass(1)}$, $C_i^{temp(1)}$, and $Q_i^{temp(1)}$.

According to Formula (2-6), in the first iteration process, a threshold $b_i^{temp(1)}$ that is of a burst amount of a data flow and that is in admission traffic of the target service level needs to satisfy the following:

$$Q_i^{temp(1)} = \frac{(Q_i^1)^2 - (L_i + b_i^1)(\Sigma_{1 \le j \le n, j \ne i} Q_j + Q_i^1 + Q_{n+1}^1)}{2 Q_i^1} + \quad (2\text{-}15)$$

$$\sqrt{\frac{[(L_i + b_i^1)(\Sigma_{1 \le j \le n, j \ne i} Q_j + Q_i^1 + Q_{n+1}^1) - (Q_i^1)^2]^2}{4(Q_i^1)^2} + (L_i + b_i^{temp(1)})(\Sigma_{1 \le j \le n, j \ne i} Q_j + Q_i^1 + Q_{n+1}^1)}$$

It is considered to select any one of other service levels on the same port for preemption, to start a second iteration process. It is assumed that a $k^{th}$ service level is selected. In the second iteration process, a parameter $Q_j$ of another current service level and a parameter $Q_{n+1}$ of a non-delay-guarantee queue remain unchanged except for the target service level and the $k^{th}$ service level. It is defined that total traffic admission parameters that are of the $k^{th}$ service level and that exist before update are $b_k^1$ and $r_k^1$, which are respectively a threshold that is of a burst amount of a data flow and that exists before update and a threshold that is of an average rate of the data flow and that exists before update. In addition, it is defined that current allowable traffic parameters of the $k^{th}$ service level are $b\_a_k^1$ and $r\_a_k^1$, which are respectively a threshold of a current allowable burst amount and a threshold of a current allowable average rate. Based on definitions, $b\_a_k^1 \leq b_k^1$ and $r\_a_k^1 \leq r_k^1$. It should be noted that a manner of selecting another service level is not limited in this embodiment of this application, and may be determined based on experience or some rules, for example, an idle service level is preferentially selected.

In the second iteration process, a maximum amount of data that can be forwarded when the $i^{th}$ service level is scheduled and that needs to be updated when the adjustment requirement is met is defined as $Q_i^{ass(2)}$. Correspondingly, a maximum amount of data that can be forwarded when the $k^{th}$ service level is scheduled and that needs to be updated when the adjustment requirement is met is defined as $Q_k^{ass}$. Similar to Formula (2-5), to ensure that a maximum delay of another service level is not affected when the $i^{th}$ service level and the $k^{th}$ service level are adjusted, the following constraint needs to be met:

$$Q_i^{temp(1)} + Q_k^1 = Q_i^{ass(2)} + Q_k^{ass} \quad (2\text{-}16)$$

Herein, $Q_k^1 = Q_k$ is a maximum amount of data that can be forwarded when the $k^{th}$ service level is scheduled before the update.

Similar to Formula (2-6), in the second iteration process, the maximum amount $Q_i^{ass(2)}$ of data that can be forwarded when the $i^{th}$ service level is scheduled and that needs to be updated when the adjustment requirement is met is represented as follows:

$$Q_i^{ass(2)} = \frac{(Q_i^{temp(1)})^2 - (L_i + b_i^{temp(1)})(\Sigma_{1 \leq j \leq n, j \neq i, j \neq k} Q_j + Q_i^{temp(1)} + Q_k^1 + Q_{n+1}^2)}{2 Q_i^1} + $$

$$\sqrt{\frac{\left([(L_i + b_i^{temp(1)})(\Sigma_{1 \leq j \leq n, j \neq i, j \neq k} Q_j + Q_i^{temp(1)} + Q_k^1 + Q_{n+1}^2) - (Q_i^{temp(1)})^2]^2\right)}{(4(Q_i^{temp(1)})^2)}} + = $$
$$(L_i + b_i^2)(\Sigma_{1 \leq j \leq n, j \neq i, j \neq k} Q_j + Q_i^{temp(1)} + Q_k^1 + Q_{n+1}^2) \quad (2\text{-}17)$$

$$\frac{(Q_i^{temp(1)})^2 - (L_i + b_i^{temp(1)})(\Sigma_{1 \leq j \leq n, j \neq i} Q_j + Q_i^1 + Q_{n+1}^1)}{2 Q_i^1} + $$

$$\sqrt{\frac{[(L_i + b_i^{temp(1)})(\Sigma_{1 \leq j \leq n, j \neq i} Q_j + Q_i^1 + Q_{n+1}^1) - (Q_i^{temp(1)})^2]^2}{4(Q_i^{temp(1)})^2} + }$$
$$(L_i + b_i^2)(\Sigma_{1 \leq j \leq n, j \neq i} Q_j + Q_i^1 + Q_{n+1}^1)$$

Similar to Formula (2-7), in the second iteration process, the maximum amount $Q_k^{ass}$ of data that can be forwarded when the $k^{th}$ service level is scheduled and that needs to be updated when the adjustment requirement is met is represented as follows:

(2-18)

$$Q_k^{ass} = Q_i^{temp(1)} + Q_k^1 - $$

$$\frac{(Q_i^{temp(1)})^2 - (L_i + b_i^{temp(1)})(\Sigma_{1 \leq j \leq n, j \neq i} Q_j + Q_i^1 + Q_{n+1}^1)}{2 Q_i^1} - $$

$$\sqrt{\frac{[(L_i + b_i^{temp(1)})(\Sigma_{1 \leq j \leq n, j \neq i, j \neq k} Q_j + Q_i^1 + Q_{n+1}^1) - (Q_i^{temp(1)})^2]^2}{4(Q_i^{temp(1)})^2} + }$$
$$(L_i + b_i^2)(\Sigma_{1 \leq j \leq n, j \neq i, j \neq k} Q_j + Q_i^1 + Q_{n+1}^1)$$

A queue resource that can be released by the $k^{th}$ service level without affecting a maximum delay requirement of the $k^{th}$ service level is sufficient to meet the adjustment requirement of the target service level, that is, after the target service level and the $k^{th}$ service level are adjusted based on $Q_i^{ass(2)}$ and $Q_k^{ass}$, a maximum delay of current allowable traffic of the $k^{th}$ service level still meets the requirement, that is, the following condition is met:

$$\frac{L_{max,L} + \Sigma_{1 \leq j \leq n, j \neq i, j \neq k}(L_j + Q_j)L_i + Q_i^{ass(2)} + L_{n+1} + Q_{n+1}^2}{C} + \quad (2\text{-}19)$$

$$\frac{L_k(\Sigma_{1 \leq j \leq n, j \neq i, j \neq k} Q_j + Q_i^{ass(2)} + Q_{n+1}^2)}{CQ_k^{ass}} + $$

$$\frac{b\_a_k^1(Q_k^{ass} + \Sigma_{1 \leq j \leq n, j \neq i, j \neq k} Q_j + Q_i^{ass(2)} + Q_{n+1}^2)}{CQ_k^{ass}} \leq $$

$$\frac{L_{max,L} + \Sigma_{1 \leq j \leq n, j \neq i, j \neq k}(L_j + Q_j) + L_i + Q_i^1 + L_{n+1} + Q_{n+1}^1}{c} + $$

$$\frac{L_k(\Sigma_{1 \leq j \leq n, j \neq i, j \neq k} Q_j + Q_i^1 + Q_{n+1}^1)}{CQ_k^1} + $$

$$\frac{b_k^1(Q_k^1 + \Sigma_{1 \leq j \leq n, j \neq i, j \neq k} Q_j + Q_i^1 + Q_{n+1}^1)}{CQ_k^1}$$

In this case, it may be finally determined that the maximum amount $Q_i^2$ of data that can be forwarded when the target service level is scheduled is equal to $Q_i^{ass(2)}$, and a third update value $C_i^2$ of the queue bandwidth of the target service level is as follows:

$$C_i^2 = C \frac{Q_i^{ass(2)}}{\Sigma_{1 \leq j \leq n, j \neq i} Q_j + Q_i^1 + Q_{n+1}^1} \quad (2\text{-}20)$$

It is finally determined that the maximum amount $Q_k^2$ of data that can be forwarded when the $k^{th}$ service level is scheduled is equal to $Q_k^{ass}$, and an update value $C_k^2$ of a queue bandwidth of the $k^{th}$ service level is as follows:

$$C_k^2 = C \frac{Q_k^{ass}}{\Sigma_{1 \leq j \leq n, j \neq i} Q_j + Q_i^1 + Q_{n+1}^1} \quad (2\text{-}21)$$

It is finally determined that a third update value $BF_i^2$ of the queue buffer of the target service level is as follows:

$$BF_i^2 = \left(\frac{L_{max,L} + \Sigma_{1 \leq j \leq n, j \neq i, j \neq k}(L_j + Q_j) + L_k + Q_k^2 + L_{n+1} + Q_{n+1}^2}{C} + \right. \quad (2\text{-}22)$$

$$\left. \frac{L_i(\Sigma_{1 \leq j \leq n, j \neq i, j \neq k} Q_j + Q_k^2 + Q_{n+1}^2)}{CQ_i^2}\right) * r_{i2}^2 + b_{i2}^2$$

In addition, it is finally determined that an update value $BF_k^2$ of a queue buffer of the $k^{th}$ service level is as follows:

$$BF_k^2 = \left(\frac{L_{max,L} + \Sigma_{1 \leq j \leq n, j \neq i, j \neq k}(L_j + Q_j) + L_i + Q_i^2 + L_{n+1} + Q_{n+1}^2}{C} + \right. \quad (2\text{-}23)$$

$$\left. \frac{L_k(\Sigma_{1 \leq j \leq n, j \neq i, j \neq k} Q_j + Q_i^2 + Q_{n+1}^2)}{CQ_k^2}\right) * r_k^2 + b_k^2$$

Herein, $b_k^2$ and $r_k^2$ are update values of traffic admission parameters of the $k^{th}$ service level, and specific values of the update values can be calculated by using the following formulas:

$$\frac{L_{max,L} + \Sigma_{1 \le j \le n, j \ne i, j \ne k}(L_j + Q_j) + L_i + Q_i^2 + L_{n+1} + Q_{n+1}^2}{C} + \quad (2\text{-}24)$$

$$\frac{L_k(\Sigma_{1 \le j \le n, j \ne i, j \ne k}Q_j + Q_i^2 + Q_{n+1}^2)}{CQ_k^2} +$$

$$\frac{b_k^2(Q_k^2 + \Sigma_{1 \le j \le n, j \ne i, j \ne k}Q_j + Q_i^2 + Q_{n+1}^2)}{CQ_k^2} =$$

$$\frac{L_{max,L} + \Sigma_{1 \le j \le n, j \ne i, j \ne k}(L_j + Q_j) + L_i + Q_i^1 + L_{n+1} + Q_{n+1}^1}{C} +$$

-continued $$\frac{b\_a_k^1(Q_k^{ass} + \Sigma_{1 \le j \le n, j \ne i, j \ne k}Q_j + Q_i^{ass(2)} + Q_{n+1}^2)}{CQ_k^{ass}} >$$

$$\frac{L_{max,L} + \Sigma_{1 \le j \le n, j \ne i, j \ne k}(L_j + Q_j) + L_i + Q_i^1 + L_{n+1} + Q_{n+1}^1}{C} +$$

$$\frac{L_k(\Sigma_{1 \le j \le n, j \ne i, j \ne k}Q_j + Q_i^1 + Q_{n+1}^1)}{CQ_i^1} +$$

$$\frac{b_k^1(Q_k^1 + \Sigma_{1 \le j \le n, j \ne i, j \ne k}Q_j + Q_i^1 + Q_{n+1}^1)}{CQ_i^1}$$

In this case, the maximum amount of data that can be forwarded when the $k^{th}$ service level is scheduled is first adjusted to a maximum value $Q_k^2$ allowed to be obtained through adjustment, and is used as an update value that is of the bandwidth and that is finally determined by the $k^{th}$ service level. Similar to Formula (2-15), $Q_k^2$ is calculated as follows:

$$Q_k^2 = \frac{(Q_k^1)^2 - (L_k + b_k^1)(\Sigma_{1 \le j \le n, j \ne i}Q_j + Q_i^1 + Q_{n+1}^1)}{2Q_k^1} + \quad (2\text{-}27)$$

$$\sqrt{\frac{[(L_k + b_k^1)(\Sigma_{1 \le j \le n, j \ne i}Q_j + Q_i^1 + Q_{n+1}^1) - (Q_k^1)^2]^2}{4(Q_k^1)^2} + (L_k + b\_a_k^1)(\Sigma_{1 \le j \le n, j \ne i}Q_j + Q_i^1 + Q_{n+1}^1)}$$

-continued $$\frac{L_k(\Sigma_{1 \le j \le n, j \ne i, j \ne k}Q_j + Q_i^1 + Q_{n+1}^1)}{CQ_k^1} +$$

$$\frac{b_k^1(Q_k^1 + \Sigma_{1 \le j \le n, j \ne i, j \ne k}Q_j + Q_i^1 + Q_{n+1}^1)}{CQ_k^1}$$

$$r_k^2 = \frac{b_k^2}{b_k^1} * r_k^1 \quad (2\text{-}25)$$

Similar to Formula (2-16), to ensure that a maximum delay of another service level is not affected when the $i^{th}$ service level and the $k^{th}$ service level are adjusted, the following constraint needs to be met:

$$Q_i^{temp(1)} + Q_k^1 = Q_i^{temp(2)} + Q_k^2 \quad (2\text{-}28)$$

In this case, in the second iteration process, the maximum amount of data that is forwarded when the target service level is scheduled is updated to $Q_i^{temp(2)}$, and in the second iteration process, a threshold $b_i^{temp(2)}$ that is of a burst amount of a data flow and that is in admission traffic of the target service level needs to satisfy the following:

$$Q_i^{temp(2)} = \frac{(Q_i^{temp(1)})^2 - (L_i + b_i^{temp(1)})(\Sigma_{1 \le j \le n, j \ne i}Q_j + Q_i^1 + Q_{n+1}^1)}{2Q_i^{temp(1)}} + \quad (2\text{-}29)$$

$$\sqrt{\frac{[(L_i + b_i^{temp(1)})(\Sigma_{1 \le j \le n, j \ne i}Q_j + Q_i^1 + Q_{n+1}^1) - (Q_i^{temp(1)})^2]^2}{4(Q_i^{temp(1)})^2} + (L_i + b_i^{temp(2)})(\Sigma_{1 \le j \le n, j \ne i}Q_j + Q_i^1 + Q_{n+1}^1)}$$

A queue resource that can be released by the km service level without affecting a maximum delay requirement of the $k^{th}$ service level is insufficient to meet the adjustment requirement of the target service level, that is, after the target service level and the $k^{th}$ service level are adjusted based on $Q_i^{ass(2)}$ and $Q_k^{ass}$, a maximum delay of current allowable traffic of the $k^{th}$ service level cannot meet the requirement, that is, the following condition is met:

$$\frac{L_{max,L} + \Sigma_{1 \le j \le n, j \ne i, j \ne k}(L_j + Q_j) + L_i + Q_i^{ass(2)} + L_{n+1} + Q_{n+1}^2}{C} + \quad (2\text{-}26)$$

$$\frac{L_k(\Sigma_{1 \le j \le n, j \ne i, j \ne k}Q_j + Q_i^{ass(2)} + Q_{n+1}^2)}{CQ_k^{ass}} +$$

Because the adjustment requirement of the target service level still cannot be met after the second iteration process of preempting the resources that can be released by the non-delay-guarantee queue and the $k^{th}$ service level, selecting any one of service levels other than the target service level and the $k^{th}$ service level on a same port continues to be considered for preemption, to start a third iteration process. A principle of a specific process is the same as that of the second iteration process. Details are not described herein again. The iteration process may be performed repeatedly until the adjustment requirement of the service level is met in an iteration process, and the service level adjustment process ends. Generally, it is assumed that finally, in addition to the target service level and the non-delay-guarantee queue, K other service levels $j_1$ to $j_K$ are also adjusted. Specifically, iterative adjustment is performed in a sequence of the $(j_1)^{th}$ service level, the $(j_2)^{th}$ service level, ..., and the $(j_K)^{th}$ service level. It is assumed that, it is finally determined that the maximum amount of data that can be forwarded when the target service level is scheduled is $Q_i^2$, the maximum amount of data that can be forwarded in the non-delay-guarantee queue is $Q_{n+1}^2$, and a maximum amount of data that can be forwarded in another $(j_k)^{th}$ service level is $Q_{j_k}^2$, where $1 \le k \le K$. It is finally determined that a third update value $C_i^2$ of the queue bandwidth of the target service level is as follows:

$$C_i^2 = C \frac{Q_i^2}{\Sigma_{1 \le j \le n, j \ne i} Q_j + Q_i^1 + Q_{n+1}^1} \quad (2\text{-}30)$$

It is finally determined that an update value $C_{n+1}^2$ of the queue bandwidth of the non-delay-guarantee queue is as follows:

$$C_{n+1}^2 = C \frac{Q_{n+1}^2}{\Sigma_{1 \le j \le n, j \ne i} Q_j + Q_i^1 + Q_{n+1}^1} \quad (2\text{-}31)$$

It is finally determined that an update value $C_{j_k}^2$ of a queue bandwidth of any $(j_k)^{th}$ service level is as follows:

$$C_{j_k}^2 = C \frac{Q_{j_k}^2}{\Sigma_{1 \le j \le n, j \ne i} Q_j + Q_i^1 + Q_{n+1}^1} \forall k \in \{1, 2, \ldots, K\} \quad (2\text{-}32)$$

It is finally determined that a third update value $BF_i^2$ of the queue buffer of the target service level is as follows:

$$BF_i^2 = \left( \frac{L_{max,L} + \Sigma_{1 \le j \le n, j \ne i, j \ne k}(L_j + Q_j) + L_k + Q_k^2 + L_{n+1} + Q_{n+1}^2}{C} + \frac{L_i(\Sigma_{1 \le j \le n, j \ne i, j \ne k} Q_j + Q_k^2 + Q_{n+1}^2)}{CQ_i^2} \right) * r_{i2}^2 + b_{i2}^2 \quad (2\text{-}33)$$

In addition, it is finally determined that an update value $BF_{j_k}^2$ of a queue buffer of any $(j_k)^{th}$ service level is as follows:

$$BFj_k^2 = \left( \frac{L_{max,L} + \Sigma_{1 \le j \le n, j \ne i, j \ne k}(L_j + Q_j) + L_i + Q_i^2 + L_{n+1} + Q_{n+1}^2}{C} + \frac{L_k(\Sigma_{1 \le j \le n, j \ne i, j \ne k} Q_j + Q_i^2 + Q_{n+1}^2)}{CQ_i^2} \right) * r_{j_k}^2 + \quad (2\text{-}34)$$

$b_{j_k}^2 \forall k \in \{1, 2, \ldots, K\}$

Herein, $r_{j_k}^2$ is an update value of a threshold that is of an average rate of a data flow and that is of the $(j_k)^{th}$ service level, $b_{j_k}^2$ is an update value of a threshold that is of a burst amount of the data flow and that is of the $(j_k)^{th}$ service level, where $$r_{j_k}^2 = r_{a_{j_k}}^1,$$

$\forall k \in \{1, 2, \ldots, K-1\}$, $$b_{j_k}^2 = b_{a_{j_k}}^1,$$

$\forall k \in \{1, 2, \ldots, K-1\}$, and $\forall$ is a quantization symbol, $$r_{a_{j_k}}^1$$

is a threshold that is of a current allowable average rate and that is of the $(j_k)^{th}$ service level, and $b\_a_{j_k}^1$ is a threshold that is of a current allowable burst amount and that is of the $(j_k)^{th}$ service level.

Specific values of traffic admission parameters $r_{j_K}^2$ and $b_{j_K}^2$ of the $(j_K)^{th}$ service level can be calculated by using the following formulas:

$$\frac{L_{max,L} + \Sigma_{1 \le j \le n+1}(L_j + Q_j) + L_{j_K} - Q_{j_K}^2}{C} + \quad (2\text{-}35)$$

$$\frac{L_{j_K}(\Sigma_{1 \le j \le n+1} Q_j - Q_{j_K}^2)}{CQ_{j_K}^2} + \frac{b_{j_K}^2 \Sigma_{1 \le j \le n+1} Q_j}{CQ_{j_K}^2} =$$

$$\frac{L_{max,L} + \Sigma_{1 \le j \le n+1}(L_j + Q_j) - L_{j_K} - Q_{j_K}^1}{C} +$$

$$\frac{L_k((\Sigma_{1 \le j \le n+1} Q_j - Q_{j_K}^1)}{CQ_{j_K}^1} + \frac{b_{j_K}^1 \Sigma_{1 \le j \le n+1} Q_j}{CQ_{j_K}^1}$$

$$r_{i_K}^2 = \frac{b_{j_K}^2}{b_{j_K}^1} * r_{i_K}^1 \quad (2\text{-}36)$$

It should be noted that the foregoing uses only one iteration and two iterations as an example for description. In an example embodiment, there may be more iterations such as a third iteration. A principle is the same as that of the second iteration. Details are not described again in this embodiment of this application.

Case 2: There is no non-delay-guarantee queue. The target service level directly and sequentially preempts queue resources that can be released by other service levels on a same port without affecting a maximum delay requirement of the another service level until an adjustment requirement of the target service level is met.

For example, the maximum amount $Q_{n+1}^1$ of data that can be forwarded when the non-delay-guarantee queue is scheduled may be directly set to 0. A basic calculation process is the same as that in Case 1, except that the first iteration process of preempting the resource of the non-delay-guarantee queue is omitted, and the second iteration process of preempting the resource of the another service level on the same port is directly started. Details are not described herein again.

In an example embodiment, when deployed data flows pass through some target service levels in which a quantity of data flows approaches a deployment upper limit or data flows are excessively sent, the global adjustment calculation unit 114 calculates, for these data flows, a new service level through which each hop of a path passes, and ensures that deployment based on the result still meets an end-to-end delay requirement of a service and a data flow admission constraint of each service level. For a target service level that needs to be switched, switching to another idle service level on the same port of the local device is preferentially considered. If there is no feasible calculation result, switching to another idle service level on another port of the local device or even of another network device is further considered.

In an example embodiment, the global adjustment calculation unit 114 enables switching of the service level of the data flow to be performed before an update configuration of the service level. If it is calculated that a queue resource (including a queue bandwidth, a queue buffer, or the like) that is of the target service level and that needs to be additionally added exceeds a sum of a resource (including a bandwidth or a buffer) that is of the non-delay-guarantee queue and that can be preempted on the same port and a queue resource that can be released by another service level on the same port, a service level that needs to be switched is further calculated for a related deployed data flow passing through another service level, so that the queue resource that can be released by the another service level is added, to meet an additional queue resource requirement of the related service level. It is stipulated that before configuration update of the service level, switching of the target service level of the deployed data flow is performed in advance.

In an example embodiment, the global adjustment calculation unit 114 enables an update configuration of the target service level to be performed before switching of the service level of the data flow. If a path switching result of a related deployed data flow is calculated, but remaining data flow admission of a service level to which a service level is to be-switched is insufficient, the update configuration is further calculated for the service level, so that the target service level can meet a switching requirement of the related data flow. It is stipulated that before switching of the service level of the deployed data flow, configuration update of the target service level is performed in advance.

506: Based on 505, the controller delivers an update configuration result that is of the target service level and that is calculated by the global adjustment calculation unit 114 to a local configuration update execution unit 124 of the related device. Particularly, if an update value of a parameter of another service level different from the target service level is also calculated, the controller also delivers the update value of the parameter of the corresponding another service level to the local configuration update execution unit 124 of the related device. The update configuration information of the service level includes a new queue resource parameter (including a reserved queue bandwidth, a queue buffer, or the like) and a new data flow constraint parameter (including a threshold of a burst amount of a data flow, a threshold of an average rate of a data flow, or the like).

507: Based on 506, the local configuration update execution unit 124 performs corresponding configuration update on the target service level.

In an example embodiment, the local configuration update execution unit 124 performs configuration update on the target service level based on the calculation result in Manner 1 in 505, and preferentially considers transferring a bandwidth and a buffer resource that are of the non-delay-guarantee queue and that can be preempted on the same port to the target service level. If a requirement of a queue resource that is of the target service level and that needs to be additionally added is still not met, the local configuration update execution unit 124 continues to consider transferring a queue resource that is of another idle service level on the same port and that can be subtracted without affecting a maximum delay requirement of the another idle service level to the target service level until specified configuration update is implemented.

In an example embodiment, the local configuration update execution unit 124 performs configuration update on the target service level based on the calculation result in Manner 2 in 505, and converts a queue resource released from the target service level into a bandwidth and a buffer resource that are of the non-delay-guarantee queue and that can be preempted on the same port.

508: Based on 507, a global service level maintenance unit 116 synchronizes the update value of the parameter of the target service level. Subsequently, the controller performs service deployment based on the update value of the parameter of the target service level.

509: Based on 505, a global service level switching unit 115 switches, based on the switching result that is of the service level and that is calculated by the global adjustment calculation unit 114, a service level through which a related data flow needs to pass. Subsequently, a packet in the related data flow is transmitted based on a new service level.

510: Based on 508 and 509, the global service deployment unit 111 modifies a subscribed committed data flow parameter of a related service based on an actual arrival status and a requirement, including modifying a threshold of a burst amount of a data flow, a threshold of an average rate of the data flow, and the like, and modifies, based on an update configuration of the related service level or a service level switching status of the related service and a requirement, a quantity of current allowable data flows and a quantity of remaining allowable data flows of each service level.

In an example embodiment, that the global service deployment unit 111 modifies, in an increasing direction based on an actual arrival status, a parameter of a data flow that exceeds a subscription commitment in the target service level includes: modifying the threshold of the burst amount of the data flow, the threshold of the average rate of the data flow, and the like in an increasing direction; and modifying, in a decreasing direction based on an actual arrival status, a parameter of a data flow that is less than the subscription commitment in a long term such as a target reference time period in the target service level, including modifying the threshold of the burst amount of the data flow, the threshold of the average rate of the data flow, and the like in a decreasing direction.

Figure 8:
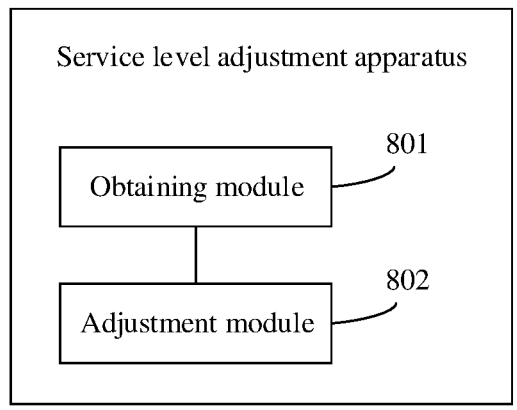
FIG. 8 is a schematic diagram of a structure of a service level adjustment apparatus according to an embodiment of this application.

An embodiment of this application provides a service level adjustment apparatus. The apparatus implements, by using modules shown in FIG. 8, the service level adjustment methods shown in FIG. 4 and FIG. 5. Refer to FIG. 8. The apparatus includes an obtaining module 801 and an adjustment module 802.

The obtaining module 801 is configured to obtain related information of a target service level of a first network device, where the related information includes at least one piece of information in at least one piece of queue status information, a remaining data flow parameter, a current data flow parameter, and a quantity of reporting times of exception information of the target service level. For example, for functions performed by the obtaining module 801, refer to related content in process 401 in FIG. 4, or refer to related content in processes 501 to 503 shown in FIG. 5. Details are not described herein again.

The adjustment module 802 is configured to adjust, when any information in the related information does not meet a threshold corresponding to the any information, a parameter of the target service level based on a maximum delay associated with the target service level.

For example, for functions performed by the adjustment module 802, refer to related content in process 402 in FIG. 4, or refer to related content in processes 504 to 510 shown in FIG. 5. Details are not described herein again.

According to the method provided in this embodiment of this application, based on changes of a service deployment status (for example, a current data flow parameter and a remaining data flow parameter), queue status information, a quantity of reporting times of exception information, and the like, parameter configurations of a service level such as queue resource allocation and a data flow admission constraint are dynamically updated, and a service level through which a data flow passes is dynamically switched, to further improve network resource utilization while ensuring an end-to-end delay of a service.

It some embodiments, when the apparatus provided in FIG. 8 implements functions of the apparatus, division into the foregoing functional modules is merely used as an example for description. In actual application, the foregoing functions may be allocated to different functional modules for implementation based on a requirement. In other words, a device is divided into different functional modules in terms of an inner structure, to implement all or some of the functions described above. In addition, the apparatus provided in the foregoing embodiment and the method embodiments pertain to a same concept. For a specific implementation process of the apparatus, refer to the method embodiments. Details are not described herein again.

An embodiment of this application provides a service level adjustment system, so that network resource utilization can be further improved while an end-to-end delay requirement of a service is ensured. When QoS is dynamically adjusted, this embodiment of this application can ensure that delay degradation or a packet loss is not caused by a data flow in a network. FIG. 3 shows a service-level-based QoS adjustment system that ensures an end-to-end delay, to improve network resource utilization while ensuring an end-to-end delay of a service. An overall architecture of the system includes units on a controller side and a network device side, related functions of the units, and interaction logic between the units.

An overall working procedure includes steps such as a QoS adjustment procedure globally triggered by the controller, corresponding original information collection, trigger determining adjustment, calculation adjustment, execution adjustment, and information synchronization adjustment, so that based on changes of a service deployment status, an actual arrival status of a data flow, queue status information, and the like, configuration update can be dynamically performed on a parameter of a service level, and a service level through which the data flow passes can be dynamically switched. Therefore, delay degradation or a packet loss of the data flow in a network is not caused during the dynamic configuration update of the service level or the switching of the service level of the data flow.

The configuration update of the parameter of service level includes one or more of the following parameters: increasing or reducing allocation of queue resources, for example, a queue reservation bandwidth and a buffer; and increasing or decreasing a value of a data flow constraint parameter, for example, a threshold of a burst amount of a data flow and a maximum average rate of the data flow. The switching of the service level through which the data flow passes includes: switching to another service level on a same port of a same device; or switching to a service level on another port of a same device or of another device.

In an example, the network device sends related information of a target service level to a control device, where the related information includes at least one piece of information in at least one piece of queue status information, a remaining data flow parameter, a current data flow parameter, and a quantity of reporting times of error information of the target service level. The control device obtains the related information of the target service level of the first network device. The control device adjusts, when any information in the related information does not meet a threshold corresponding to the any information, a parameter of the target service level based on a maximum delay associated with the target service level. For functions performed by the control device, refer to related content in process 402 in FIG. 4, or refer to related content in processes 504 to 510 shown in FIG. 5. Details are not described herein again.

The control device or the network device in the foregoing embodiments may be a router or a switch. A hardware structure includes but is not limited to the following two manners.

Figure 9:
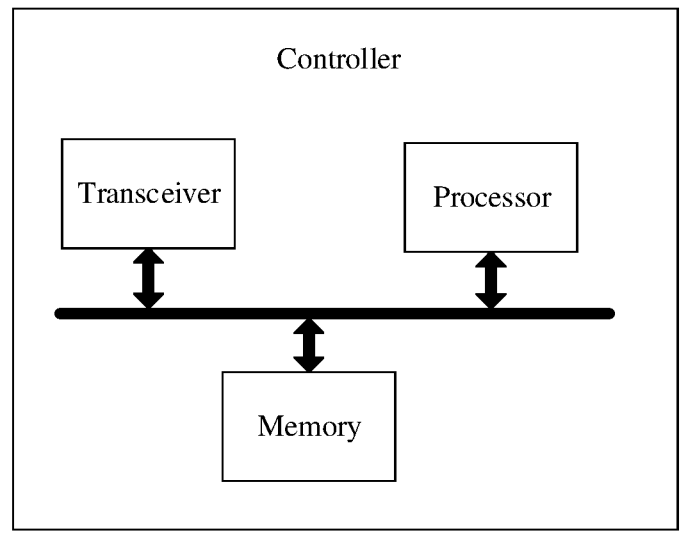
FIG. 9 is a schematic diagram of a structure of a network device according to an embodiment of this application.

1. As shown in FIG. 9, the control device or the network device includes a transceiver, a processor, and a memory.

For example, the transceiver of the control device is configured to receive a packet, data information, or the like. For example, refer to related content in process 401 shown in FIG. 4 or in processes 501 to 503 shown in FIG. 5. The transceiver of the control device is configured to receive information such as at least one piece of queue status information, a current data flow parameter, and a quantity of reporting times of exception information that are of a target service level of a first network device and that are reported by the first network device, and may further receive some parameters stored in the processor, for example, a remaining data flow parameter. In this case, the processor of the control device is configured to adjust, when any information in the related information does not meet a threshold corresponding to the any information, a parameter of the target service level based on a maximum delay associated with the target service level. For example, for details, refer to related descriptions in process 402 shown in FIG. 4, or related descriptions of adjusting the parameter of the target service level by the control device in processes 504 to 510 shown in FIG. 5.

Figure 10:
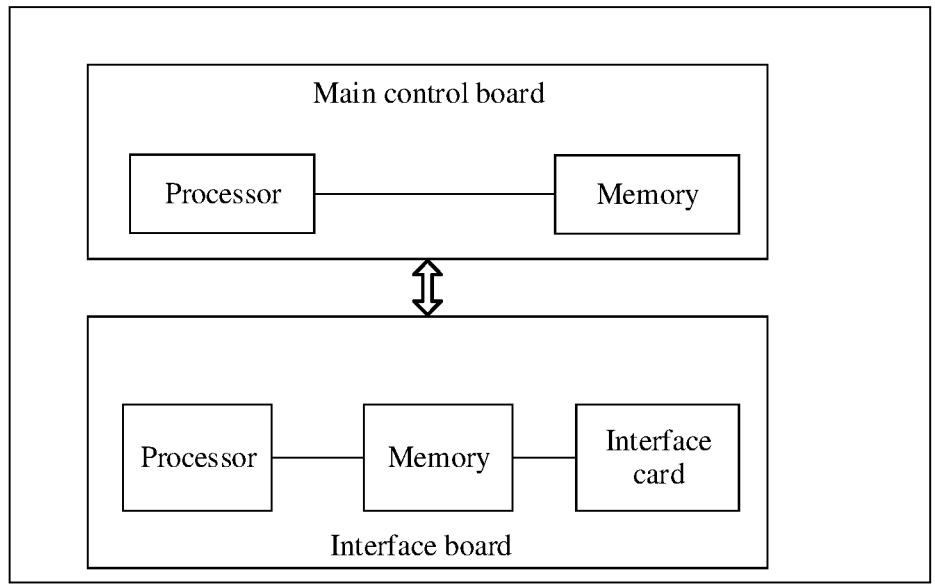
FIG. 10 is a schematic diagram of a structure of a network device according to an embodiment of this application.

2. As shown in FIG. 10, the control device or the network device includes a main control board and an interface board, the main control board includes a processor and a memory, and the interface board includes a processor, a memory, and an interface card. The processor of the interface board is configured to invoke program instructions in the memory of the interface board to receive and send a packet. The processor of the main control board is configured to invoke program instructions in the memory of the main control board to perform corresponding processing functions.

For example, the interface card of the interface board of the control device is configured to receive a packet, data information, or the like. For example, refer to related content in process 401 shown in FIG. 4 or in processes 501 to 503 shown in FIG. 5. The interface card of the interface board of the control device is configured to receive information such as at least one piece of queue status information, a current data flow parameter, and a quantity of reporting times of exception information that are of a target service level of a first network device and that are reported by the first network device, and may further receive some parameters stored in the processor of the interface board, for example, a remaining data flow parameter. In this case, the processor of the main control board of the control device is configured to adjust, when any information in the related information does not meet a threshold corresponding to the any information, a parameter of the target service level based on a maximum delay associated with the target service level. For example, for details, refer to related descriptions in process 402 shown in FIG. 4, or related descriptions of adjusting the parameter of the target service level by the control device in processes 504 to 510 shown in FIG. 5.

The any apparatus embodiment described above is merely an example. The units described as separate parts may or may not be physically separate, and parts displayed as units may or may not be physical units, and may be located in one position, or may be distributed on a plurality of network units. Some or all of the modules may be selected based on an actual requirement to achieve the objectives of the solutions of embodiments. In addition, in the embodiment accompanying drawings of the first network device or the controller provided in the present application, a connection relationship between modules indicates that there is a communication connection between the modules, and the communication connection may be specifically implemented as one or more communications buses or signal cables. A person of ordinary skill in the art may understand and implement embodiments without creative efforts.

Methods or algorithm steps described in the content disclosed in embodiments of this application may be implemented by hardware, or may be implemented by a processor by executing software instructions. The software instructions may include corresponding software modules. The software module may be stored in a random access memory (random access memory, RAM), a flash memory, a read-only memory (read-only memory, ROM), an erasable programmable read-only memory (erasable programmable ROM, EPROM), an electrically erasable programmable read-only memory (electrically EPROM, EEPROM), a hard disk, a removable hard disk, a compact disc, or any other form of storage medium well-known in the art. For example, a storage medium is coupled to the processor, so that the processor can read information from the storage medium and can write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

In the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communications medium. The communications medium includes any medium that facilitates transmission of a computer program from one place to another. The storage medium may be any available medium accessible to a general-purpose or dedicated computer.

Figure 11:
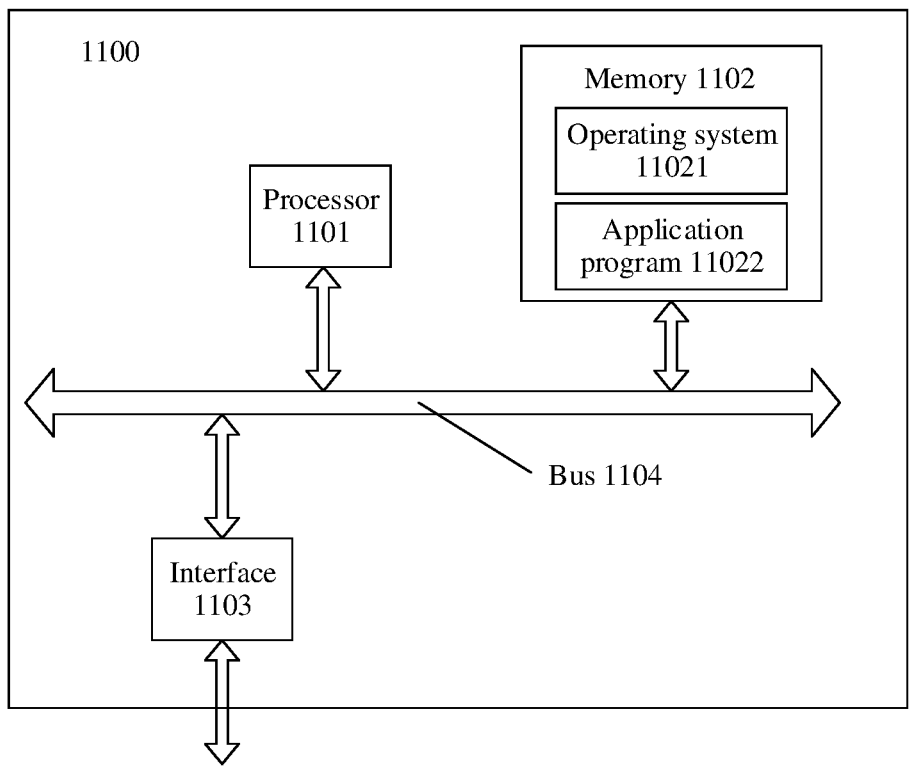
FIG. 11 is a schematic diagram of a structure of a service level adjustment device according to an embodiment of this application.

FIG. 11 is a schematic diagram of a hardware structure of a service level adjustment device 1100 according to an embodiment of this application. The service level adjustment device 1100 shown in FIG. 11 may perform corresponding steps in the configuration data management method provided in the embodiment shown in FIG. 4 or FIG. 5.

As shown in FIG. 11, the service level adjustment device 1100 includes a processor 1101, a memory 1102, an interface 1103, and a bus 1104. The interface 1103 may be implemented in a wireless or wired manner. For example, the interface 1103 may be a network adapter. The processor 1101, the memory 1102, and the interface 1103 are connected through the bus 1104.

The interface 1103 may include a transmitter and a receiver, and is configured to communicate with another communications device, to perform process 401 shown in FIG. 4 or related steps shown in FIG. 5. The processor 101 is configured to perform process 402 in the embodiment shown in FIG. 4 or processing-related steps shown in FIG. 5, and/or the processor 1101 is configured to perform another process of the technology described in this specification. The memory 1102 includes an operating system 11021 and an application program 11022, and is configured to store a program, code, or instructions. When executing the program, the code, or the instructions, the processor or a hardware device may complete the processing process of the service level adjustment device 1100 in the method embodiment. Optionally, the memory 1102 may include a read-only memory (ROM) and a random access memory (RAM). The ROM includes a basic input/output system (BIOS) or an embedded system. The RAM includes an application program and an operating system. When the service level adjustment device 1100 needs to run, the service level adjustment device 1100 is started by using the BIOS built into the ROM or a bootloader bootstrap system in the embedded system, to boot the service level adjustment device 1100 to enter a normal running state. After entering the normal running state, the service level adjustment device 1100 runs the application program and the operating system in the RAM, to complete the processing process of the service level adjustment device 1100 in the method embodiment.

It may be understood that FIG. 11 merely shows a simplified design of the service level adjustment device 1100. In actual application, the service level adjustment device 1100 may include any quantity of interfaces, processors, or memories.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computing machines (ARM) architecture.

Further, in an optional embodiment, the memory may include a read-only memory and a random access memory, and provide instructions and data for the processor. The memory may further include a non-volatile random access memory. For example, the memory may further store information about a device type.

The memory may be a volatile memory or a non-volatile memory, or may include both a volatile memory and a non-volatile memory. The non-volatile memory may be a read-only memory (ROM), a programmable read-only memory (PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example but not limitation, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

This application further provides a computer-readable storage medium. The storage medium stores at least one instruction, and the instruction is loaded and executed by a processor to implement any one of the foregoing service level adjustment methods, for example, perform the method in FIG. 4 or FIG. 5.

This application provides a computer program. When the computer program is executed by a computer, a processor or the computer is enabled to perform corresponding steps and/or procedures in the method embodiment in FIG. 4 or FIG. 5.

A chip is provided. The chip includes a processor, configured to: invoke, from a memory, instructions stored in the memory and run the instructions, so that a communications device on which the chip is installed can perform the method in FIG. 4 or FIG. 5.

Another chip is provided. The chip includes an input interface, an output interface, a processor, and a memory. The input interface, the output interface, the processor, and the memory are connected to each other through an internal connection channel. The processor is configured to execute code in the memory. When the code is executed, the processor is configured to perform the methods in the foregoing aspects.

All or some of the foregoing embodiments may be implemented by using software, hardware, firmware, or any combination thereof. When software is used to implement the embodiments, the embodiments may be implemented partially in a form of a computer program product. The computer program product includes one or more computer instructions. When the computer program instructions are loaded and executed on a computer, all or some of the procedures or functions in this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium (for example, a solid-state drive).

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions of this application shall fall within the protection scope of this application.

What is claimed is:

1. A method, comprising:
    obtaining, by a control device, related information of a target service level of a first network device, wherein the related information of the target service level comprises: at least one piece of queue status information of the target service level, a remaining data flow parameter of the target service level, a current data flow parameter of the target service level, or a quantity of reporting times of exception information of the target service level;
    adjusting, by the control device when any information in the related information does not meet a threshold corresponding to the respective any information, a parameter of the target service level based on a maximum delay associated with the target service level;
    wherein the related information comprises the queue status information of the target service level; and
    wherein adjusting, by the control device when any information in the related information does not meet the threshold corresponding to the respective any information, the parameter of the target service level based on the maximum delay associated with the target service level comprises:
        adjusting, by the control device when the queue status information is less than a threshold lower limit corresponding to the queue status information, the parameter of the target service level based on the maximum delay associated with the target service level.

2. The method according to claim 1, wherein the parameter of the target service level comprises a queue resource parameter and a data flow constraint parameter; and
    wherein adjusting the parameter of the target service level based on the maximum delay associated with the target service level comprises:
        determining a first update value of the data flow constraint parameter;
        determining a first update value of the queue resource parameter based on the first update value of the data flow constraint parameter when the maximum delay remains unchanged; and
        adjusting the data flow constraint parameter based on the first update value of the data flow constraint parameter, and adjusting the queue resource parameter based on the first update value of the queue resource parameter.

3. The method according to claim 2, wherein the first update value of the queue resource parameter comprises a first update value of a queue bandwidth and a first update value of a queue buffer, and the first update value of the data flow constraint parameter comprises a first update value of a threshold of a burst amount of a data flow and a first update value of a threshold of an average rate of the data flow; and
    wherein determining the first update value of the queue resource parameter based on the first update value of the data flow constraint parameter when the maximum delay remains unchanged comprises:

when the maximum delay remains unchanged, determining a bandwidth of a port corresponding to the target service level, a first maximum amount of data that is able to be forwarded at the target service level after the parameter of the target service level is adjusted, a maximum amount of data that is able to be forwarded at each of a plurality of service levels of the first network device before the parameter of the target service level is adjusted, and a maximum packet length of a queue corresponding to each of the plurality of service levels;

determining the first update value of the queue bandwidth based on the bandwidth of the port, the first maximum amount of data, and the maximum amount of data that is able to be forwarded at each of the plurality of service levels before the parameter of the target service level is adjusted; and determining the first update value of the queue buffer based on the maximum amount of data that is able to be forwarded at each of the plurality of service levels before the parameter of the target service level is adjusted, the maximum packet length, the first update value of the threshold of the burst amount of the data flow, and the first update value of the threshold of the average rate of the data flow.

4. The method according to claim 1, wherein the related information further comprises the current data flow parameter of the target service level; and wherein adjusting, by the control device when any information in the related information does not meet a threshold corresponding to the respective any information, the parameter of the target service level based on the maximum delay associated with the target service level further comprises:

adjusting, by the control device when the current data flow parameter of the target service level is less than a threshold lower limit corresponding to the current data flow parameter, the parameter of the target service level based on the maximum delay associated with the target service level.

5. The method according to claim 1, wherein the related information further comprises the remaining data flow parameter of the target service level; and wherein adjusting, by the control device when any information in the related information does not meet the threshold corresponding to the respective any information, the parameter of the target service level based on a maximum delay associated with the target service level further comprises:

adjusting, by the control device when the remaining data flow parameter of the target service level exceeds a threshold upper limit corresponding to the remaining data flow parameter, the parameter of the target service level based on the maximum delay associated with the target service level.

6. The method according to claim 1, wherein the related information further comprises the current data flow parameter of the target service level; and wherein adjusting, by the control device when any information in the related information does not meet the threshold corresponding to the respective any information, the parameter of the target service level based on the maximum delay associated with the target service level further comprises:

adjusting, by the control device when the current data flow parameter of the target service level exceeds a threshold upper limit corresponding to the current data flow parameter, the parameter of the target service level based on the maximum delay associated with the target service level.

7. The method according to claim 1, wherein the related information further comprises the remaining data flow parameter of the target service level; and wherein adjusting, by the control device when any information in the related information does not meet the threshold corresponding to the any information, the parameter of the target service level based on the maximum delay associated with the target service level further comprises:

adjusting, by the control device when the remaining data flow parameter of the target service level is less than a threshold lower limit corresponding to the remaining data flow parameter, the parameter of the target service level based on the maximum delay associated with the target service level.

8. The method according to claim 1, wherein the related information further comprises the quantity of reporting times of the exception information of the target service level; and wherein adjusting, by the control device when any information in the related information does not meet the threshold corresponding to the any information, the parameter of the target service level based on the maximum delay associated with the target service level further comprises:

adjusting, by the control device when the quantity of reporting times of the exception information of the target service level exceeds a threshold upper limit corresponding to the quantity of reporting times of the exception information, the parameter of the target service level based on the maximum delay associated with the target service level.

9. The method according to claim 1, wherein each piece of queue status information comprises one or more of queue buffer occupation, a packet queuing delay, or a queue packet count.

10. An apparatus, comprising:
a non-transitory memory storing instructions; and
a processor coupled to the non-transitory memory; wherein the instructions, when executed by the processor, cause the apparatus to be configured to:
obtain related information of a target service level of a first network device, wherein the related information comprises: at least one piece of queue status information of the target service level, a remaining data flow parameter of the target service level, a current data flow parameter of the target service level, or a quantity of reporting times of exception information of the target service level;
adjust, when any information in the related information does not meet a threshold corresponding to the respective any information, a parameter of the target service level based on a maximum delay associated with the target service level;
wherein the related information comprises the queue status information of the target service level; and
wherein the instructions, when executed by the processor, cause the apparatus to be configured to:
adjust, when the queue status information is less than a threshold lower limit corresponding to the queue status information, the parameter of the target service level based on the maximum delay associated with the target service level.

11. The apparatus according to claim 10 wherein the related information further comprises the current data flow parameter of the target service level; and wherein the instructions, when executed by the processor, cause the apparatus to be further configured to:

adjust, when the current data flow parameter of the target service level is less than a threshold lower limit corresponding to the current data flow parameter, the parameter of the target service level based on the maximum delay associated with the target service level.

12. The apparatus according to claim 10 wherein the parameter of the target service level comprises a queue resource parameter and a data flow constraint parameter; and wherein the instructions, when executed by the processor, cause the apparatus to be further configured to:

determine a first update value of the data flow constraint parameter;

determine a first update value of the queue resource parameter based on the first update value of the data flow constraint parameter when the maximum delay remains unchanged; and adjust the data flow constraint parameter based on the first update value of the data flow constraint parameter, and adjust the queue resource parameter based on the first update value of the queue resource parameter.

13. The apparatus according to claim 10, wherein the related information further comprises the remaining data flow parameter of the target service level; and wherein the instructions, when executed by the processor, cause the apparatus to be further configured to:

adjust, when the remaining data flow parameter of the target service level exceeds a threshold upper limit corresponding to the remaining data flow parameter, the parameter of the target service level based on the maximum delay associated with the target service level.

14. The apparatus according to claim 10, wherein each piece of queue status information comprises one or more of queue buffer occupation, a packet queuing delay, or a queue packet count.

15. A system, comprising:
a control device; and
a first network device;
wherein the first network device is configured to send related information about a target service level of the first network device; and wherein the control device is configured to:

receive the related information of the target service level, wherein the related information of the target service level comprises: at least one piece of queue status information, a remaining data flow parameter, a current data flow parameter, or a quantity of reporting times of exception information of the target service level;

adjust, when any information in the related information does not meet a threshold corresponding to the respective any information, a parameter of the target service level based on a maximum delay associated with the target service level;

wherein the related information comprises the current data flow parameter of the target service level; and wherein the control device is further configured to adjust, when the current data flow parameter of the target service level is less than a threshold lower limit corresponding to the current data flow parameter, the parameter of the target service level based on the maximum delay associated with the target service level.

16. The system according to claim 15, wherein the control device is further configured to:

determine a second update value of a data flow constraint parameter;

determine a second update value of a queue resource parameter based on the second update value of the data flow constraint parameter when the maximum delay remains unchanged; and when the second update value of the queue resource parameter is less than or equal to a resource threshold, adjust the data flow constraint parameter based on the second update value of the data flow constraint parameter, and adjust the queue resource parameter based on the second update value of the queue resource parameter.

17. The system according to claim 15, wherein the related information further comprises the remaining data flow parameter of the target service level; and wherein the control device is further configured to:

adjust, when the remaining data flow parameter of the target service level exceeds a threshold upper limit corresponding to the remaining data flow parameter, the parameter of the target service level based on the maximum delay associated with the target service level.

18. The system according to claim 15, wherein the related information further comprises the quantity of reporting times of the exception information of the target service level; and wherein the control device is further configured to:

adjust, when the quantity of reporting times of the exception information of the target service level exceeds a threshold upper limit corresponding to the quantity of reporting times of the exception information, the parameter of the target service level based on the maximum delay associated with the target service level.

19. The system according to claim 15, wherein the first network device is further configured to:

receive an update value of the adjusted parameter of the target service level from the control device; and adjust the parameter of the target service level based on the received update value.

* * * * *